United States Patent
Yang et al.

(10) Patent No.: US 11,316,650 B2
(45) Date of Patent: Apr. 26, 2022

(54) METHOD AND DEVICE FOR TRANSMITTING AND RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Hanjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/925,027

(22) Filed: Jul. 9, 2020

(65) Prior Publication Data

US 2020/0344032 A1      Oct. 29, 2020

Related U.S. Application Data

(63) Continuation of application No. PCT/KR2019/010172, filed on Aug. 9, 2019.
(Continued)

(51) Int. Cl.
*H04L 5/00* (2006.01)
*H04W 4/40* (2018.01)
*H04W 72/04* (2009.01)

(52) U.S. Cl.
CPC .......... *H04L 5/0094* (2013.01); *H04L 5/0082* (2013.01); *H04W 4/40* (2018.02); *H04W 72/0413* (2013.01); *H04W 72/0453* (2013.01)

(58) Field of Classification Search
CPC ...... H04L 5/0094; H04L 5/0082; H04W 4/40; H04W 72/0413; H04W 72/0453
See application file for complete search history.

(56) References Cited

U.S. PATENT DOCUMENTS

2010/0271970 A1    10/2010  Pan et al.
2017/0289733 A1*   10/2017  Rajagopal ............... H04W 4/70
(Continued)

FOREIGN PATENT DOCUMENTS

JP       2010519838      6/2010
KR    1020160093532      8/2016
(Continued)

OTHER PUBLICATIONS

Kundu et al. "Physical Uplink Control Channel Design for 5G New Radio" 2018 IEEE 5G World Forum (Year: 2018).*
(Continued)

*Primary Examiner* — Jeffrey M Rutkowski
*Assistant Examiner* — Basil Ma
(74) *Attorney, Agent, or Firm* — Fish & Richardson P.C.

(57) ABSTRACT

The present disclosure relates to a wireless communication system. More particularly, the present disclosure relates to a method and apparatus, the method including receiving a physical downlink shared channel (PDSCH), determining a time interval between (i) the PDSCH and (ii) an earliest one of a plurality of uplink (UL) channels overlapped with each other on a time axis, wherein the plurality of UL channels include a first UL channel for response information for the PDSCH, and multiplexing uplink control information (UCI) related to the plurality of UL channels based on the time interval being equal to or larger than a reference time interval. The reference time interval is determined based on the number of symbols and a subcarrier spacing (SCS), and the SCS includes a smallest of a plurality of SCSs for the plurality of UL channels.

13 Claims, 18 Drawing Sheets

Related U.S. Application Data

(60) Provisional application No. 62/716,945, filed on Aug. 9, 2018.

(56) References Cited

U.S. PATENT DOCUMENTS

| | | | | |
|---|---|---|---|---|
| 2017/0366311 | A1* | 12/2017 | Iyer | H04L 5/0007 |
| 2018/0131493 | A1* | 5/2018 | Luo | H04W 72/042 |
| 2019/0261397 | A1* | 8/2019 | Takeda | H04W 72/1289 |
| 2019/0335485 | A1* | 10/2019 | Kundu | H04L 5/0051 |
| 2019/0349917 | A1* | 11/2019 | Huang | H04L 5/0094 |
| 2020/0163081 | A1* | 5/2020 | Kim | H04W 72/10 |

FOREIGN PATENT DOCUMENTS

| | | |
|---|---|---|
| KR | 101741102 | 5/2017 |
| KR | 1020180034169 | 4/2018 |

OTHER PUBLICATIONS

R1-1806623 "Remaining issues on UCI multiplexing" 3GPP TSG RAN WG1 Meeting #93 May 21-25, 2018 (Year: 2018).*
3GPP TS 38.211 V15.2.0 (Jul. 2018) Section 4.2 Numerologies (Year: 2018).*
3rd Generation Partnership Project; Technical Specification Group Radio Access Network; NR; "Physical layer procedures for control (Release 15)," 3GPP TS 38.213 V15.2.0, dated Jun. 2018, 99 pages.
Lenovo, Motorola Mobility, "Remaining issues on UCI multiplexing on PUCCH," R1-1806336, 3GPP TSG RAN WG1 Meeting #93, Busan, Korea, dated May 21-25, 2018, 5 pages.
LG Electronics, "Discussion on carrier aggregation and bandwidth parts," R1-1715892, 3GPP TSG RAN WG1 Meeting NR#3, Nagoya, Japan, dated Sep. 18-21, 2017, 12 pages.
LG Electronics, "Discussion on resource allocation and TBS determination," R1-1715885, 3GPP TSG RAN WG1 Meeting NR#3, Nagoya, Japan, dated Sep. 18-21, 2017, 16 pages.
LG Electronics, "Remaining issues on UCI multiplexing," R1-1806623, 3GPP TSG RAN WG1 Meeting #93, Busan, Korea, May 21-25, 2018, 8 pages.
PCT International Search Report in International Application No. PCT/KR2019/010172, dated Nov. 20, 2019, 18 pages (with English translation).
Qualcomm Incorporated, "Summary of remaining issues for overlapping UL transmissions," R1-1807773, 3GPP TSG RAN WG1 Meeting #93, Busan, Korea, dated May 21-25, 2018, 14 pages.
EP Extended Search Report in European Appln. No. 19847237.5, dated Feb. 4, 2021, 12 pages.
Panasonic, "Discussion on UCI multiplexing," R1-1806181, 3GPP TSG RAN WG1 Meeting #93, Busan, Korea, dated May 21-25, 2018, 3 pages.
Office Action in Japanese Appln. No. 2020-549544, dated Aug. 24, 2021, 10 pages (with English translation).

* cited by examiner

METHOD AND DEVICE FOR TRANSMITTING AND RECEIVING WIRELESS SIGNAL IN WIRELESS COMMUNICATION SYSTEM

CROSS-REFERENCE TO RELATED APPLICATIONS

This application is a continuation of International Application No. PCT/KR2019/010172, filed on Aug. 9, 2019, which claims the benefit of U.S. Provisional Application No. 62/716,945, filed on Aug. 9, 2018. The disclosures of the prior applications are incorporated by reference in their entirety.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

SUMMARY

An aspect of the present disclosure is to provide a method of efficiently transmitting/receiving a wireless signal in a wireless communication and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, a method of transmitting control information by a communication device in a wireless communication system includes receiving a physical downlink shared channel (PDSCH), determining a time interval between (i) the PDSCH and (ii) an earliest one of a plurality of uplink (UL) channels overlapped with each other on a time axis, wherein the plurality of UL channels include a first UL channel for response information for the PDSCH, and multiplexing uplink control information (UCI) related to the plurality of UL channels based on the time interval being equal to or larger than a reference time interval. The reference time interval is determined based on a number of symbols and a subcarrier spacing (SCS), and the SCS includes a smallest of a plurality of SCSs for the plurality of UL channels.

In another aspect of the present disclosure, a communication device in a wireless communication system includes a memory and a processor. The processor is configured to receive a PDSCH, determine a time interval between (i) the PDSCH and (ii) an earliest one of a plurality of UL channels overlapped with each other on a time axis, wherein the plurality of UL channels include a first UL channel for response information for the PDSCH, and multiplex UCI related to the plurality of UL channels based on the time interval being equal to or larger than a reference time interval. The reference time interval is determined based on a number of symbols and an SCS, and the SCS includes a smallest of a plurality of SCSs for the plurality of UL channels.

An SCS of the earliest UL channel may be larger than the smallest of the plurality of SCSs for the plurality of UL channels.

UCI including the response information may be multiplexed and transmitted in a single UL channel based on the time interval being equal to or larger than the reference time interval, and the response information may be transmitted on the first UL channel without being multiplexed or transmissions of all of the plurality of UL channels may be dropped, based on the time interval being less than the reference time interval.

The time interval may be determined based on an interval between (i) a last symbol of the PDSCH and (ii) a first symbol of the earliest UL channel.

The plurality of UL channels may include a physical uplink control channel (PUCCH).

Based on the plurality of UL channels including a physical uplink shared channel (PUSCH) scheduled by a physical downlink control channel (PDCCH), it may be further determined whether a time interval between (i) the PDCCH and (ii) the earliest UL channel satisfies an additional reference time interval.

A symbol length may be determined based on an SCS, and the symbol length and the SCS may be inversely proportional to each other.

The communication device may include an autonomous driving vehicle communicable with an autonomous driving vehicle other than at least a user equipment (UE), a network, and the communication device.

The communication device may further include a radio frequency (RF) unit.

According to the present disclosure, wireless signal transmission and reception can be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
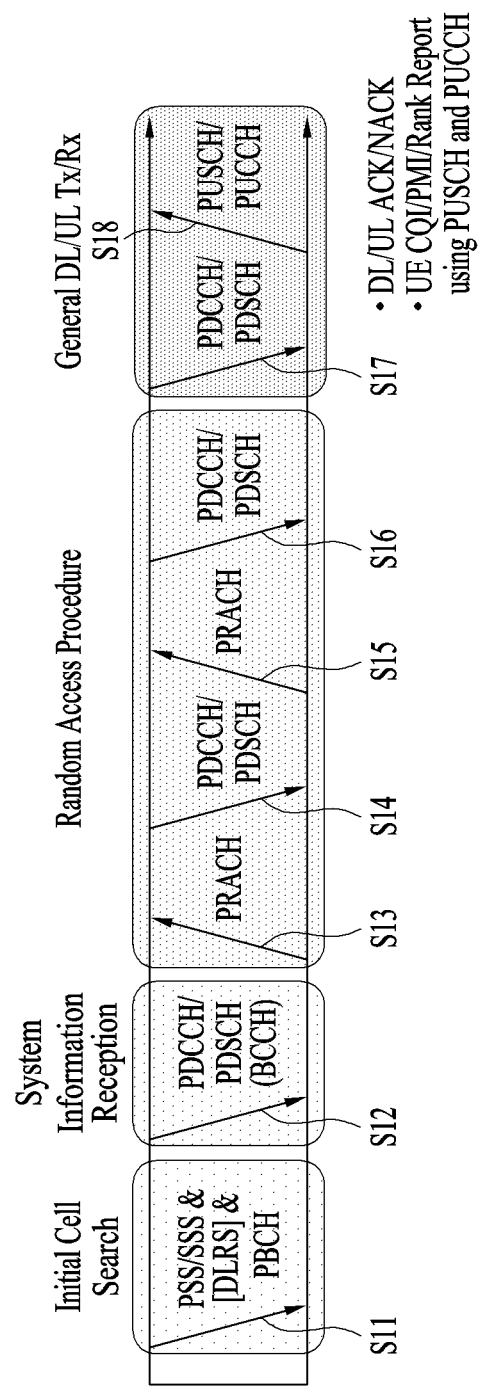
FIG. 1 illustrates physical channels used in a 3rd generation partnership project (3GPP) system, which is an example of wireless communication systems, and a general signal transmission method using the same.

FIG. 1 illustrates physical channels used in a 3GPP NR system and a general signal transmission method using the same.

When powered on or when a UE initially enters a cell, the UE performs initial cell search involving synchronization with a BS in step S101. For initial cell search, the UE synchronizes with the BS and acquires information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
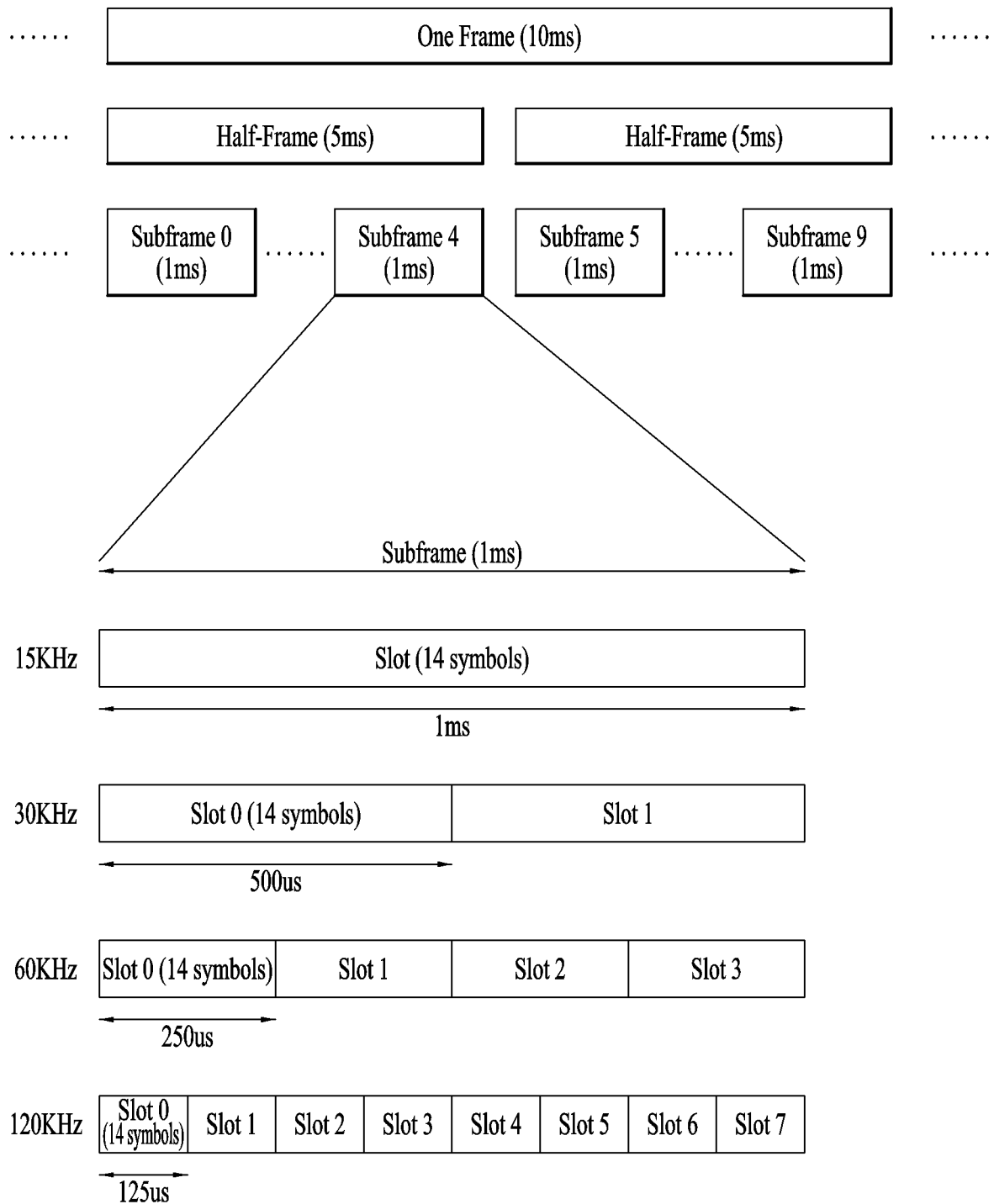
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * 2 ^ u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 1-continued

| SCS (15 * 2 ^ u) | $N^{slot}_{symb}$ | $N^{frame,u}_{slot}$ | $N^{subframe,u}_{slot}$ |
|---|---|---|---|
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15 * 2 ^ u) | $N^{slot}_{symb}$ | $N^{frame,u}_{slot}$ | $Ns^{ubframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a Discrete Fourier Transform-spread-OFDM (DFT-s-OFDM) symbol).

Figure 3:
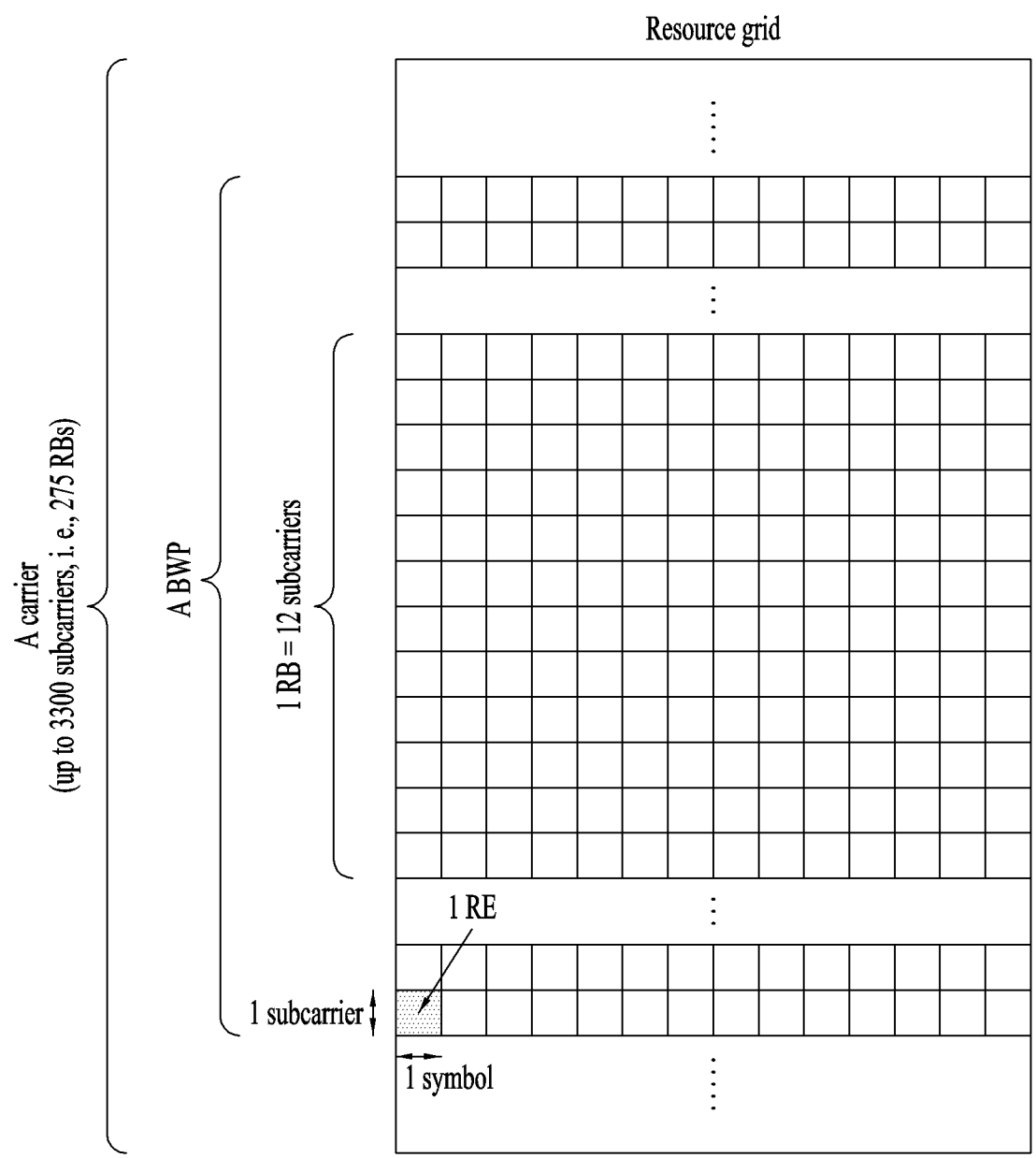
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Hereinafter, each of the physical channels will be described in more detail.

The PDCCH carries Downlink Control Information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information present on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with different identifiers (e.g., Radio Network Temporary Identifier (RNTI)) according to the owner or usage of the PDCCH. For example, if the PDCCH is for a specific UE, the CRC will be masked with a UE identifier (e.g., Cell-RNTI (C-RNTI)). If the PDCCH is for paging, the CRC will be masked with a Paging-RNTI (P-RNTI). If the PDCCH is for system information (e.g., a system information block (SIB)), the CRC will be masked with an system information RNTI (SI-RNTI). If the PDCCH is for a random access response, the CRC will be masked with a random access-RNTI (RA-RNTI).

The PDSCH carries downlink data (e.g., DL-SCH transport block (DL-SCH TB)), and a modulation technique such as Quadrature Phase Shift Keying (QPSK), 16 Quadrature Amplitude Modulation (QAM), 64 QAM, or 256 QAM is applied thereto. The TB is encoded to generate a codeword. The PDSCH may carry a maximum of two codewords. Scrambling and modulation mapping may be performed on each codeword, and the modulation symbols generated from each codeword may be mapped to one or more layers. Each of the layers is mapped to a resource together with a Demodulation Reference Signal (DMRS) to generate an OFDM symbol signal and transmit the signal through a corresponding antenna port.

The PUCCH carries Uplink Control Information (UCI). The UCI includes the following information.

Scheduling Request (SR): Information that is used to request a UL-SCH resource.

Hybrid Automatic Repeat Request (HARQ)-Acknowledgment (ACK): A response to a downlink data packet (e.g., codeword) on the PDSCH. HARQ-ACK indicates whether the downlink data packet has been successfully received. In response to a single codeword, one bit of HARQ-ACK may be transmitted. In response to two codewords, two bits of HARQ-ACK may be transmitted. The HARQ-ACK response includes positive ACK (simply, ACK), negative ACK (NACK), DTX or NACK/DTX. Here, the HARQ-ACK is used interchangeably used with HARQ ACK/NACK and ACK/NACK.

Channel State Information (CSI): Feedback information about a downlink channel. Multiple Input Multiple Output (MIMO)-related feedback information includes a Rank Indicator (RI) and a Precoding Matrix Indicator (PMI).

Table 3 exemplarily shows PUCCH formats. PUCCH formats may be divided into Short PUCCHs (Formats 0 and 2) and Long PUCCHs (Formats 1, 3, and 4) based on the PUCCH transmission duration.

TABLE 3

| PUCCH format | Length in OFDM symbols $N^{PUCCH}_{symb}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI having a size of up to 2 bits, and is mapped based on a sequence and transmitted. Specifically, a UE transmits one of a plurality of sequences on a PUCCH corresponding to PUCCH format 0 to transmit specific UCI to the eNB. Only when transmitting a positive SR, the UE transmits a PUCCH corresponding to PUCCH format 0 within a PUCCH resource for the corresponding SR configuration.

PUCCH format 1 carries UCI having a size of up to 2 bits, and the modulation symbols therefor are spread by an orthogonal cover code (OCC) (configured differently depending on whether frequency hopping is performed) in the time domain. The DMRS is transmitted on a symbol on which a modulation symbol is not transmitted (namely, the DMRS is transmitted through time division multiplexing (TDM)).

PUCCH format 2 carries UCI having a bit size larger than 2 bits, and the modulation symbols are transmitted through frequency division multiplexing (FDM) with the DMRS. The DM-RS is positioned on symbol indexes #1, #4, #7 and #10 in a resource block given with a density of 1/3. A Pseudo Noise (PN) sequence is used for the DM_RS sequence. For two-symbol PUCCH format 2, frequency hopping may be enabled.

PUCCH format 3 is not subjected to UE multiplexing in the same physical resource block, but carries UCI having a bit size larger than 2 bits. In other words, the PUCCH resource of PUCCH format 3 does not include an OCC. The modulation symbols are transmitted through time division multiplexing (TDM) with the DMRS.

PUCCH format 4 supports multiplexing with up to 4 UEs in the same physical resource blocks and carries UCI having a bit size larger than 2 bits. In other words, the PUCCH resource of PUCCH format 3 includes an OCC. The modulation symbols are transmitted through time division multiplexing (TDM) with the DMRS.

The PUSCH carries uplink data (e.g., UL-SCH transport block (UL-SCH TB)) and/or uplink control information (UCI), and is transmitted based on a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE applies transform precoding to transmit the PUSCH. For example, when the transform precoding is not allowed (e.g., the transform precoding is disabled), the UE may transmit the PUSCH based on the CP-OFDM waveform. When the transform precoding is allowed (e.g., the transform precoding is enabled), the UE may transmit the PUSCH based on the CD-OFDM waveform or the DFT-s-OFDM waveform. PUSCH transmission may be dynamically scheduled by the UL grant in the DCI or semi-statically scheduled based on higher layer (e.g., RRC) signaling (and/or Layer 1 (L1) signaling (e.g., PDCCH)) (configured grant). The PUSCH transmission may be performed on a codebook basis or on a non-codebook basis.

Figure 4:
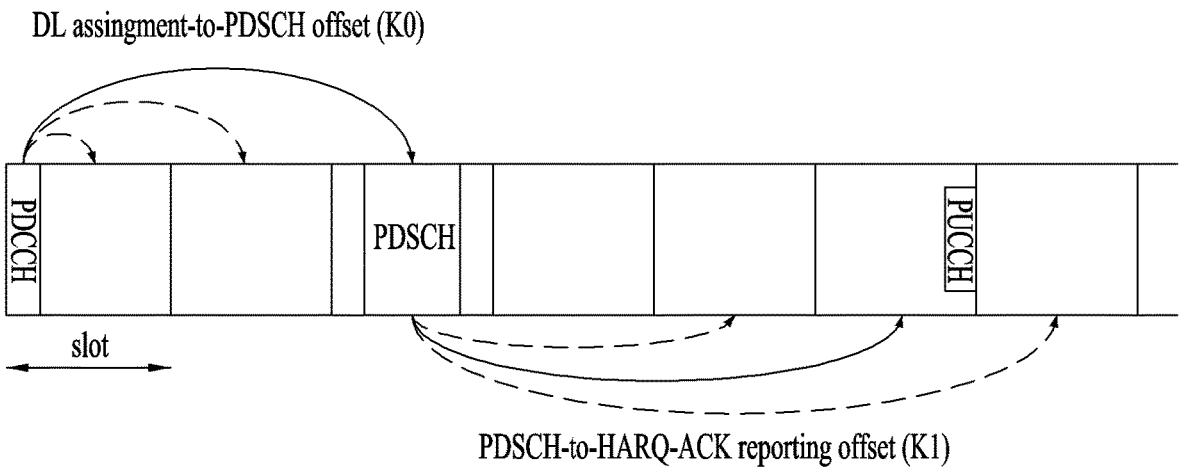
FIG. 4 illustrates an acknowledgement/negative acknowledgement (ACK/NACK) transmission procedure.

FIG. 4 illustrates an ACK/NACK transmission procedure. Referring to FIG. 4, the UE may detect a PDCCH in slot #n. Here, the PDCCH includes downlink scheduling information (e.g., DCI format 1_0 or 1_1). The PDCCH indicates a DL assignment-to-PDSCH offset (K0) and a PDSCH-HARQ-ACK reporting offset (K1). For example, DCI format 1_0 or 1_1 may include the following information.

Frequency domain resource assignment: Indicates an RB set assigned to the PDSCH.
Time domain resource assignment: Indicates K0 and the starting position (e.g. OFDM symbol index) and duration (e.g. the number of OFDM symbols) of the PDSCH in a slot.
PDSCH-to-HARQ_feedback timing indicator: Indicates K1.

After receiving the PDSCH in slot #(n+K0) according to the scheduling information of slot #n, the UE may transmit UCI on the PUCCH in slot #(n+K1). Here, the UCI includes a HARQ-ACK response to the PDSCH. In the case where the PDSCH is configured to transmit a maximum of one TB, the HARQ-ACK response may be configured in one bit. In the case where the PDSCH is configured to transmit a maximum of two TBs, the HARQ-ACK response may be configured in two bits if spatial bundling is not configured and may be configured in one bit if spatial bundling is configured. When slot #(n+K1) is designated as a HARQ-ACK transmission time for a plurality of PDSCHs, the UCI transmitted in slot #(n+K1) includes a HARQ-ACK response to the plurality of PDSCHs.

Figure 5:
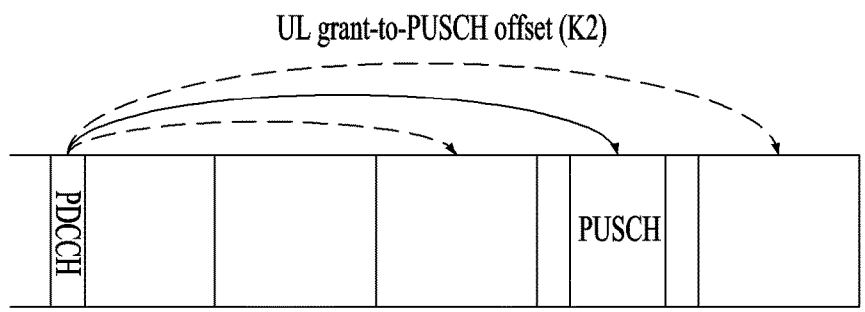
FIG. 5 illustrates an exemplary physical uplink shared channel (PUSCH) transmission procedure.

FIG. 5 illustrates an exemplary PUSCH transmission procedure. Referring to FIG. 5, a UE may detect a PDCCH in slot #n. The PDCCH may include UL scheduling information (e.g., DCI format 0_0, DCI format 0_1). DCI format 0_0 and DCI format 0_1 may include the following information.

Frequency domain resource assignment: this indicates an RB set allocated to a PUSCH.
Time domain resource assignment: this specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit the PUSCH in slot #(n+K2) according to the scheduling information in slot #n. The PUSCH includes a UL-SCH TB.

Figure 6:
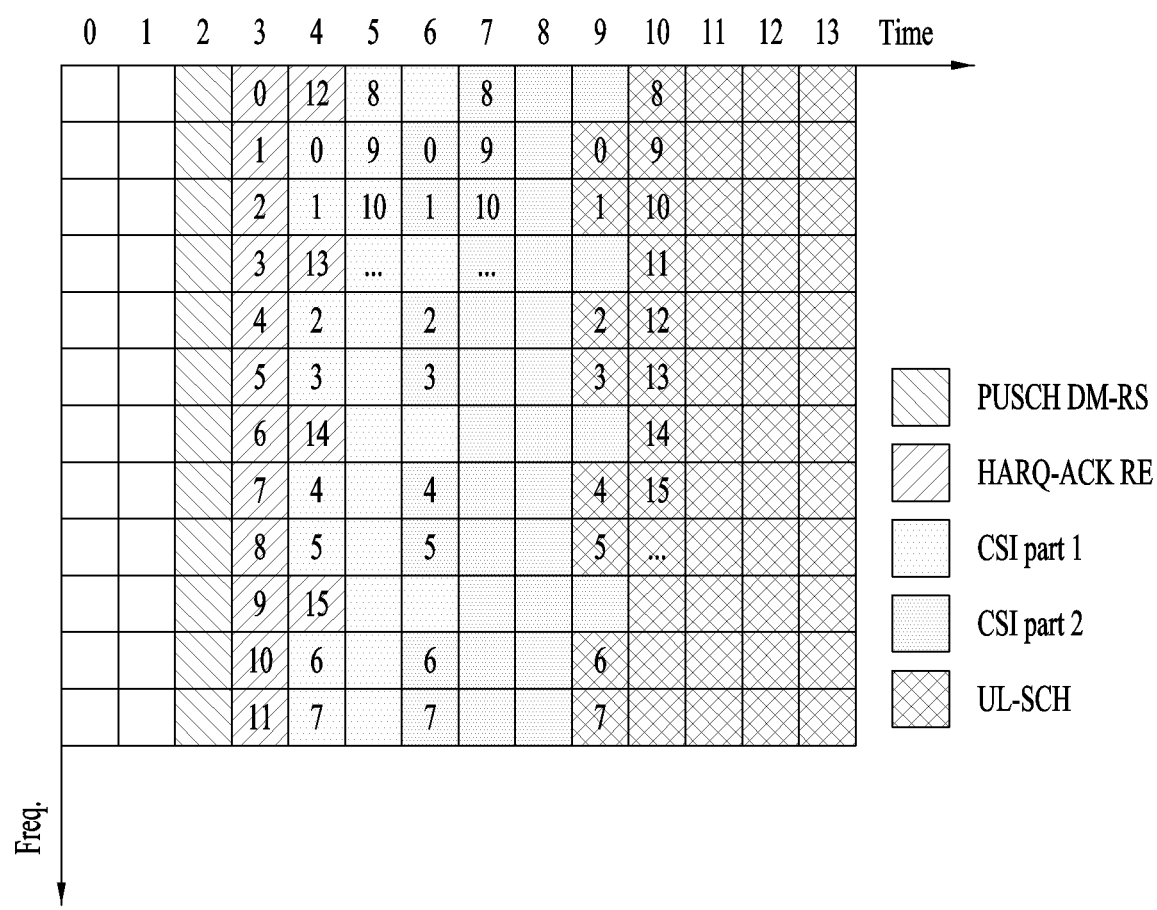
FIG. 6 illustrates exemplary multiplexing control information in a PUSCH.

FIG. 6 illustrates exemplary multiplexing of UCI in a PUSCH. If a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 8, an HARQ-ACK and CSI are carried in a PUSCH resource.

Embodiment: Multiplexing Between UL Channels

Deployment of a plurality of logical networks on a single physical network is under consideration in the NR system. The logical networks should be able to support services having various requirements (e.g., eMBB, mMTC, URLLC, etc.). Accordingly, the NR physical layer is designed so as to support a flexible transmission structure in consideration of requirements for various services. For example, the NR physical layer may change an OFDM symbol length (OFDM symbol duration) and a subcarrier spacing (SCS) (hereinafter, referred to as an OFDM numerology), when needed. Further, transmission resources of physical channels may be changed within a predetermined range (in symbols). In NR, for example, the transmission lengths/starting transmission times of a PUCCH (PUCCH resource) and a PUSCH (PUSCH resource) may be configured flexibly within a predetermined range.

In a wireless communication system including eNBs and UEs, when a UE transmits UCI on a PUCCH, a PUCCH resource may overlap with another PUSCH resource or a PUSCH resource. From the perspective of the same UE, for example, (1) a PUCCH (PUCCH resource) and another PUCCH (PUCCH resource) (for transmission of different UCIs) or (2) a PUCCH (PUCCH resource) and a PUSCH (PUSCH resource) may overlap with each other on the time axis (in the same slot). The UE may not support PUCCH-PUCCH simultaneous transmission or PUCCH-PUSCH simultaneous transmission (according to limited capabilities of the UE or configuration information received from an eNB). In this case, the UE may preferably multiplex and transmit (1) different UCIs or (2) UCI(s) and UL data, as much as possible. However, (1) a PUCCH (PUCCH resource) and another PUCCH (PUCCH resource) or (2) a PUCCH (PUCCH resource) and a PUSCH (PUSCH resource), which overlap with each other on the time axis (in a slot) may differ in transmission lengths (e.g., the numbers of symbols) and/or starting transmission times (e.g., starting symbols) in the NR system. Therefore, from the perspective of a processing time at the UE, the UE may have difficulty in multiplexing (1) different UCIs or (2) UCI(s) and UL data, for transmission. For example, a PUCCH carrying an acknowledgement/negative acknowledgement (A/N) (hereinafter, referred to as an A/N PUCCH) may (fully or partially) overlap with a PUCCH carrying an SR (hereinafter, referred to as an SR PUCCH) on the time axis. In this case, upon recognition of the existence of the A/N PUCCH overlapped with the SR PUCCH after the UE starts to transmit the SR PUCCH or completes preparation for transmission of the SR PUCCH, it may be difficult for the UE to multiplex and transmit the A/N and the SR in the A/N PUCCH.

In the existing NR system, if an A/N PUCCH resource fully overlaps with an SR PUCCH resource on the time axis (i.e., the transmission periods of an A/N PUCCH and an SR PUCCH coincide with each other), the following UCI multiplexing rule is applied according to the PUCCH format of the A/N PUCCH. Herein, a positive SR indicates the presence of UL data to be transmitted by a UE, and a negative SR indicates the absence of UL data to be transmitted by the UE.

(1) Case in which the A/N PUCCH is in PUCCH format 0.
  A. If the UCI state of an SR is positive SR,
    an A/N is transmitted in a resource resulting from applying a CS/OCC/PRB offset to an A/N PUCCH.
  B. If the UCI state of the SR is negative SR,
    the A/N is transmitted in an A/N PUCCH resource.
(2) Case in which the A/N PUCCH is in PUCCH format 1.
  A. If the UCI state of the SR is positive SR,
    the A/N is transmitted in an SR PUCCH resource.
  B. If the UCI state of the SR is negative SR,
    the A/N is transmitted in the A/N PUCCH resource.
(3) Case in which the A/N PUCCH is in one of PUCCH formats 2, 3 and 4.
  A. If the UCI state of the SR is positive SR or negative SR,
    UCI payload is generated by representing an SR by explicit bit(s) and appending the SR to the A/N, and the generated UCI is transmitted in the A/N PUCCH resource.

However, the conventional approach defines a UCI multiplexing scheme only for the case where an A/N PUCCH resource and an SR PUCCH resource fully overlap with each other on the time axis. Accordingly, there is a need for discussing a UCI multiplexing scheme in consideration of various scenarios, for efficient UCI transmission.

To address the above-described problem, an operation of multiplexing UCI and/or data in UL channel(s) overlapped with each other on the time axis is proposed in the present disclosure. Specifically, an operation of multiplexing UCI and/or data of UL channel(s) overlapped with each other on the time axis, taking into account the starting transmission time(s) and/or UE processing time(s) of the UL channel(s) is proposed in the present disclosure.

Terms as used herein are first defined as follows.
UCI: UL control information transmitted by a UE. The UCI includes multiple types of control information (i.e., UCI types). For example, the UCI may include HARQ-ACK (shortly, A/N or AN), SR, and CSI.
PUCCH: A physical UL channel carrying UCI. For the convenience, PUCCH resources configured and/or indicated for transmitting an A/N, an SR, and CSI by an eNB are referred to as an A/N PUCCH resource, an SR PUCCH resource, and a CSI PUCCH resource, respectively.
PUSCH: A physical UL channel carrying UL data.
UCI multiplexing: It may mean an operation of transmitting different UCIs (UCI types) on a common physical UL channel (e.g., a PUCCH or a PUSCH). UCI multiplexing may include multiplexing of different UCIs (UCI types). For the convenience, the multiplexed UCI is referred to as MUX UCI. Further, the UCI multiplexing may include an operation performed in relation to MUX UCI. For example, the UCI multiplexing may include a process of determining a UL channel resource to transmit MUX UCI.
UCI/data multiplexing: It may mean an operation of transmitting UCI and data on a common physical UL channel (e.g., PUSCH). UCI/data multiplexing may include an operation of multiplexing UCI with data. For the convenience, the multiplexed UCI is referred to as MUX UCI/Data. Further, UCI/data multiplexing may include an operation performed in relation to MUC UCI/Data. For example, the UCI/data multiplexing may include a process of determining UL channel resources to transmit MUX UCI/Data.
Slot: It is a basic time unit (TU) (or time interval) for data scheduling. A slot includes a plurality of symbols. Herein, a symbol may be an OFDM-based symbol (e.g., a CP-OFDM symbol or a DFT-s-OFDM symbol). In the present disclosure, the terms, symbol, OFDM-based symbol, OFDM symbol, CP-OFDM symbol, and DFT-s-OFDM symbol may be interchangeably used.
Overlapped UL channel resource(s): It means UL channel (e.g., PUCCH and PUSCH) resource(s) overlapped (at least partially) with each other on the time axis within a predetermined time period (e.g., slot). The overlapped UL channel resource(s) may mean UL channel resource(s) prior to UCI multiplexing.

The following PUCCH formats may be defined according to UCI payload sizes and/or transmission lengths (e.g., the numbers of symbols included in PUCCH resources). In regard to the PUCCH formats, Table 5 may also be referred to.
(0) PUCCH format 0 (PF0 or F0)
Supported UCI payload size: up to K bits (e.g., K=2)
Number of OFDM symbols in single PUCCH: 1 to X symbols (e.g., X=2)
Transmission structure: Only a UCI signal without DM-RS is included, and a UCI state is transmitted by selecting and transmitting one of a plurality of sequences.
(1) PUCCH format 1 (PF1 or F1)
Supported UCI payload size: up to K bits (e.g., K=2)
Number of OFDM symbols in single PUCCH: Y to Z symbols (e.g., Y=4 and Z=14)
Transmission structure: DM-RS and UCI are configured in TDM in different OFDM symbols, and the UCI is the product between a specific sequence and modulation symbols (e.g., QPSK symbols). CDM between a plurality of PUCCH resources (conforming to PUCCH format 1) (within the same RB) is supported by applying cyclic shifts (CSs)/orthogonal cover codes (OCCs) to both of the UCI and the DM-RS.

(2) PUCCH format 2 (PF2 or F2)

Supported UCI payload size: more than K bits (e.g., K=2)

Number of OFDM symbols in single PUCCH: 1 to X symbols (e.g., X=2)

Transmission structure: DM-RS and UCI are configured/mapped in FDM within the same symbol, and encoded UCI bits are subjected only to IFFT without DFT, for transmission.

(3) PUCCH format 3 (PF3 or F3)

Supported UCI payload size: more than K bits (e.g., K=2)

Number of OFDM symbols in single PUCCH: Y to Z symbols (e.g., Y=4 and Z=14)

Transmission structure: DM-RS and UCI are configured/mapped in TDM in different OFDM symbols, and encoded UCI bits are subjected to DFT, for transmission. Multiplexing between a plurality of UEs is supported by applying an OCC to the UCI and a CS (or IFDM mapping) to the DM-RS at the front end of DFT.

(4) PUCCH format 4 (PF4 or F4)

Supported UCI payload size: more than K bits (e.g., K=2)

Number of OFDM symbols in single PUCCH: Y to Z symbols (e.g., Y=4 and Z=14)

Transmission structure: DM-RS and UCI are configured/mapped in TDM in different OFDM symbols, and encoded UCI bits are subjected to DFT, without multiplexing between UEs.

A PUCCH resource may be determined on a UCI type basis (e.g., for each of A/N, SR, and CSI). A PUCCH resource used for UCI transmission may be determined based on the size of the UCI (UCI payload). For example, the eNB may configure a plurality of PUCCH resource sets for the UE, and the UE may select a specific PUCCH resource set corresponding to a specific range according to a range of UCI (UCI payload) sizes (e.g., numbers of UCI bits). For example, the UE may select one of the following PUCCH resource sets according to the number of UCI bits, $N_{UCI}$.

PUCCH resource set #0, if the number of UCI bits≤2

PUCCH resource set #1, if 2<the number of UCI bits≤$N_1$

. . .

PUCCH resource set #(K−1), if $N_{K-2}$<the number of UCI bits≤$N_{K-1}$

Herein, K represents the number of PUCCH resource sets (K>1), and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 5), If SR and CSI are given as UCI types, PUCCH resources to be used for UCI transmission in a PUCCH resource set may be configured by higher-layer signaling (e.g., RRC signaling). If HARQ-ACK for a semi-persistent scheduling (SPS) PDSCH is given as a UCI type, a PUCCH resource to be used for UCI transmission in a PUCCH resource set may be configured by higher-layer signaling (e.g., RRC signaling). On the other hand, if HARQ-ACK for a normal PDSCH (i.e., a PDSCH scheduled by DCI) is given as a UCI type, a PUCCH resource to be used for UCI transmission in a PUCCH resource set may be scheduled by DCI.

In the case of DCI-based PUCCH resource scheduling, the eNB may transmit DCI to the UE on a PDCCH, and indicate a PUCCH resource to be used for UCI transmission in a specific PUCCH resource set by an ACK/NACK resource indicator (ARI) in the DCI. The ARI is used to indicate a PUCCH resource for ACK/NACK transmission, also referred to as a PUCCH resource indicator (PRI). Herein, the DCI may be used for PDSCH scheduling, and the UCI may include an HARQ-ACK for a PDSCH. For the UE, the eNB may configure a PUCCH resource set including more PUCCH resources than states representable by the ARI by (UE-specific) higher-layer signaling (e.g., RRC signaling). The ARI may indicate a PUCCH resource subset of the PUCCH resource set, and which PUCCH resource in the indicated PUCCH resource subset to be used may be determined according to an implicit rule based on transmission resource information about a PDCCH (e.g., the starting CCE index of the PDCCH or the like).

Unless conflicting with each other, each of the following proposed methods may be applied in conjunction with other proposed methods.

PUCCH/PUCCH Multiplexing

[Proposed Method #1] an A/N PUCCH resource and an SR PUCCH resource may overlap with each other on the time axis (over all or part of the OFDM symbols of a PUCCH). In this case, the UE may determine whether to multiplex an A/N with a (positive) SR depending on whether an A/N PUCCH resource corresponding to (or indicated by) PDSCH(s) (and/or PDCCH(s)) which has been received (or of which the transmission has started) until a specific time (earlier than a reference time) overlaps with the SR PUCCH resource on the time axis.

However, if the UE does not multiplex the A/N with the (positive) SR, the UE may drop the transmission of one of the A/N and the (positive) SR.

For example, the UE may determine whether to multiplex the A/N with the (positive) SR depending on whether an A/N PUCCH resource corresponding to (or indicated by) PDSCH(s) (and/or PDCCH(s)) which has been received (or of which the transmission has started) until a time Tref,sr earlier than the starting transmission time (e.g., starting symbol) Tsr of the SR PUCCH by $T_0$ overlaps with the SR PUCCH resource on the time axis. Tref,sr may be defined as Tref,sr=Tsr−$T_0$ and represented in OFDM symbols.

(Case 1) If the A/N PUCCH resource corresponding to (or indicated by) the PDSCH(s) (and/or PDCCH(s)) which has been received (or of which the transmission has started) until Tref,sr overlaps with the SR PUCCH resource on the time axis, the UE may multiplex the A/N with the (positive) SR and transmit the multiplexed A/N and (positive) SR (or the UE may follow the UCI multiplexing rule applied to the case where an A/N PUCCH and an SR PUCCH overlap with each other over all symbols of a PUCCH on the time axis).

(1) The A/N PUCCH is in PUCCH format 0.

A. If the UCI state of the SR is positive SR,
the A/N is transmitted in a resource resulting from applying a CS/OCC/PRB offset to the A/N PUCCH.

B. If the UCI state of an SR is negative SR,
the A/N is transmitted in the A/N PUCCH resource.

(2) The A/N PUCCH is in PUCCH format 1.

A. If the UCI state of the SR is positive SR,
the A/N is transmitted in the SR PUCCH resource. However, if the SR PUCCH is in PUCCH format 0, only the A/N may be transmitted, while the SR transmission is dropped.

B. If the UCI state of the SR is negative SR,
the A/N is transmitted in the A/N PUCCH resource.

(3) The A/N PUCCH is in one of PUCCH formats 2, 3 and 4.

A. If the UCI state of the SR is positive SR or negative SR,

UCI payload is generated by representing the SR in explicit bit(s) and appending the SR to the A/N, and the generated UCI is transmitted in the A/N resource.

(Case 2) In any other case than (Case 1), the UE may select and transmit one of the A/N and the (positive) SR. For example, (i) if an A/N PUCCH resource corresponding to (or indicated by) PDSCH(s) (and/or PDCCH(s)) which has been received (or of which the transmission has started/ended) after Tref,sr overlaps with the SR PUCCH resource on the time axis, (ii) if an A/N PUCCH resource corresponding to (or indicated by) the PDSCH(s) (and/or PDCCH(s)) which has been received (or of which the transmission has started) until Tref,sr does not overlap with the SR PUCCH resource on the time axis, or (iii) if there is no A/N PUCCH resource corresponding to (or indicated by) the PDSCH(s) (and/or PDCCH(s)) which has been received (or of which the transmission has started) until Tref,sr, the UE may select and transmit one of the A/N and the (positive) SR.

(1) If the UCI state of the SR is positive SR,
the SR is transmitted in the SR PUCCH resource (the A/N transmission is dropped).
(2) If the UCI state of the SR is negative SR,
the A/N is transmitted in the A/N PUCCH resource.

To may be one of the following values. To may be represented in (OFDM) symbols.

(1) A UE processing time required to transmit an A/N (PUCCH) corresponding to a PDSCH after the PDSCH is received, according to a UE capability, and a value corresponding to the UE processing time.

(2) A UE processing time required to transmit an A/N (PUCCH) indicated by a PDCCH after the PDCCH is received, according to a UE capability, and a value corresponding to the UE processing time.

(3) A UE processing time required for demodulation according to a UE capability or a value corresponding to the UE processing time.

(4) A value configured by higher-layer signaling (e.g., RRC signaling) and/or DCI.

(5) A value preset between an eNB and a UE (e.g., a fixed value).

[Proposed method #1] may also be extended to any other PUCCH than the A/N PUCCH.

In the NR system, if the starting (OFDM) symbols (or starting times) of an A/N PUCCH and an SR PUCCH coincide with each other, a UE operation of applying the UCI multiplexing rule configured for the case in which an A/N PUCCH and an SR PUCCH fully overlap with each other has been agreed on. On the other hand, if the starting (OFDM) symbols (or starting times) of an A/N PUCCH and an SR PUCCH are different, a method of determining whether to multiplex an A/N with an SR by comparing the A/N PUCCH with the SR PUCCH in terms of their starting (OFDM) symbols (or starting times) has been discussed. For example, if the starting (OFDM) symbol of the SR PUCCH is earlier than the starting (OFDM) symbol of the A/N PUCCH, the UE may transmit the SR PUCCH, dropping the A/N transmission. On the contrary, if the starting (OFDM) symbol of the SR PUCCH is later than the starting (OFDM) symbol of the A/N PUCCH, the UE may UCI-multiplex the SR and the A/N and transmit the multiplexed SR and A/N on a single PUCCH. It seems that this operation has been proposed in that if the UE is aware of the presence of the A/N transmission after preparing for the SR transmission (or during the SR transmission), an operation of UCI-multiplexing the A/N and the SR and transmitting the multiplexed A/N and SR, while canceling the SR transmission is difficult in terms of UE implementation. However, even though the starting (OFDM) symbol of the SR PUCCH is earlier than the starting (OFDM) symbol of the A/N PUCCH, if a PDSCH (and/or a PDCCH) corresponding to the A/N PUCCH has been received much earlier, the UE may transmit the A/N and the SR through UCI multiplexing. Therefore, the conventional method is not preferable in that even a UE capable of UCI-multiplexing an A/N and an SR in terms of a UE processing time drops the A/N transmission.

Therefore, to support multiplexing between an A/N and an SR, a time point based on which the UE may determine whether to transmit (i) SR only or (ii) the SR and the A/N through multiplexing may be clearly indicated to the UE. For example, if a A/N PUCCH resource for PDSCH(s) (and/or PDCCH(s)) received until a time Tref,sr earlier than the starting transmission time Tsr of a specific SR PUCCH by $T_0$ does not overlap with an SR PUCCH resource on the time axis, the UE may determine to transmit the SR PUCCH, if the SR is a positive SR. Herein, even though an A/N PUCCH resource for PDSCH(s) (and/or PDCCH(s)) received after Tref,sr overlaps with the SR PUCCH resource on the time axis, the UE may transmit the SR PUCCH, dropping the A/N transmission. On the other hand, if the A/N PUCCH resource for the PDSCH(s) (and/or the PDCCH(s)) received until Tref,sr overlaps with the SR PUCCH resource on the time axis, (i) when SR information is a positive SR, the UE may UCI-multiplex the A/N and the SR and transmit the multiplexed A/N and SR in a single PUCCH resource, and (ii) when the SR information is a negative SR, the UE may transmit only the A/N on the A/N PUCCH or may append explicit bit(s) representing the negative SR to the A/N and transmit the A/N appended with the explicit bit(s) on the A/N PUCCH.

Even though the A/N PUCCH resource is updated later not to overlap with the SR PUCCH, since the UE has already determined to UCI-multiplex the A/N and the SR, the UE may still transmit UCI-multiplexed A/N and SR in a single PUCCH resource, without cancelling the determination.

Figure 7:
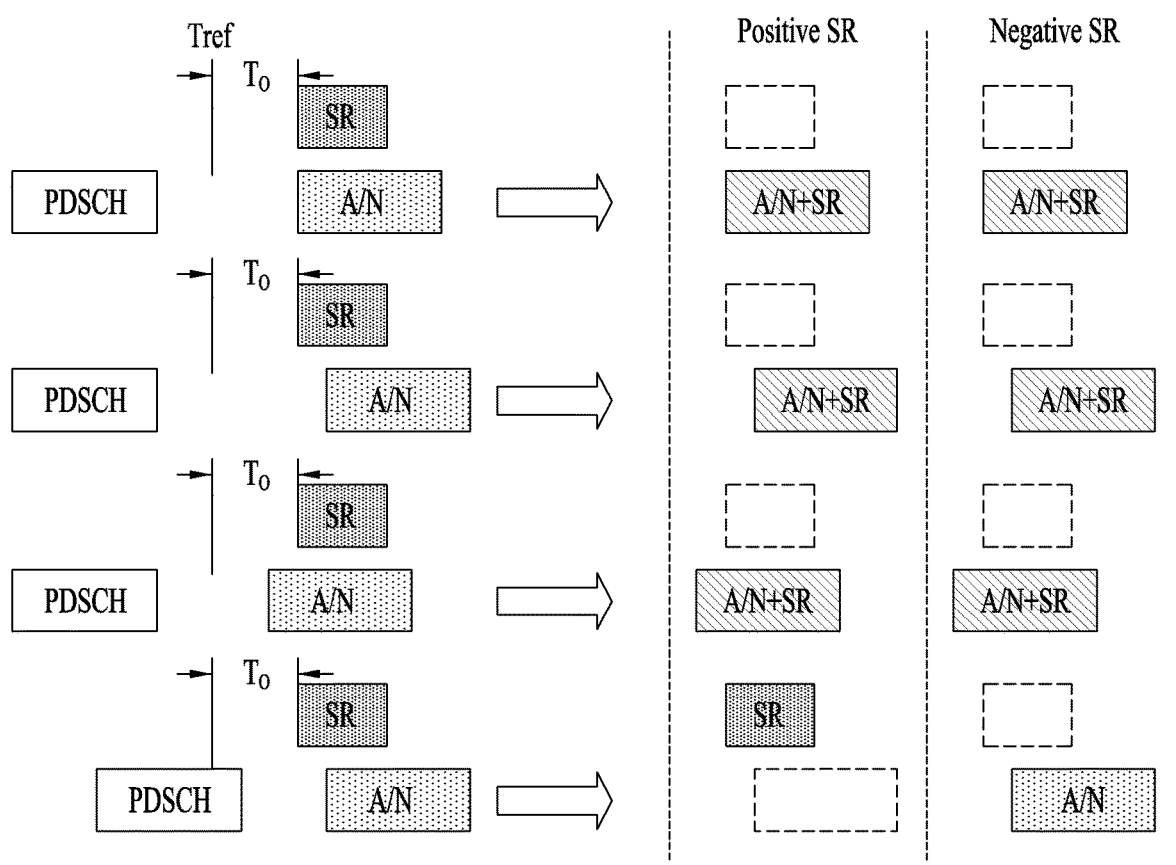
FIGS. 7 to 15 illustrate exemplary signal transmissions according to the present disclosure.
Figure 8:
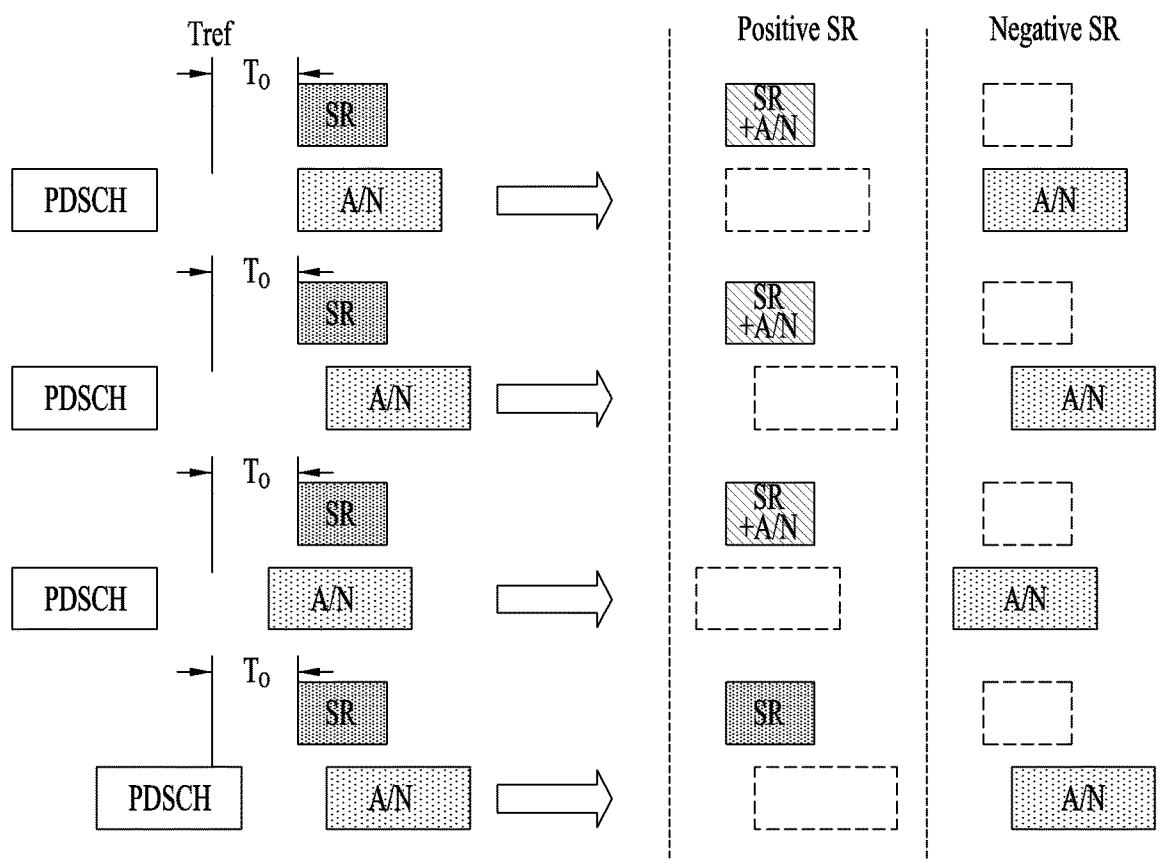

FIG. 7 illustrates an exemplary operation for an A/N PUCCH of PUCCH formats 0/2/3/4. FIG. 8 illustrates an exemplary operation for an A/N PUCCH of PUCCH format 1.

[Proposed method #1] is based on the assumption that the UE is capable of identifying the presence or absence of an A/N PUCCH corresponding to PDSCH(s) (and/or PDCCH(s)) terminated/received before Tref,sr (i.e., Tsr–To), before determining to transmit an SR PUCCH. That is, in [proposed method #1], it is considered that the UE has difficulty in identifying the presence or absence of an A/N PUCCH corresponding to PDSCH(s) (and/or PDCCH(s)) terminated/received after Tref,sr, before the UE determines to transmit the SR PUCCH, and thus the presence or absence of the A/N PUCCH is not taken into account in determining whether the A/N and the SR are to be multiplexed. According to [proposed method #1], if an A/N PUCCH resource for PDSCH(s) (and/or PDCCH(s)) terminated/received before Tref,sr overlaps with an SR PUCCH resource on the time axis, the UE may multiplex an A/N with an SR and transmit the multiplexed A/N and SR. If the A/N PUCCH does not exist or does not overlap with the SR PUCCH on the time axis, the UE may transmit the SR only, which facilitates UE implementation. Further, multiplexing between an A/N and an SR is allowed in most cases, and thus dropping of A/N or SR transmissions may be reduced in [proposed method #1]. Further, [proposed method #1] is advantageous in that even when an A/N and an SR are multiplexed and transmitted on an SR PUCCH (e.g., both of an A/N PUCCH and the SR PUCCH are in F1), a minimum PDSCH-to-HARQ-ACK transmission processing time is guaranteed for A/N transmission, thus offering a unified solution. If a plurality of SR PUCCHs distinguishable from each other are configured in one slot, the UE may determine for an earlier SR PUCCH whether the SR PUCCH can be multiplexed with an A/N, and if the A/N transmission is not to be dropped, determine for the next SR PUCCH whether the SR PUCCH can be multiplexed with the A/N. In this manner, the UE may sequentially perform the foregoing operation.

In a modification to [proposed method #1], if an A/N PUCCH corresponding to PDSCH(s) (and/or PDCCH(s)) of which the transmission has started until Tref,sr (i.e., Tsr−To) overlaps with an SR PUCCH, an A/N may be multiplexed with an SR. Otherwise, only the SR may be transmitted. This operation is based on the assumption that if the starting transmission time of the PDSCH (and/or PDCCH(s)) (corresponding to the A/N PUCCH) is earlier than (or coincides with) Tref,sr, the UE has a sufficient time for detecting and demodulating a PDCCH (e.g., a DL assignment) corresponding to the PDSCH and thus is capable of identifying the presence of the A/N PUCCH colliding with the SR PUCCH before determining to transmit the SR PUCCH. Therefore, If the starting transmission time of the PDSCH (and/or PDCCH(s)) (corresponding to the A/N PUCCH) is later than Tref,sr, the UE does not have a sufficient time for detecting and demodulating the PDCCH (e.g., the DL assignment) corresponding to the PDSCH and thus does not take the PDSCH(s) into account in determining whether to multiplex the A/N and the SR.

In a modification to [proposed method #1], if an A/N PUCCH resource and an SR PUCCH resource which are to be transmitted by the UE overlap with each other (over part of the OFDM symbols of a PUCCH) on the time axis, it may be determined whether to multiplex an A/N and an SR according to a relative relationship between the ending (or starting) transmission time of PDSCH(s) (and/or PDCCH(s)) corresponding to the A/N PUCCH resource and the starting transmission time of an SR PUCCH.

However, if the UE does not multiplex the A/N and the (positive) SR, the UE may drop transmission of one of the A/N and the (positive) SR.

For example, the UE may determine whether to multiplex the A/N and the (positive) SR according to whether the ending (or starting) transmission time of the PDSCH(s) (and/or PDCCH(s)) (corresponding to the A/N PUCCH resource) is earlier/later than Tref,sr (i.e., Tsr−To), in the following manner.

(1) If the ending (or starting) transmission time of the PDSCH(s) (and/or PDCCH(s)) (corresponding to the A/N PUCCH resource) is later than Tref,sr, A. one of the A/N and the (positive) SR is selected and transmitted.

i. If the UCI state of the SR is positive SR, 1. the SR is transmitted in the SR PUCCH resource (the A/N transmission is dropped).

ii. If the UCI state of the SR is negative SR, 1. the A/N is transmitted in the A/N PUCCH resource.

(2) If the ending (or starting) transmission time of the PDSCH(s) (and/or PDCCH(s)) (corresponding to the A/N PUCCH resource) is earlier than (or coincides with Tref,sr, A. the A/N and the (positive) SR are multiplexed and transmitted (or the UCI multiplexing rule applied to the case where an A/N PUCCH and an SR PUCCH fully overlap with each other over all OFDM symbols of a PUCCH is followed).

i. Case in which the A/N PUCCH is in PUCCH format 0.

1. If the UCI state of the SR is positive SR, the A/N is transmitted in a resource resulting from applying a CS/OCC/PRB offset to the A/N PUCCH.

2. If the UCI state of the SR is negative SR, the A/N is transmitted in the A/N PUCCH resource.

ii. Case in which the A/N PUCCH is in PUCCH format 1.

1. If the UCI state of the SR is positive SR, the A/N is transmitted in the SR resource. However, if the SR PUCCH is in PUCCH format 0, only the A/N may be transmitted, while the SR transmission is dropped.

2. If the UCI state of the SR is negative SR, the A/N is transmitted in the A/N PUCCH resource.

iii. Case in which the A/N PUCCH is in one of PUCCH formats 2, 3 and 4.

1. If the UCI state of the SR is positive SR or negative SR, UCI payload is generated by representing the SR in explicit bit(s) and appending the SR to the A/N, and then the generated UCI is transmitted in the A/N PUCCH resource.

To may be one of the following values, and represented in (OFDM) symbols.

(1) A UE processing time required to transmit an A/N (PUCCH) corresponding to a PDSCH after the PDSCH is received, according to a UE capability, and a value corresponding to the UE processing time.

(2) A UE processing time required to transmit an A/N (PUCCH) indicated by a PDCCH after the PDCCH is received, according to a UE capability, and a value corresponding to the UE processing time.

(3) A UE processing time required for demodulation according to a UE capability or a value corresponding to the UE processing time.

(4) A value configured by higher-layer signaling (e.g., RRC signaling) and/or DCI.

(5) A value preset between an eNB and a UE (e.g., a fixed value).

In a modification to [proposed method #1], the following operation may be performed for UCI multiplexing between an A/N and CSI, similarly to UCI multiplexing between an A/N and an SR. For example, an A/N PUCCH resource and a CSI PUCCH resource may overlap with each other (over all or part of the OFDM symbols of a PUCCH) on the time axis. In this case, the UE may determine whether to multiplex between an A/N and CSI depending on whether an A/N PUCCH resource corresponding to (or indicated by) PDSCH(s) and/or PDCCH(s)) which has been received (or of which the transmission has started) until a specific time (earlier than a reference time)) overlaps with a CSI PUCCH resource on the time axis.

However, if the UE does not multiplex the A/N with the CSI, the UE may drop transmission of one of the A/N and the CSI.

For example, the UE may determine whether to multiplex the A/N and the CSI depending on whether an A/N PUCCH resource corresponding to (or indicated by) PDSCH(s) and/or PDCCH(s)) which has been received (or of which the transmission has started) until a time Tref,csi earlier than the starting transmission time (e.g., starting symbol) Tcsi of a CSI PUCCH by $T_0$ overlaps with the CSI PUCCH resource on the time axis. Tref,csi may be defined as Tref,csi=Tcsi−$T_0$ and represented in OFDM symbols. Tref,csi may be defined as Tref,csi=Tcsi−$T_0$ and represented in OFDM symbols.

(Case 1) If the A/N PUCCH resource corresponding to (or indicated by) the PDSCH(s) (and/or PDCCH(s)) which has been received (or of which the transmission has started) until Tref,csi overlaps with the CSI PUCCH resource on the time axis, the UE may multiplex the A/N and the CSI and transmit the multiplexed A/N and CSI.

(1) If the A/N PUCCH is indicated by a DL assignment, the A/N and the CSI are multiplexed and transmitted in the A/N PUCCH resource.

(2) If the A/N PUCCH is not indicated by a DL assignment, the A/N and the CSI are multiplexed and transmitted in the CSI PUCCH resource.

(Case 2) In any other case than (Case 1), the UE may select and transmit one of the A/N and the CSI. For example, (i) if an A/N PUCCH resource corresponding to (or indicated by) PDSCH(s) (and/or PDCCH(s)) which has been received (or of which the transmission has started/ended) after Tref,csi overlaps with the CSI PUCCH resource on the time axis, (ii) if an A/N PUCCH resource corresponding to (indicated by) PDSCH(s) (and/or PDCCH(s)) which has been received (or of which the transmission has started) until Tref,csi does not overlap with the CSI PUCCH resource on the time axis, or (iii) if there is no A/N PUCCH resource corresponding to (or indicated) by the PDSCH(s) and/or PDCCH(s)) which has been received (or of which the transmission has started) until Tref,csi, the UE may select and transmit one of the A/N and the CSI.

(1) Opt. 1: The CSI is transmitted in the CSI PUCCH resource (the A/N transmission is dropped).

(2) Opt. 2: The A/N is transmitted in the A/N PUCCH resource (the CSI transmission is dropped).

To may be one of the following values. To may be represented in (OFDM) symbols.

(1) A UE processing time required to transmit an A/N (PUCCH) corresponding to a PDSCH after the PDSCH is received, according to a UE capability, and a value corresponding to the UE processing time.

(2) A UE processing time required to transmit an A/N (PUCCH) indicated by a PDCCH after the PDCCH is received, according to a UE capability, and a value corresponding to the UE processing time.

(3) A UE processing time required for demodulation according to a UE capability or a value corresponding to the UE processing time.

(4) A value configured by higher-layer signaling (e.g., RRC signaling) and/or DCI.

(5) A value preset between an eNB and a UE (e.g., a fixed value).

[Proposed Method #1A] If PUCCH resources for transmission configured/indicated for/to the UE overlap with each other over all or part of OFDM symbols on the time axis in a slot, the UE performs UCI multiplexing according to the following UCI multiplexing rule.

(1) If the overlapped PUCCH resources in the slot satisfy all or part of the following conditions, the UE multiplexes and transmits UCIs for the overlapped PUCCH resources in a single PUCCH resource (hereinafter, referred to as MUX PUCCH).

A. Condition #1 i. Opt. 1: On the assumption that the UCIs for the overlapped PUCCH resources in the slot are multiplexed (if there is a PUCCH resource for HARQ-ACK transmission in the overlapped PUCCH resources in the slot), the first (OFDM) symbol of the (single) PUCCH resource to carry the multiplexed UCI starts after $T_1$ from the last (OFDM) symbol of (each of) PDSCH(s) corresponding to an HARQ-ACK and/or SPS PDSCH release(s).

ii. Opt. 2: (If there is a PUCCH resource for HARQ-ACK transmission in the overlapped PUCCH resources in the slot), the first (OFDM) symbol of the slot (or the first (OFDM) symbol allowed for UL transmission in the slot) starts after $T_1$ from the last (OFDM) symbol of (each of) PDSCH(s) corresponding to an HARQ-ACK (or SPS PDSCH release(s)).

iii. Opt. 3: On the assumption that the UCIs for the overlapped PUCCH resources in the slot are multiplexed (if there is a PUCCH resource for HARQ-ACK transmission in the overlapped PUCCH resources in the slot), the first (OFDM) symbol of the (time-axis) earliest of the (single) PUCCH resource to carry the multiplexed UCI and the overlapped PUCCH resources in the slot starts after $T_1$ from the last (OFDM) symbol of (each of) PDSCH(s) corresponding to an HARQ-ACK (or the SPS PDSCH release(s)).

iv. Opt. 4: On the assumption that the UCIs for the overlapped PUCCH resources in the slot are multiplexed (if there is a PUCCH resource for HARQ-ACK transmission in the overlapped PUCCH resources in the slot), the first (OFDM) symbol of the (time-axis) earliest of the (single) PUCCH resource to carry the multiplexed UCI and overlapped CSI resource(s) in the slot starts after $T_1$ from the last (OFDM) symbol of (each of) PDSCH(s) corresponding to an HARQ-ACK (or the SPS PDSCH release(s)).

v. Opt. 5: (If there is a PUCCH resource for HARQ-ACK transmission in the overlapped PUCCH resources in the slot), the first (OFDM) symbol of the (time-axis) earliest of (all) PUCCH resource(s) for any UCI combination/UCI payload in the slot, configured for the UE starts after $T_1$ from the last (OFDM) symbol of (each of) PDSCH(s) corresponding to an HARQ-ACK (or SPS PDSCH release(s)).

B. Condition #2 i. Opt. 1: On the assumption that the UCIs for the overlapped PUCCH resources in the slot are multiplexed (if there is a PUCCH resource for transmission, indicated by DCI among the overlapped PUCCH resources in the slot), the first (OFDM) symbol of the (time-axis) earliest of a (single) PUCCH resource selected according to a specific rule and the overlapped PUCCH resources in the slot starts after $T_2$ from the last (OFDM) symbol of the (scheduling) DCI.

ii. Opt. 2: (If there is a PUCCH resource for transmission, indicated by DCI among the overlapped PUCCH resources in the slot,) the first (OFDM) symbol of the (time-axis) earliest of the overlapped PUCCH resources in the slot starts after $T_2$ from the last (OFDM) symbol of the (scheduling) DCI.

iii. Opt. 3: (If there is a PUCCH resource for transmission, indicated by DCI among the overlapped PUCCH resources in the slot,) the first (OFDM) symbol of the (time-axis) earliest of (all) PUCCH resource(s) for any UCI combination/UCI payload in the slot, configured for the UE starts after T2 from the last (OFDM) symbol of the (scheduling) DCI.

iv. Opt. 4: (If there is a PUCCH resource for transmission, indicated by DCI among the overlapped PUCCH resources in the slot,), the first (OFDM) symbol of the slot (or the first (OFDM) symbol allowed for UL transmission in the slot) starts after T2 from the last (OFDM) symbol of the (scheduling) DCI.

Herein, a (scheduling) DCI-based PUCCH resource may be a PUCCH resource carrying an HARQ-ACK, allocated by DCI. The last symbol of DCI may be the last symbol in which a PDCCH carrying the DCI is transmitted.

(2) If (part of) the overlapped PUCCH resources in the slot do not satisfy the above condition(s), the UE may perform the following operations.

A. Opt. 1: The UE does not expect the case of (2). If the case of (2) occurs, the UE operates according to UE implementation.

B. Opt. 2: The UE multiplexes UCI(s) for the remaining PUCCH resource(s) satisfying the condition(s) in (1) and transmits the multiplexed UCI in a single PUCCH resource, while dropping transmission of UCI(s) for (some) PUCCH resource(s) failing to satisfy the condition(s) in (1).

C. Opt. 3: The UE drops transmission of the PUCCH resource(s) in the slot.

D. Opt. 4: The UE transmits only a specific (one) PUCCH resource (among the overlapped PUCCH resources in the slot) (e.g., a PUCCH resource carrying UCI of a highest priority or an earliest PUCCH resource on the time axis), while dropping transmission of the other PUCCH resources.

However, on the assumption that UCIs for overlapped PUCCH resources (of which the transmission is indicated by higher-layer signaling (e.g., RRC signaling) and/or DCI) in a slot are multiplexed, a new (single) PUCCH resource (MUX PUCCH) to carry the multiplexed UCI may be determined according to a specific rule which is set based on a UCI combination (to be multiplexed), a (total) UCI payload size, and so on.

$T_1$ may be a value corresponding to a UE processing time required to transmit an HARQ-ACK after the UE receives a PDSCH. Further, T2 is a value corresponding to a UE processing time required to perform UL transmission after the UE receives (scheduling) DCI. $T_1$ and $T_2$ may be represented in (OFDM) symbols.

When the UE determines whether to multiplex UCIs between PUCCH resources overlapped on the time axis, the UE may consider at least two timeline conditions. Timeline condition #1 is intended to ensure a UE processing time from PDSCH reception until HARQ-ACK transmission. Timeline condition #1 aims to allow transmission of an HARQ-ACK after a predetermined time $T_1$ from the last (OFDM) symbol of PDSCH(s) corresponding to the HARQ-ACK. Therefore, the condition based on $T_1$ should be applied based on a UL resource carrying the HARQ-ACK. If overlapped UCIs are multiplexed, the condition based on $T_1$ may be applied between the starting time of a PUCCH resource determined (according to a specific rule) and the last (OFDM) symbol of PDSCH(s) corresponding to an HARQ-ACK. Timeline condition #2 is intended to ensure a UE processing time from PDCCH reception until UL transmission. Timeline condition #2 aims to allow UL transmission after $T_2$ from the last (OFDM) symbol of PDCCH(s) (which schedules the UL transmission on one or more of the overlapped PUCCH(s)). Timeline condition #2 also aims to indicate whether any UL transmission is scheduled before $T_2$ from the start of the UL transmission. Therefore, the PDCCH(s) (which schedules the UL transmission on one or more of the overlapped PUCCH(s)) should be completely received before $T_2$ from the earliest UL resource among the overlapped PUCCH resource(s). That is, timeline condition #2 may be a condition for starting the first (OFDM) symbol of the (time-domain) earliest of the overlapped PUCCH resources in the slot (and a (single) PUCCH resource selected according to a specific rule on the assumption that UCIs are multiplexed) after $T_2$ from the last (OFDM) symbol of (scheduling) DCI.

[Proposed Method #1B] If PUCCH resource(s) and PUSCH resource(s) configured/indicated for/to a UE overlap with each other over all or part of OFDM symbols on the time axis in a slot, the UE performs UCI multiplexing according to the following UCI multiplexing rule.

(1) If the PUCCH resource(s) and PUSCH resource(s) overlapped in the slot satisfy all or part of the following conditions, the UE multiplexes UCI(s) and UL-SCH TB(s) for the overlapped PUCCH resource(s) and PUSCH resource(s) and transmits the multiplexed UCI and UL-SCH in a single PUSCH resource (hereinafter, referred to as MUX PUSCH).

A. Condition #1 i. Opt. 1: if UCI(s) for the overlapped PUCCH resource(s) in the slot is multiplexed (if there is a PUCCH resource for HARQ-ACK transmission among the overlapped PUCCH resource(s) in the slot,) the first (OFDM) symbol of a (single) PUSCH resource to carry the multiplexed UCI starts after $T_1$ from the last (OFDM) symbol of (each of) PDSCH(s) for an HARQ-ACK and/or SPS PDSCH release(s).

ii. Opt. 2: (If there is a PUCCH resource for HARQ-ACK transmission among the overlapped PUCCH resource(s) in the slot,) the first (OFDM) symbol of the slot (or the first (OFDM) symbol allowed for UL transmission in the slot) of the slot starts after $T_1$ from the last (OFDM) symbol of (each of) PDSCH(s) corresponding to an HARQ-ACK (or SPS PDSCH release(s)).

iii. Opt. 3: (If there is a PUCCH resource for HARQ-ACK transmission among the overlapped PUCCH resource(s) in the slot,) the first (OFDM) symbol of the (time-axis) earliest of the overlapped PUCCH resource(s) and PUSCH resource(s) in the slot starts after $T_1$ from the last (OFDM) symbol of (each of) PDSCH(s) corresponding to an HARQ-ACK (or SPS PDSCH release(s)).

iv. Opt. 4: (Ife there is a PUCCH resource for HARQ-ACK transmission among the overlapped PUCCH resource(s) in the slot,) the first (OFDM) symbol of the (time-axis) earliest UL transmission resource of (all) PUCCH resource(s) configured for any UCI combination/UCI payload for the UE in the slot and (all) PUSCH resource(s) in the slot starts after $T_1$ from the last (OFDM) symbol of (each of) PDSCH(s) corresponding to an HARQ-ACK (or SPS PDSCH release(s)).

B. Condition #2 i. Opt. 1: (If there is a PUCCH resource for transmission, indicated by DCI, among the overlapped PUCCH resource(s) in the slot,) the first (OFDM) symbol of the (time-axis) earliest UL transmission resource among the overlapped PUCCH resource(s) and PUSCH resource(s) in the slot starts after $T_2$ from the last (OFDM) symbol of the (scheduling) DCI.

ii. Opt. 2: (If there is a PUCCH resource for transmission, indicated by DCI, among the overlapped PUCCH resource(s) in the slot,) the first (OFDM) symbol of the (time-axis) earliest UL transmission resource among (all) PUCCH resource(s) and (all) PUSCH resource(s) configured for any UCI combination/UCI payload in the slot, for the UE starts after $T_2$ from the last (OFDM) symbol of the (scheduling) DCI.

iii. Opt. 3: (If there is a PUCCH resource for transmission, indicated by DCI, among the overlapped PUCCH resource(s) in the slot,) the first (OFDM) symbol of the slot (or the first (OFDM) symbol allowed for UL transmission in the slot) starts after $T_2$ from the last (OFDM) symbol of the (scheduling) DCI.

Herein, a (scheduling) DCI-based PUCCH resource may be a PUCCH resource carrying an HARQ-ACK, allocated by DCI. The last symbol of DCI may be the last symbol in which a PDCCH carrying the DCI is transmitted.

(2) If (part of) the overlapped PUCCH resource(s) and/or (part) of PUSCH resource(s) in the slot do not satisfy the above condition(s), the UE may perform the following operations.

A. Opt. 1: The UE does not expect the case of (2). If the case of (2) occurs, the UE operates according to UE implementation.

B. Opt. 2: The UE drops transmission of UCI(s) corresponding to (part) of the PUCCH resource(s) and/or transmission of a UL-SCH TB corresponding to (part) of the PUSCH resource(s), which do not satisfy the condition(s) of (1). On the other hand, the UE multiplexes UCI(s) and/or UL-SCH(s) for the remaining PUCCH resource(s) and/or the remaining PUSCH resource(s), which satisfy the condition(s) of (1), and transmits the multiplexed UCI and UL-SCH in a single PUCCH resource, or a single PUSCH resource (if there is any overlapped PUSCH resource satisfying the condition(s) of (1)).

C. Opt. 3: Transmission of the overlapped PUCCH resource(s) and/or PUSCH resource(s) in the slot is dropped.

D. Opt. 4: Only a specific (one) PUCCH or PUSCH resource (e.g., a UL resource carrying UCI of a highest priority or an earliest UL resource on the time axis) (among the overlapped PUCCH resource(s) and/or PUSCH resource(s) in the slot) is transmitted, while transmission of the other PUCCH or PUSCH resources is dropped.

However, on the assumption that UCI(s) for overlapped PUCCH resource(s) (of which the transmission is indicated by higher-layer signaling (e.g., RRC signaling) and/or DCI) in a slot is multiplexed, a new (single) PUCCH resource (MUX PUCCH) to carry the multiplexed UCI may be determined according to a specific rule determined based on a UCI combination (to be multiplexed), a (total) UCI payload size, and so on.

$T_1$ may be a value corresponding to a UE processing time required to transmit an HARQ-ACK after the UE receives a PDSCH. Further, $T_2$ is a value corresponding to a UE processing time required to perform UL transmission after the UE receives (scheduling) DCI. $T_1$ and $T_2$ may be represented in (OFDM) symbols.

When the UE determines whether to multiplex UCI between PUCCH resource(s) and PUSCH resource(s) overlapped on the time axis, the UE may consider at least two timeline conditions. Timeline condition #1 is intended to ensure a UE processing time from PDSCH reception until HARQ-ACK transmission. Timeline condition #1 aims to allow transmission of an HARQ-ACK after a predetermined time $T_1$ from the last (OFDM) symbol of PDSCH(s) corresponding to the HARQ-ACK. Therefore, the condition based on $T_1$ should be applied based on a UL resource carrying the HARQ-ACK. If overlapped UCIs are multiplexed, the condition based on $T_1$ may be applied between the starting time of a PUCCH resource or PUSCH resource determined (according to a specific rule) and the last (OFDM) symbol of PDSCH(s) corresponding to the HARQ-ACK. Timeline condition #2 is intended to ensure a UE processing time from PDCCH reception until UL transmission. Timeline condition #2 aims to allow UL transmission after a predetermined time $T_2$ from the last (OFDM) symbol of PDCCH(s) (which schedules UL transmission on one or more of the overlapped PUCCH(s)). Timeline condition #2 also aims to indicate whether any UL transmission is scheduled before $T_2$ from the start of the UL transmission. Therefore, the PDCCH(s) (which schedules UL transmission on one or more of the overlapped PUCCH(s)) should be completely received before $T_2$ from the earliest UL resource among the overlapped PUCCH resource(s). That is, timeline condition #2 may be a condition for starting the first (OFDM) symbol of the (time-axis) earliest of the overlapped PUCCH resources and PUSCH resource(s) in the slot after $T_2$ from the last (OFDM) symbol of the (scheduling) DCI.

[Proposed Method #1C] When PUCCH resource(s) and/or PUSCH resource(s) configured/indicated for/to a UE in a slot are subjected to UCI multiplexing, the UE performs (stepwise) UCI multiplexing and determines a transmission resource for the multiplexed UCI (i.e., MUX UCI).

[Method #A]

(1) Step 1: In the presence of PUSCH resource(s) (allowed for multiplexed UCI transmission), the UCI multiplexing rule is applied, per PUSCH resource, to (i) a corresponding PUSCH resource and (ii) PUCCH resource(s) overlapped (on the time axis). During UCI multiplexing, existing UL resource(s) for the multiplexed UCI(s) is replaced with a specific (single) PUSCH resource.

(2) Step 2: In the presence of (DCI-based scheduled) PUCCH resource(s) (allowed for multiplexed UCI transmission), the UCI multiplexing rule is applied, per PUCCH resource, to (i) a corresponding PUCCH resource and (ii) PUCCH resource(s) overlapped (on the time axis). During UCI multiplexing, existing UL resource(s) for the multiplexed UCI(s) is replaced with a specific (single) PUCCH resource (referred to as MUX PUCCH).

A. If the (single) PUCCH resource to carry the multiplexed UCI(s) (i.e., MUX PUCCH) (newly) overlaps with other PUSCH resource(s) and/or PUCCH resource(s) (on the time axis), the UE may perform one of the following operations.

Opt. 1: Step 1 and/or Step 2 is applied again to the (single) PUCCH resource and the (DCI-based scheduled) PUCCH resource.

Opt 2: The MUX UCI is transmitted in the (single) PUCCH resource, while transmission of UL resource(s) overlapped with the (single) PUCCH resource is dropped.

Opt 3: Transmission of the (single) PUCCH resource is dropped.

Opt 4: This case is processed as an error (unspecified).

(3) Step 3: In the presence of PUCCH resource(s) (allowed for multiplexed UCI transmission) (configured by higher-layer signaling (e.g., RRC signaling)), the UCI multiplexing rule is applied, per PUCCH resource, to (i) a corresponding PUCCH resource and (ii) PUCCH resource(s) overlapped (on the time axis) (configured by higher-layer signaling). During UCI multiplexing, existing UL resource(s) for the multiplexed UCI(s) is replaced with a specific (single) PUCCH resource (i.e., MUX PUCCH).

[Method #B]

(1) Step 1: In the presence of PUSCH resource(s) (allowed for multiplexed UCI transmission), the UCI multiplexing rule is applied, per PUSCH resource, to a corresponding PUSCH resource and PUCCH resource(s) overlapped (on the time axis). During UCI multiplexing, existing UL resource(s) for the multiplexed UCI(s) is replaced with a specific (single) PUSCH resource.

(2) Step 2: Based on a PUCCH resource (PUCCH1) having an earliest starting symbol (or carrying UCI of a highest priority) (allowed for multiplexed UCI transmission), the UCI multiplexing rule is applied to (i) PUCCH1 and (ii) PUCCH resource(s)(PUCCH2) overlapped (on the time axis). During UCI multiplexing, existing UL resource(s) for the multiplexed UCI(s) is replaced with a specific (single) PUCCH resource (PUCCH3, i.e., MUX PUCCH).

(3) Step 3

A. Step 3-1: Case in which (i) PUCCH3 of Step 2 overlaps with (ii) PUCCH resource(s) (PUCCH4) (except for PUCCH1 and PUCCH2) (on the time axis), Opt. 1: The UCI multiplexing rule is applied to PUCCH3 and PUCCH4 (Step 2). During UCI multiplexing, existing UL resource(s) for the multiplexed UCI(s) is replaced with a specific (single) PUCCH resource.

Opt 2: Transmission of PUCCH3 is dropped.

Opt 3: Transmission of PUCCH4 is dropped.

B. Step 3-2: If PUCCH3 and PUCCH4 do not overlap with each other (on the time axis), Step 2 and Step 3 are applied to PUCCH resource(s) of PUCCH4.

For the UCI multiplexing rule, [proposed method #1A] and [proposed method #1B] may be conformed to.

If the existing UL resource(s) for the multiplexed UCI(s) is replaced with the specific (single) PUCCH or PUSCH resource in each step, the UE may regard the replaced existing UL resource(s) as non-existent in the following steps. That is, the replaced existing UL resource(s) is not considered as available for UCI multiplexing in a subsequent process. On the other hand, the (single) PUCCH or PUSCH resource determined to carry the multiplexed UCI(s) may be considered as available for UCI multiplexing in the subsequent process.

If there are a plurality of PUCCH (or PUSCH) resources in each step, the order of applying the operations of the step to the plurality of PUCCH (or PUSCH) resources may be determined according to a preset prioritization rule. For example, the prioritization rule may be set based on a relative transmission time (e.g., a starting position/symbol) (in a slot), a UCI type, a resource allocation scheme (e.g., dynamic or semi-static resource allocation), a scheduled order, a transmission capacity, and so on.

For example, when UCI multiplexing is performed for PUCCH resource(s) and/or PUSCH resource(s) overlapped on the time axis in a slot, ambiguity may occur in determining PUCCH resource(s) and/or PUSCH resource(s) subjected to UCI multiplexing in view of the nature of the NR system that a plurality of PUCCH transmissions and flexible allocation of PUCCH time resources are supported in one slot. For example, when AN PUCCH, CSI PUCCH, and SR PUCCH resources co-exist in one slot, it is assumed that the CSI PUCCH resource overlaps with the AN PUCCH resource/the SR PUCCH resource on the time axis, whereas the AN PUCCH resource does not overlap with the SR PUCCH resource on the time axis. In this case, it may not be clear whether the UE should (1) multiplex all of an HARQ-ACK, CSI, and an SR or (2) multiplex the HARQ-ACK-CSI pair and multiplex the CSI-SR pair. In the present disclosure, therefore, a method of multiplexing UCI in a UL resource order that enables loading of as many types of UCI as possible (e.g., [Method #A]) or a method of sequentially performing UCI multiplexing for PUCCH resource(s) overlapped on the time axis, based on an earliest PUCCH resource (or a PUCCH resource carrying UCI of a highest priority) (e.g., [Method #B]) is proposed. In [Method #A], UCI may be multiplexed in the order of PUSCH=>(DCI-based scheduled) AN PUCCH=>CSI PUCCH=>AN PUCCH (configured by higher-layer signaling (e.g., RRC signaling)). Once a PUCCH resource is selected for UCI multiplexing, the PUCCH resource may be excluded from subsequent UCI multiplexing.

In a modification to [proposed method #1C], the order of step(s) in [Method #A]/[Method #B] may be changed. For example, the following operations may be considered.

[Method #A-1]

(1) Step 1: If there is any PUCCH resource(s) (allowed for multiplexed UCI transmission) (configured by higher-layer signaling (e.g., RRC signaling)), the UCI multiplexing rule may be applied, per PUCCH resource, to (i) a corresponding PUCCH resource and (ii) (time-axis) overlapped PUCCH resource(s) (configured by higher-layer signaling). During UCI multiplexing, existing UL resource(s) for multiplexed UCI(s) may be replaced with a (single) PUCCH resource (hereinafter, referred to as MUX PUCCH resource).

(2) Step 2: If there is any (DCI-based scheduled) PUCCH resource(s) (allowed for multiplexed UCI transmission), the UCI multiplexing rule may be applied, per PUCCH resource, to (i) a corresponding PUCCH resource and (ii) (time-axis) overlapped PUCCH resource(s). During UCI multiplexing, existing UL resource(s) for multiplexed UCI(s) may be replaced with a (single) PUCCH resource (i.e., MUX PUCCH resource). The overlapped PUCCH resource(s) may refer to PUCCH resource(s) in a slot.

A. If the MUX PUCCH resource (newly) overlaps with other PUCCH resource(s) (on the time axis), the following operations may be performed.

Opt. 1: Step 2 is applied again to (i) the MUX PUCCH resource and (ii) the (DCI-based scheduled) PUCCH resource.

Opt. 2: The MUX PUCCH resource is transmitted, while transmission of UL resource(s) overlapped with the MUX PUCCH resource is dropped.

Opt. 3: Transmission of the MUX PUCCH resource is dropped.

Opt. 4: This case is processed as an error (unspecified).

(3) Step 3: If there is any PUSCH resource(s) (allowed for multiplexed UCI transmission), the UCI multiplexing rule may be applied, per PUSCH resource, to (i) a corresponding PUSCH resource and (ii) (time-axis) overlapped PUCCH resource(s). The PUCCH resource(s) may include MUX PUCCH resource(s). During UCI multiplexing, existing UL resource(s) for multiplexed UCI(s) may be replaced with a (single) PUSCH resource.

[Method #A-2]

(1) Step 1: If there is any PUSCH resource(s) (allowed for multiplexed UCI transmission), the UCI multiplexing rule may be applied, per PUSCH resource, to (i) a corresponding PUSCH resource and (ii) (time-axis) overlapped PUSCH resource(s). During UCI multiplexing, existing UL resource(s) for multiplexed UCI(s) may be replaced with a (single) PUSCH resource (hereinafter, referred to as MUX PUSCH resource).

(2) Step 2: If there is any PUCCH resource(s) (allowed for multiplexed UCI transmission) (configured by higher-layer signaling (e.g., RRC signaling)), the UCI multiplexing rule may be applied, per PUCCH resource, to (i) a corresponding PUCCH resource and (ii) (time-axis) overlapped PUCCH resource(s) (configured by higher-layer signaling). During UCI multiplexing, existing UL resource(s) for multiplexed UCI(s) may be replaced with a (single) PUCCH resource (i.e., MUX PUCCH resource).

(3) Step 3: If there is any (DCI-based scheduled) PUCCH resource(s) (allowed for multiplexed UCI transmission), the UCI multiplexing rule may be applied, per PUCCH resource, to (i) a corresponding PUCCH resource and (ii) (time-axis) overlapped PUCCH resource(s). During UCI multiplexing, existing UL resource(s) for multiplexed UCI(s) may be replaced with a (single) PUCCH resource (i.e., MUX PUCCH resource).

A. If the MUX PUCCH resource (newly) overlaps with other PUSCH resource(s) and/or PUCCH resource(s) (on the time axis), the following operations may be performed.

Opt. 1: Step 2 and/or Step 3 is applied again to (i) the MUX PUCCH resource and (ii) the (DCI-based scheduled) PUCCH resource.

Opt. 2: The MUX PUCCH resource is transmitted, while transmission of UL resource(s) overlapped with the MUX PUCCH resource is dropped.

Opt. 3: UCI transmission in the MUX PUCCH resource is dropped.

Opt. 4: This case is processed as an error (unspecified).

[Method #B-1]

(1) Step 1: Based on a PUCCH resource (referred to as PUCCH1) having an earliest starting (or ending) symbol (allowed for multiplexed UCI transmission) (or carrying UCI of a highest priority, the UCI multiplexing rule may be applied to (i) PUCCH1 and (ii) PUCCH resource(s) (referred to as PUCCH2) overlapped with PUCCH1 (on the time axis). During UCI multiplexing, existing UL resource(s) (i.e., PUCCH1/PUCCH2) for multiplexed UCI(s) may be replaced with a (single) PUCCH resource (referred to as PUCCH3 or MUX PUCCH1).

(2) Step 2

A. Step 2-1: When (i) PUCCH3 overlaps with (ii) PUCCH resource(s) (referred to as PUCCH4) (except for PUCCH1/PUCCH2) (on the time axis), the following operations may be performed.

Opt. 1: The UCI multiplexing rule may be applied to PUCCH3 and PUCCH4. During UCI multiplexing, existing UL resource(s) (i.e., PUCCH1/PUCCH2) for multiplexed UCI(s) may be replaced with a (single) PUCCH resource (referred to as PUCCH3-1 or MUX PUCCH2).

Opt. 2: Transmission of PUCCH3 is dropped.

Opt. 3: Transmission of PUCCH4 is dropped.

B. Step 2-2: When (i) PUCCH3 does not overlap with (ii) PUCCH resource(s) (referred to as PUCCH4) (except for PUCCH1/PUCCH2), the following operations may be performed.

Step 1/2 is applied to PUCCH resources in PUCCH4.

(3) Step 3: If there is any PUSCH resource(s) (allowed for multiplexed UCI transmission), the UCI multiplexing rule may be applied, per PUSCH resource, to (i) a corresponding PUSCH resource and (ii) (time-axis) overlapped PUCCH resource(s). The PUCCH resource(s) refers to PUCCH resource(s) after Step 1/2 is performed. That is, the PUCCH resource(s) are not overlapped on the time axis and may include MUX PUCCH resource(s). During UCI multiplexing, existing UL resource(s) for multiplexed UCI(s) may be replaced with a (single) PUSCH resource (i.e., MUX PUSCH resource).

The UCI multiplexing rule may conform to [proposed method #1A] and [proposed method #1B]. [Proposed method #1A] includes a timeline condition for PUCCH-PUCCH UCI multiplexing, and [proposed method #1B] includes a timeline condition for PUCCH-PUSCH UCI multiplexing. Only when UL channels (resources) overlapped in a slot satisfy a timeline condition, UCI multiplexing may be performed in Step 1/2/3. The timeline condition is related to (1) a UE processing time for HARQ-ACK transmission or (2) a UE processing time for UL transmission (e.g., PUCCH or PUSCH). Therefore, in the absence of a UL transmission related to (1)/(2), UCI multiplexing may be performed on the overlapped UL channels (resources) without the need for considering the timeline condition. When UCI multiplexing is performed, a (single) PUCCH resource (i.e., MUX PUCCH) may be newly determined to deliver multiplexed UCI based on a (total) UCI payload size or the like according to a predetermined rule.

The MUX PUCCH may be determined in various methods proposed in the present disclosure. Referring to [proposed method #1H], for example, the UE may multiplex an AN with other UCI and then select a PUCCH resource set corresponding to the (total) size of multiplexed UCI payload. Subsequently, the UE may transmit the multiplexed UCI in a PUCCH resource indicated by an ARI from among the PUCCH resources of the PUCCH resource set. When a UCI size supported by the PUCCH resource set is 2 or fewer bits, the PUCCH resource set may include PUCCH format 0/1. When the UCI size supported by the PUCCH resource set is 3 or more bits, the PUCCH resource set may include PUCCH format 2/3/4. When there are one or more PUCCH resource sets, at least one PUCCH resource set is configured to deliver UCI of 2 or fewer bits.

When existing UL resource(s) for multiplexed UCI(s) is replaced with a (single) PUCCH or PUSCH resource (referred to as MUX UL resource) in each step, the UE may regard the replaced existing UL resource(s) as absent in the following steps. That is, the existing UL resource(s) replaced with the MUX UL resource may not be considered as a resource for UCI multiplexing in the following steps. In contrast, the MUX UL resource may be considered for UCI multiplexing in the following steps.

When there are a plurality of PUCCH (or PUSCH) resources in each step, the order of applying the operation of the corresponding step between the plurality of PUCCH (or PUSCH) resources may be determined in a predetermined priority rule. For example, the priority rule may be determined based on a relative transmission time (e.g., a starting position/symbol) (in a slot), a UCI type, a resource allocation scheme (e.g., dynamic or semi-static), a scheduled order, a transmission capacity, and so on.

Figure 9:
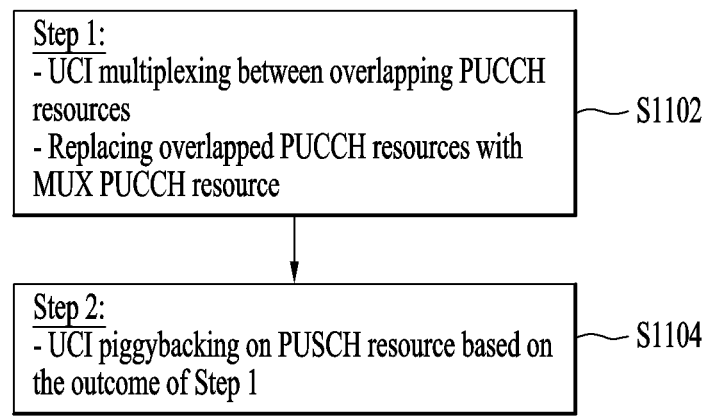

FIG. 9 illustrates an exemplary channel multiplexing operation according to [Method #B-1]. Referring to FIG. 9, DCI multiplexing may be performed for overlapped PUCCH resources (in a slot) (Step 1, S1102). For example, based on a PUCCH resource (referred to as PUCCH1) having an earliest starting symbol (allowed for multiplexed UCI transmission), the UE may apply the UCI multiplexing rule to (i) PUCCH1 and (ii) PUCCH resource(s) (referred to as PUCCH2) overlapped with PUCCH1 (on the time axis). The overlapped UL resource(s) (i.e., PUCCH1/PUCCH2) to which UCI multiplexing is applied may be replaced by a (single) PUCCH resource (referred to as MUX PUCCH1). Subsequently, the UE may perform UCI piggyback for a PUSCH resource based on the result of Step 1 (Step 2, S1104). For example, where there is any PUSCH resource(s) (allowed for multiplexed UCI transmission), the UE may apply the UCI multiplexing rule, per PUSCH resource, to (i) the PUSCH resource and (ii) (time-axis) overlapped PUCCH resource(s). For details, refer to the description of Method #B-1]. Subsequently, the UE may transmit the UCI on the PUSCH. When there is not any overlapped PUSCH in the slot, the UCI may be transmitted on a PUCCH, while Step 2 may be skipped.

In a modification to [proposed method #1C], the following operations may be considered. This proposal may be understood as a modification to Method #B-1. Step #A/#B1/#B2 corresponds to Step 1/2-2/2-1 in Method #B-1, and Step 1/2-1/2-2 in Method #B-1 may be replaced with Step #A/#B1/#B2.

(1) Step #A: Based on a PUCCH (referred to as PUCCH1) having an earliest starting (or ending) symbol (or carrying UCI of a highest priority), the PUCCH-PUCCH UCI multiplexing rule may be applied only to (i) PUCCH1 and PUCCHs (referred to as PUCCH2) overlapped with PUCCH1 (on the time axis). During the UCI multiplexing, a (single) container PUCCH (referred to as MUX PUCCH1) to carry multiplexed UCI(s) may be determined. That is, the overlapped existing UL resource(s) (i.e., PUCCH1/PUCCH2) may be replaced with MUX PUCCH1.

(2) Step #B1: When (i) the container PUCCH (i.e., MUX PUCCH1) (for multiplexed UCI transmission) determined in Step #A does not overlap with (ii) the remaining PUCCHs (referred to as PUCCH3) (except for PUCCH1/PUCCH2), the following operation may be performed.

PUCCHs which are not overlapped on the time axis may be transmitted in TDM (by applying Step #A between PUCCHs within PUCCH3).

(3) Step #B2: When (i) MUX PUCCH1 overlaps with (ii) PUCCH3, the following operations may be performed.

Opt 1: The PUCCH-PUCCH UCI multiplexing rule may be applied again to the container PUCCH (i.e., MUX PUCCH1) and PUCCH3. During the UCI multiplexing, a (single) container PUCCH (referred to as MUX PUCCH3) to carry multiplexed UCI(s) may be newly determined. That is, the overlapped existing UL resource(s) (i.e., MUX PUCCH1/PUCCH3) may be replaced with MUX PUCCH2. Step #B1/#B2 may be applied again to MUX PUCCH2.

Opt 2: Transmission of PUCCH3 may be dropped.

Figure 10:
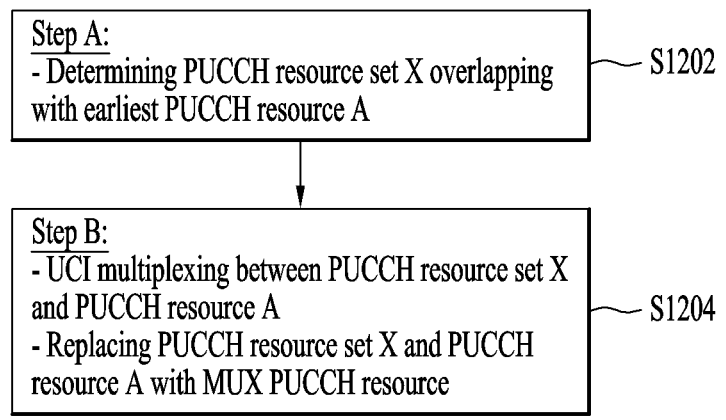

FIG. 10 illustrates an exemplary channel multiplexing procedure according to Step #A/#B1/#B2. For UCI transmission, the UE may determine a PUCCH resource on a UCI basis. Each PUCCH resource may be defined by a starting symbol and a transmission length. If there are overlapped PUCCH resources (in a slot), the UE may determine PUCCH resource set X overlapped with PUCCH resource A which is earliest (e.g., which has an earliest starting symbol) (Step A1, S1202). Subsequently, the UE may perform UCI multiplexing between (i) PUCCH resource A and (ii) PUCCH resource set X (Step A1, S1204). During UCI multiplexing, a (single) container PUCCH (MUX PUCCH) may be determined to transmit the multiplexed UCI(s). Accordingly, PUCCH resource A and PUCCH resource set X may be replaced with the MUX PUCCH. The UE may then transmit the UCI on the MUX PUCCH. If the MUX PUCCH overlaps with the remaining PUCCHs (except for PUCCH resource A/PUCCH resource set X), the UE may perform Step A1/A2 again, with the MUX PUCCH (or the earliest of the remaining PUCCHs (e.g., a PUCCH having the earliest starting symbol)) replaced with earliest PUCCH resource A (e.g., having the earliest starting symbol). For more details, refer to the description of Step #A/#B1/#B2. Step A1/A2 of FIG. 10 corresponds to Step 1 of FIG. 9, and thus Step 1 of FIG. 9 may be replaced with Step A1/A2 of FIG. 10.

Figure 11:
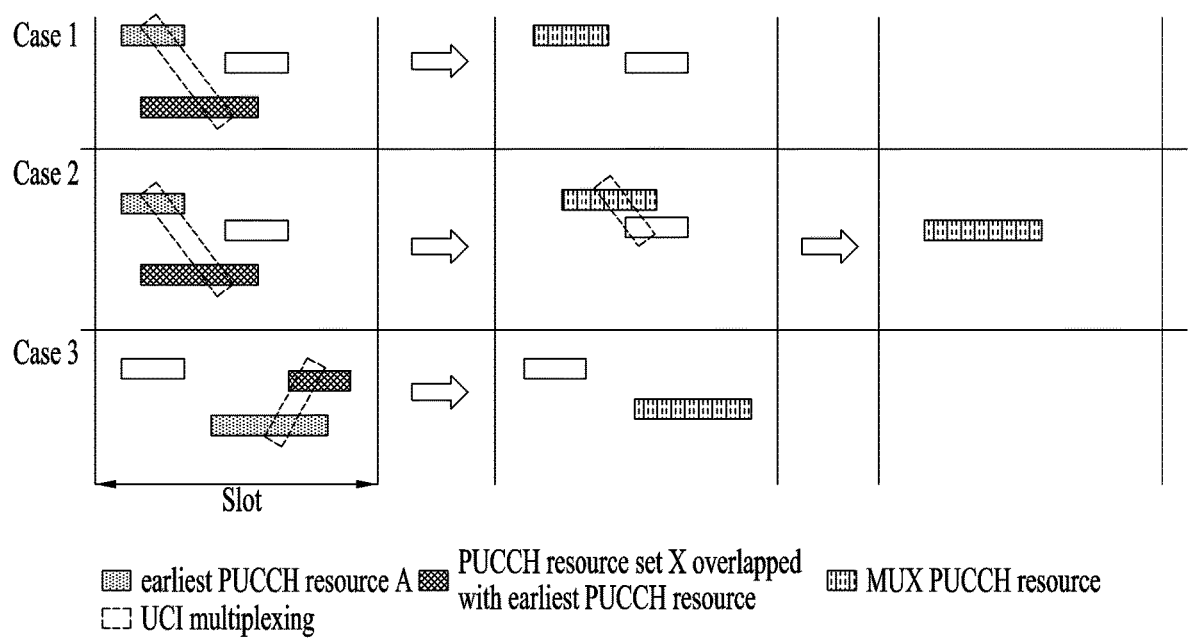
Figure 12:
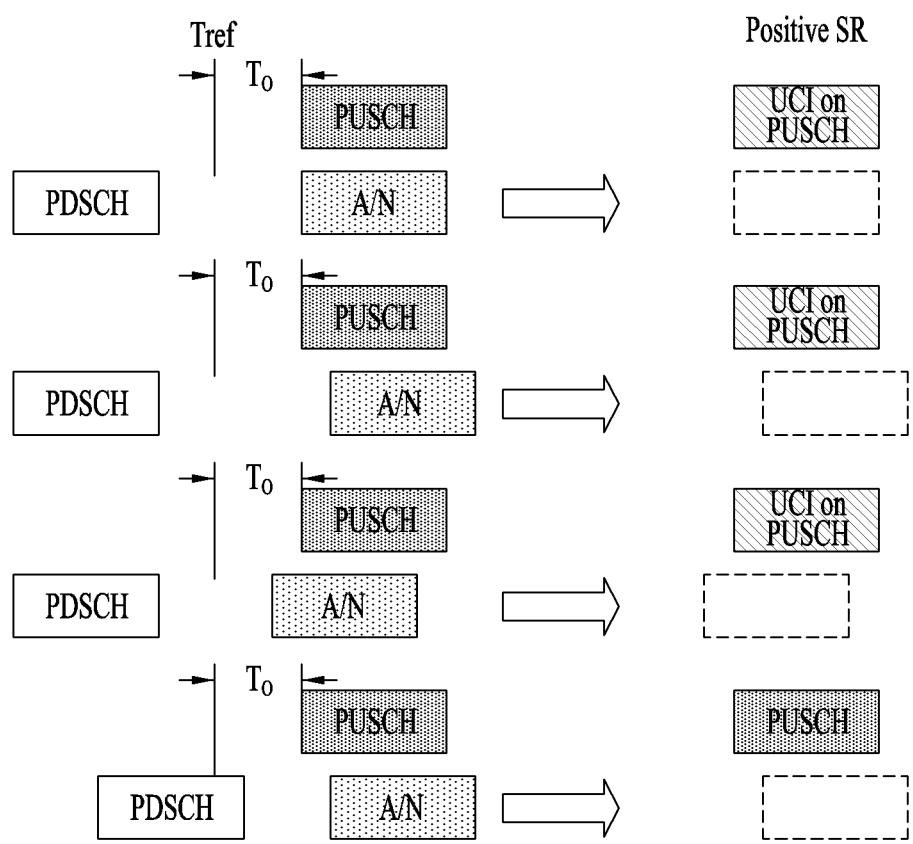

FIG. 11 illustrates exemplary UCI multiplexing based on FIG. 10. Referring to FIG. 11, when a plurality of PUCCH resources overlap with each other in a slot, UCI multiplexing may be performed based on the earliest PUCCH resource A (e.g., having the earliest starting symbol). In Case 1/2, the first PUCCH resource overlaps with another PUCCH resource. In this case, with the first PUCCH resource regarded as earliest PUCCH resource A, the procedure of FIG. 10 is performed. In Case 3, the first PUCCH resource does not overlap with another PUCCH resource, whereas the second PUCCH resource overlaps with another PUCCH resource. In this case, UCI multiplexing is not performed for the first PUCCH resource. Instead, with the second PUCCH resource regarded as earliest PUCCH resource A, the procedure of FIG. 10 is performed. In Case 2, a MUX PUCCH resource determined to transmit multiplexed UCI newly overlaps with another PUCCH resource. In this case, with the MUX PUCCH resource (or the earliest of the remaining PUCCH resources including the MUX PUCCH resource (e.g., having the earliest starting symbol)) regarded as earliest PUCCH resource A, the procedure of FIG. 10 is further performed. For more details, refer to the description of Step #A/#B1/#B2.

In a modification to [proposed method #1C], when UCI multiplexing is performed for PUCCH resource(s) and/or PUSCH resource(s) configured/indicated for/to a UE, the UE may consider the following methods of performing (stepwise) UCI multiplexing and determining a transmission resource for multiplexed UCI.

(1) Step 1: If there is any PUCCH resource(s) (allowed for multiplexed UCI transmission) (configured by higher-layer signaling (e.g., RRC signaling)), the UCI multiplexing rule is applied, per PUCCH resource, to (i) a corresponding PUCCH resource and (ii) (time-axis) overlapped PUCCH resource(s) (configured by higher-layer signaling). During UCI multiplexing, existing UL resource(s) for the multiplexed UCI(s) is replaced with a specific (single) PUCCH resource.

A. For example, sub-steps of Step 1 may be given as follows.

Example #1

Step 1-1: The UCI multiplexing rule is applied, per CSI PUCCH resource, to (i) a corresponding PUCCH resource and (ii) (time-axis) overlapped CSI PUCCH resource(s). During UCI multiplexing, existing UL resource(s) for the multiplexed UCI(s) is replaced with a specific (single) (CSI) PUCCH resource.

Step 1-2: The UCI multiplexing rule is applied, per CSI PUCCH resource, to (i) a corresponding PUCCH resource and (ii) (time-axis) overlapped AN PUCCH resource(s) and/or SR PUCCH resource(s). During UCI multiplexing, existing UL resource(s) for the multiplexed UCI(s) is replaced with a specific (single) (CSI) PUCCH resource.

Step 1-3: The UCI multiplexing rule is applied, per A/N PUCCH resource, to (i) a corresponding PUCCH resource and (ii) (time-axis) overlapped SR PUCCH resource(s). During UCI multiplexing, existing UL resource(s) for the multiplexed UCI(s) is replaced with a specific (single) (A/N) PUCCH resource.

Step 2: If there is any (DCI-based scheduled) PUCCH resource(s) (allowed for multiplexed UCI transmission), the UCI multiplexing rule is applied, per PUCCH resource, to (i) a corresponding PUCCH resource and (ii) (time-axis) overlapped PUCCH resource(s). During UCI multiplexing, existing UL resource(s) for the multiplexed UCI(s) is replaced with a specific (single) PUCCH resource.

A. For example, sub-steps of Step 2 may be given as follows.

Example #1

Step 2-1: The UCI multiplexing rule is applied, per (DCI-based scheduled) AN PUCCH resource, to (i) a corresponding PUCCH resource and (ii) (time-axis) overlapped CSI PUCCH resource(s) and/or SR PUCCH resource(s) (and/or AN PUCCH resource(s)). During UCI multiplexing, existing UL resource(s) for the multiplexed UCI(s) is replaced with a specific (single) (AN) PUCCH resource.

Example #2

Step 2-1: The UCI multiplexing rule is applied, per (DCI-based scheduled) AN PUCCH resource, to (i) a corresponding PUCCH resource and (ii) (time-axis) overlapped CSI PUCCH resource(s) and/or SR PUCCH resource(s) (and/or AN PUCCH resource(s)). During UCI multiplexing, existing UL resource(s) for the multiplexed UCI(s) is replaced with a specific (single) (AN) PUCCH resource.

Step 2-2: The UCI multiplexing rule is applied, per (DCI-based scheduled) CSI PUCCH resource, to (i) a corresponding PUCCH resource and (ii) (time-axis) overlapped SR PUCCH resource(s) (and/or CSI PUCCH resource(s)). During UCI multiplexing, existing UL resource(s) for the multiplexed UCI(s) is replaced with a specific (single) (CSI) PUCCH resource.

(3) Step 3: If there is any PUSCH resource(s) (allowed for multiplexed UCI transmission), the UCI multiplexing rule is applied, per PUSCH resource, to (i) a corresponding PUSCH resource and (ii) (time-axis) overlapped PUCCH resource(s). During UCI multiplexing, existing UL resource(s) for the multiplexed UCI(s) is replaced with a specific (single) PUSCH resource.

If there are a plurality of PUCCH (or PUSCH) resources in each step, the order of applying the operations of the step to the plurality of PUCCH (or PUSCH) resources may be determined according to a preset prioritization rule. For example, the prioritization rule may be determined based on a relative transmission time (e.g., a starting position/symbol) (in a slot), a UCI type, a resource allocation scheme (e.g., dynamic or semi-static resource allocation), a scheduled order, a transmission capacity, and so on.

If the new PUCCH resource selected to transmit multiplexed UCI(s) in each step overlaps (on the time axis) with other PUCCH resource(s) than (existing) PUCCH resource(s) for the multiplexed UCI(s), the UE may not expect this case, considering this case as an error. Alternatively, the UE may apply the UCI multiplexing rule to the new selected PUCCH resource and the overlapped PUCCH resource(s), and replace the existing UL resource for the multiplexed UCI(s) with a specific (single) PUCCH resource during UCI multiplexing.

In a modification to [proposed method #1C], when UCI multiplexing is performed for PUCCH resource(s) and/or PUSCH resource(s) in a slot, configured/indicated for/to a UE, the UE may consider the following methods of performing (stepwise) UCI multiplexing and determining a transmission resource for multiplexed UCI.

(1) Step 1: If there is any PUSCH resource(s) (allowed for multiplexed UCI transmission), the UCI multiplexing rule is applied, per PUSCH resource, to (i) a corresponding PUSCH resource and (ii) (time-axis) overlapped PUCCH resource(s). During UCI multiplexing, existing UL resource(s) for the multiplexed UCI(s) is replaced with a specific (single) PUSCH resource.

Step 2: If there is any (DCI-based scheduled) PUCCH resource(s) (allowed for multiplexed UCI transmission), the UCI multiplexing rule is applied, per PUCCH resource, to (i) a corresponding PUCCH resource and (ii) (time-axis) overlapped PUCCH resource(s). During UCI multiplexing, existing UL resource(s) for the multiplexed UCI(s) is replaced with a specific (single) PUCCH resource.

A. For example, sub-steps of Step 2 may be given as follows.

Example #1

Step 2-1: The UCI multiplexing rule is applied, per (DCI-based scheduled) AN PUCCH resource, to (i) a corresponding PUCCH resource and (ii) (time-axis) overlapped CSI PUCCH resource(s) and/or SR PUCCH resource(s) (and/or AN PUCCH resource(s)). During UCI multiplexing, existing UL resource(s) for the multiplexed UCI(s) is replaced with a specific (single) (AN) PUCCH resource.

Example #2

Step 2-1: The UCI multiplexing rule is applied, per (DCI-based scheduled) AN PUCCH resource, to (i) a corresponding PUCCH resource and (ii) (time-axis) overlapped CSI PUCCH resource(s) and/or SR PUCCH resource(s) (and/or AN PUCCH resource(s)). During UCI multiplexing, existing UL resource(s) for the multiplexed UCI(s) is replaced with a specific (single) (AN) PUCCH resource.

Step 2-2: The UCI multiplexing rule is applied, per (DCI-based scheduled) CSI PUCCH resource, to (i) a corresponding PUCCH resource and (ii) (time-axis) overlapped SR PUCCH resource(s) (and/or CSI PUCCH resource(s)). During UCI multiplexing, existing UL resource(s) for the multiplexed UCI(s) is replaced with a specific (single) (CSI) PUCCH resource.

(3) Step 3: If there is any PUCCH resource(s) (allowed for multiplexed UCI transmission) (configured by higher-layer signaling (e.g., RRC signaling)), the UCI multiplexing rule is applied, per PUCCH resource, to (i) a corresponding PUCCH resource and (ii) (time-axis) overlapped PUCCH resource(s) (configured by higher-layer signaling). During UCI multiplexing, existing UL resource(s) for the multiplexed UCI(s) is replaced with a specific (single) PUCCH resource.

A. For example, sub-steps of Step 3 may be given as follows.

Example #1

Step 3-1: The UCI multiplexing rule is applied, per CSI PUCCH resource, to (i) a corresponding PUCCH resource and (ii) (time-axis) overlapped CSI PUCCH resource(s). During UCI multiplexing, existing UL resource(s) for the multiplexed UCI(s) is replaced with a specific (single) (CSI) PUCCH resource.

Step 3-2: The UCI multiplexing rule is applied, per CSI PUCCH resource, to (i) a corresponding PUCCH resource and (ii) (time-axis) overlapped AN PUCCH resource(s) and/or SR PUCCH resource(s). During UCI multiplexing, existing UL resource(s) for the multiplexed UCI(s) is replaced with a specific (single) (CSI) PUCCH resource.

Step 3-3: The UCI multiplexing rule is applied, per AN PUCCH resource, to (i) a corresponding PUCCH resource and (ii) (time-axis) overlapped SR PUCCH resource(s). During UCI multiplexing, existing UL resource(s) for the multiplexed UCI(s) is replaced with a specific (single) (AN) PUCCH resource.

If there are a plurality of PUCCH (or PUSCH) resources in each step, the order of applying the operations of the step to the plurality of PUCCH (or PUSCH) resources may be determined according to a preset prioritization rule. For example, the prioritization rule may be determined based on a relative transmission time (e.g., a starting position/symbol) (in a slot), a UCI type, a resource allocation scheme (e.g., dynamic or semi-static resource allocation), a scheduled order, a transmission capacity, and so on.

If the new PUCCH resource selected to transmit multiplexed UCI(s) in each step overlaps (on the time axis) with other PUCCH resource(s) than (existing) PUCCH resource(s) for the multiplexed UCI(s), the UE may not expect this case, considering this case as an error. Alternatively, the UE may apply the UCI multiplexing rule to the new selected PUCCH resource and the overlapped PUCCH resource(s), and replace the existing UL resources for the multiplexed UCI(s) with a specific (single) PUCCH resource during UCI multiplexing.

[Proposed Method #1D] If a (single) SR PUCCH resource in a slot, (semi-statically) configured/indicated for/to the UE overlaps with two or more (semi-statically configured) CSI PUCCHs on the time axis, the UE performs one of the following operations.

(1) Opt. 1: CSI and an SR are multiplexed and transmitted by adding all of SR bit(s) to the UCI payload of each CSI PUCCH resource. That is, SR information may be loaded on all CSI PUCCHs overlapped with the SR PUCCH.

SR information(s) loaded in a plurality of CSI PUCCH resources may be a copy of SR information transmitted in the first CSI PUCCH resource. That is, the SR information loaded on the plurality of CSI PUCCH resources may be the same duplicates. Further, the SR information loaded on the plurality of CSI PUCCH resources may be SR information updated for each CSI PUCCH resource (or, reflecting the SR state of the UE (e.g., negative or positive) at each CSI PUCCH time). That is, the SR information loaded on the plurality of CSI PUCCH resources may be SR information updated at each transmission time of a CSI PUCCH resource.

(2) Opt. 2: The CSI and the SR are multiplexed and transmitted by adding the SR bit(s) only to the UCI payload of a specific single CSI PUCCH resource. The specific single CSI PUCCH resource may be one of the followings.

Opt. 2-1: The first (or last) CSI PUCCH resource on the time axis or a CSI PUCCH resource having the earliest (or latest) starting time. That is, the SR information may be loaded only on the first of all CSI PUCCHs overlapped with the SR PUCCH.

Opt. 2-2: A CSI PUCCH resource having a largest transmission capacity.

Opt. 2-3: A CSI PUCCH resource configured for CSI having a highest priority.

In the NR system, in the case where a single CSI PUCCH resource overlaps with one or more SR PUCCH resource in one slot, an operation of multiplexing all UCIs and transmitting the multiplexed UCI in a single CSI PUCCH resource is under consideration. Regarding multiplexing between CSI and an SR, a UCI multiplexing rule should also be set for the case where a single SR PUCCH resource overlaps with a plurality of CSI PUCCH resources, unlike the above case. The foregoing proposed options may be considered in regard to the issue.

[Proposed Method #1F] If a (single) PUSCH resource configured/indicated for/to a UE overlaps with two or more CSI PUCCH resources (or AN PUCCH resources) on the time axis in a slot, the UE performs one of the following operations.

(1) Opt. 1: A CSI report (or HARQ-ACK information) for a specific one CSI PUCCH resource (or AN PUCCH resource) among CSI PUCCH resource(s) (or AN PUCCH resource(s)) overlapped with a PUSCH is multiplexed with a UL-SCH TB (e.g., UL data) and transmitted in a PUSCH resource (e.g., UCI piggyback).

The specific single CSI PUCCH resource may include a CSI PUCCH resource configured for CSI which is earliest on the time axis or has a highest priority. Further, the specific single CSI PUCCH resource may include an earliest An PUCCH resource on the time axis.

Transmission of the remaining CSI PUCCHs (or AN PUCCHs) other than the specific single CSI PUCCH resource (or AN PUCCH resource) and a corresponding CSI report (or HARQ-ACK) may be dropped.

(2) Opt. 2: All of CSI report(s) (or HARQ-ACK information) for CSI PUCCH resource(s) (or AN PUCCH resource(s)) overlapped with a PUSCH is multiplexed with a UL-SCH TB (e.g., UL data) and transmitted in the PUSCH resource (e.g., UCI piggyback). Alternatively, up to M CSI reports with higher priorities selected from among the CSI report(s) (or HARQ-ACK information) for the CSI PUCCH resource(s) (or AN PUCCH resource(s)) overlapped with the PUSCH in a predefined/preconfigured prioritization rule are multiplexed with the UL-SCH TB (e.g., UL data) and transmitted in the PUSCH resource (e.g., UCI piggyback).

M may be 1 or 2.

M may be preset or configured/defined by higher-layer signaling (or RRC signaling).

If a PUSCH resource is replaced with a CSI PUCCH resource and a UL-SCH TB is replaced with CSI in [proposed method #1F], a CSI multiplexing operation for a CSI PUCCH resource and an AN PUCCH resource may be performed in the same manner.

Since the NR system supports a flexible PUCCH transmission period configuration, it may occur that a single PUSCH resource overlaps with one or more CSI PUCCH resources (or An PUCCH resources) in one slot. In this case, only M CSI report(s) for M (higher-priority) CSI PUCCH resource(s) based on a prioritization rule may be UCI-piggybacked to the PUSCH. M may be preset or configured/defined by higher-layer signaling (or RRC signaling). Or simply, only a CSI report (or HARQ-ACK) for the first CSI PUCCH resource (or AN PUCCH resource) overlapped with the PUSCH resource on the time axis may be UCI-piggybacked to the PUSCH.

[Proposed Method #1H] When the UE performs UCI multiplexing for an AN PUCCH resource (for an AN of 2 or fewer bits) and N (e.g., N>1) SR PUCCH resources, a method of scheduling an AN PUCCH and/or a method of differentiating a PUCCH format to carry multiplexed UCI (e.g., AN/SR) according to the number K of PUCCH resource sets configured for an AN PUCCH are given as follows.

(1) Case in which the AN PUCCH resource is indicated by DCI (e.g., ARI),

A. If K>1,
the multiplexed UCI (e.g., AN/SR) is transmitted in one of PUCCH formats 2, 3 and 4.

B. If K=1,
the multiplexed UCI (e.g., AN/SR) is transmitted in one of PUCCH formats 0 and 1.

(2) Case in which the AN PUCCH resource is not indicated by DCI (e.g., ARI) (e.g., the AN PUCCH resource is associated with A/N information for an SPS PDSCH), A. If K>1,
Opt. 1: the multiplexed UCI (e.g., AN/SR) is transmitted in one of PUCCH formats 0 and 1.
Opt. 2: the multiplexed UCI (e.g., AN/SR) is transmitted in one of PUCCH formats 2, 3 and 4, selected on the assumption of a specific ARI value.
B. If K=1,
the multiplexed UCI (e.g., AN/SR) is transmitted in one of PUCCH formats 0 and 1.

According to the foregoing method, when an AN PUCCH resource overlaps with N (N>1) SR PUCCH resources, the UE may multiple an AN with an SR.

The UE may select a PUCCH resource set according to a (total) UCI payload size, and then transmit UCI (e.g., HARQ-ACK) in a PUCCH resource indicated by an ARI among PUCCH resources of the selected PUCCH resource set. The ARI (ACK/NACK resource indicator) is a bit field in DCI, indicating a PUCCH resource.

There may be a plurality of PUCCH resource sets (K>1) for AN PUCCH resources. In this case, the UE may multiplex the AN and other UCI and then select a PUCCH resource set corresponding to the (total) size of multiplexed UCI payload. Then, the UE may transmit the multiplexed UCI in a PUCCH resource indicated by the ARI among PUCCH resources of the selected PUCCH resource set. If the PUCCH resource set supports a UCI size of 2 or fewer bits, the PUCCH resource set may include PUCCH format 0/1. If the PUCCH resource set supports a UCI size of 3 or more bits, the PUCCH resource set may include PUCCH format 2/3/4. If there are one or more PUCCH resource sets, at least one PUCCH resource set is configured for transmission of UCI with 2 or fewer bits. Therefore, if an AN PUCCH resource is indicated by an ARI and there are two or more PUCCH resource sets for the AN PUCCH resource, the UE may transmit UCI in PUCCH format 2/3/4 configured for transmission of UCI with 3 or more bits. In this case, when the UE multiplexes an AN and a plurality of SRs, the UE appends multi-bit SR information for a plurality of SR PUCCH resources to AN payload, and then transmit the multiplexed AN/SR in one of PUCCH formats 2, 3 and 4, indicated by the ARI, within a PUCCH resource set selected based on the total UCI payload size.

However, even though an AN PUCCH resource is indicated by an ARI, if there is one PUCCH resource set for the AN PUCCH resource, the UE may not use a PUCCH format 2/3/4 resource. Therefore, a method of transmitting multiplexed AN/SR in a PUCCH format 0/1 resource may be considered. For example, when the UE multiplexes an AN and a plurality of SRs, if an AN PUCCH is in PUCCH format 1, the UE may drop SR transmission in SR PUCCH resource(s) of PUCCH format 0, while transmitting an AN in an SR PUCCH resource corresponding to a positive SR with a highest priority among SR PUCCH resource(s) of PUCCH format 1 (however, if all SRs are negative SRs, the AN PUCCH is transmitted). Or, if the AN PUCCH is in PUCCH format 0, SR information for two SR PUCCHs (SR PUCCH groups) may be represented by applying up to two CS offsets to the AN PUCCH resource. That is, a CS offset corresponding to a highest-priority SR PUCCH (group) including at least one SR PUCCH for a positive SR may be applied to AN PUCCH format 0.

An AN PUCCH resource corresponding to SPS PDSCH transmission may be configured semi-statically by higher-layer signaling (e.g., RRC signaling), not indicated by an ARI. Therefore, if an AN PUCCH resource corresponding to SPS PDSCH transmission overlaps with an SR PUCCH resource, the UE may not use PUCCH format 2/3/4 when multiplexing an AN and a plurality of SRs. Therefore, a method of transmitting multiplexed AN/SR in a PUCCH format 0/1 resource. For example, when the UE multiplexes an AN and a plurality of SRs, if an AN PUCCH is in PUCCH format 1, the UE may drop SR transmission in SR PUCCH resource(s) of PUCCH format 0, while transmitting the AN in an SR PUCCH resource corresponding to a positive SR with a highest priority among SR PUCCH resource(s) of PUCCH format 1 (however, if all SRs are negative SRs, the AN PUCCH is transmitted). Or, if the AN PUCCH is in PUCCH format 0, SR information for two SR PUCCHs (SR PUCCH groups) may be represented by applying up to two CS offsets to the AN PUCCH resource. That is, a CS offset corresponding to a highest-priority SR PUCCH (group) including at least one SR PUCCH for a positive SR may be applied to AN PUCCH format 0. However, if there are two or more PUCCH resource sets for the AN PUCCH resource, the UE may assume a specific ARI value (e.g., ARI=0) to determine an AN PUCCH resource, although the ARI does not indicate. Subsequently, the UE may (1) represent SR information for a plurality of SR PUCCH resources as multi-bit SR information and add the multi-bit SR information to AN payload, and then (2) transmit the multiplexed AN/SR in one of PUCCH format 2/3/4 resources corresponding to ARI=0 in a PUCCH resource set selected based on the total size of the multiplexed UCI payload.

In regard to the operation of "transmitting multiplexed UCI (e.g., AN/SR) in one of PUCCH formats 0 and 1" in [proposed method #1H], the UE may multiplex an AN and an SR as follows. Notably, PF0/1/2/3/4 represents PUCCH format 0/1/2/3/4.

(1) Case #1: UCI multiplexing between (single) AN and (single) SR
A. AN PF0
i. SR PF0: In the case of a positive SR, the AN is transmitted in a resource resulting from applying a CS offset to an AN PF0 resource. In the case of a negative SR, the AN is transmitted in the AN PF0 resource.
ii. SR PF1
Opt. 1: In the case of a positive SR, the AN is transmitted in a resource resulting from applying a CS offset to an AN PF0 resource. In the case of a negative SR, the AN is transmitted in the AN PF0 resource.
Opt. 2: In the case of a positive SR, the AN is transmitted in an SR PF1 resource. In the case of a negative SR, the AN is transmitted in an AN PF0 resource.
B. AN PF1
i. SR PF0: The AN is transmitted in an AN PF1 resource (SR drop)
ii. SR PF1: In the case of a positive SR, the AN is transmitted in an SR PF1 resource. In the case of a negative SR, the AN is transmitted in an AN PF1 resource.

(2) Case #2: UCI multiplexing between (single) AN and (multiple) SRs (w/single PUCCH format)
A. AN PF0
i. (Multiple) SR PF0
If SR information for at least one SR PUCCH (in a specific SR PUCCH group) is a positive SR, the AN is transmitted in a resource resulting from applying a CS offset (corresponding to the specific SR PUCCH group) to an AN PF0 resource.
In this case, a total of K SR PUCCHs are grouped into L (e.g., L=2, K>L) SR PUCCH groups, and then the respective L SR PUCCH groups may be mapped to L different CS offsets. If at least one of SRs in a specific SR PUCCH group is positive, the AN is transmitted in a resource to which a CS offset corresponding to the specific SR PUCCH group is applied.
If SR information for all SR PUCCH(s) is a negative SR, the AN is transmitted in an AN PF0 resource.

ii. (Multiple) SR PF1

Opt. 1: If SR information for at least one SR PUCCH (in a specific SR PUCCH group) is a positive SR, the AN is transmitted in a resource resulting from applying a CS offset (corresponding to the specific SR PUCCH group) to an AN PF0 resource. In this case, a total of K SR PUCCHs are grouped into L (e.g., L=2, K>L) SR PUCCH groups, and then the respective L SR PUCCH groups may be mapped to L different CS offsets. If at least one of SRs in the specific SR PUCCH group is positive, the AN is transmitted in a resource to which the CS offset corresponding to the specific SR PUCCH group is applied. If SR information for all of the SR PUCCH(s) is a negative SR, the AN is transmitted in an AN PF0 resource.

Opt. 2: If SR information for at least one SR PUCCH is a positive SR, the AN is transmitted in an SF PF1 resource corresponding to a (highest-priority) SR PUCCH among SR PUCCHs. If SR information for all of the SR PUCCH(s) is a negative SR, the AN is transmitted in an AN PF0 resource.

B. AN PF1 i. (Multiple) SR PF0: The AN is transmitted in an AN PF1 resource (SR drop).

ii. (Multiple) SR PF1: If SR information for at least one SR PUCCH is a positive SR, the AN is transmitted in an SR PF1 resource corresponding to a (highest-priority) SR PUCCH among SR PUCCHs. If SR information for all of the SR PUCCH(s) is a negative SR, the AN is transmitted in an AN PF1 resource.

(3) Case #3: UCI multiplexing between (single) AN and (multiple) SRs (w/different PUCCH formats)

A. AN PF0 i. (multiple) SR PF0+(multiple) SR PF1

Opt. 1: if SR information for at least one SR PUCCH is a positive SR and (a highest-priority) SR PUCCH among SR PUCCHs is in PF0, the AN is transmitted in a resource resulting from applying a CS offset to an AN PF0 resource. In this case, a total of SR PUCCHs or K SR PUCCHs configured with PF0 are grouped into L (e.g., L=2, K>L) SR PUCCH groups, and then the respective L SR PUCCH groups may be mapped to L different CS offsets. If at least one of the SRs of a specific SR PUCCH group is positive, the AN is transmitted in a resource to which a CS offset corresponding to the specific SR PUCCH group is applied. If the number K of the SR PUCCHs configured with PF0 is equal to or less than L, the respective K SR PUCCHs may be mapped to K different CS offsets without grouping. In this case, the AN is transmitted in a resource to which a CS offset corresponding to a positive SR PUCCH is applied. If SR information for at least one SR PUCCH is a positive SR and a (highest-priority) SR PUCCH among the SR PUCCHs is in PF1, the AN is transmitted in a (corresponding) SR PF1 resource. If SR information for all of the SR PUCCH(s) is a negative SR, the AN is transmitted in an AN PF0 resource.

Opt. 2: if SR information for at least one SR PUCCH (in a specific SR PUCCH group) is a positive SR, the AN is transmitted in a resource resulting from applying a CS offset (corresponding to the specific SR PUCCH group) to an AN PF0 resource. In this case, a total of K SR PUCCHs may be grouped into L (e.g., L=2, K>L) SR PUCCH groups, and the respective L SR PUCCH groups may be mapped to K different CS offsets. In this case, if at least one of the SRs in the specific SR PUCCH group is positive, the AN is transmitted in a resource to which a CS offset corresponding to the specific SR PUCCH group is applied. If SR information for all of the SR PUCCH(s) is a negative SR, the AN is transmitted in an AN PF0 resource.

Opt. 3: if SR information for at least one SR PUCCH (in a specific SR PUCCH group) is a positive SR, the AN is transmitted in a specific SR PF1 resource (corresponding to the specific SR PUCCH group). In this case, a total of K SR PUCCHs are grouped into L (e.g., L is the number of SRs configured with F1, K>L) SR PUCCH groups, and then the respective L SR PUCCH groups may be mapped to L different CS offsets. In this case, if at least one of the SRs in the specific SR PUCCH group is positive, the AN is transmitted in an SR PF1 resource corresponding to the specific SR PUCCH group. If SR information for all of the SR PUCCH(s) is a negative SR, the AN is transmitted in an AN PF0 resource.

B. AN PF1 i. (multiple) SR PF0+(multiple) SR PF1

Opt. 1: if SR information for at least one SR PUCCH is a positive SR and (a highest-priority) SR PUCCH among SR PUCCHs is in PF0, the AN is transmitted in an AN PF1 resource (SR drop). If SR information for at least one SR PUCCH is a positive SR and a (highest-priority) SR PUCCH among SR PUCCHs is in PF1, the AN is transmitted in a (corresponding) SR PF1 resource. If SR information for all of the SR PUCCH(s) is a negative SR, the AN is transmitted in an AN PF1 resource.

Opt. 2: If SR information for at least one SR PUCCH (in a specific SR PUCCH group) is a positive SR, the AN is transmitted in a specific ST PF1 resource (corresponding to the specific SR PUCCH group). In this case, a total of K SR PUCCHs are grouped into L (e.g., L is the number of SRs configured with F1, K>L) SR PUCCH groups, and then the respective L SR PUCCH groups may be mapped to L different SR F1 resources. In this case, if at least one of the SRs in the specific SR PUCCH group is positive, the AN is transmitted in an SR F1 resource corresponding to the specific SR PUCCH group. If SR information for all of the SR PUCCH(s) is a negative SR, the AN is transmitted in an AN PF1 resource.

Herein, an SR PUCCH group may include one or more SR PUCCHs, and one or more SR PUCCH groups may be defined.

The foregoing description is summarized as follows.

(1) Case #1

A. AN PF0+single SR PF0=>AN+SR on AN PF0 (by CS offset)

B. AN PF0+single SR PF1=>AN+SR on AN PF0 (by CS offset) or SR PF1 (by CH selection)

C. AN PF1+single SR PF0=>AN only on AN PF1 (by SR drop)

D. AN PF1+single SR PF1=>AN+SR on SR PF1 (by CH selection)

(2) Case #2

A. AN PF0+multiple SR PF0=>AN+SR on AN PF0 (by CS offset & SR bundling)

B. AN PF0+multiple SR PF1=>AN+SR on AN PF0 (by CS offset & SR bundling) or SR F1 (by CH selection)

C. AN PF1+multiple SR PF0=>AN only on AN PF1 (by SR drop)
D. AN PF1+multiple SR PF1=>AN+SR on SR PF1 (by CH selection)
(3) Case #3
A. AN PF0+(multiple) SR PF0+(multiple) SR PF1
  i. Option 1
    1. If SR PF0 is a positive SR and has a highest priority, AN+SR on AN F0 (by CS offset & SR bundling). In this case, SR bundling is limited to SR F0.
    2. SR PF1 is a positive SR and has a highest priority, AN+SR on SR PF1 (by CH selection).
  ii. Option 2
    1. Irrespective of whether an SR PF is a positive SR, AN+SR on AN PF0 (by CS offset & SR bundling). In this case, both of SR PF0 and SR PF1 are subjected to SR bundling.
  iii. Option 3
    1. Irrespective of whether an SR PF is a positive SR, AN+SR on SR PF1 (by CH selection & SR bundling). In this case, both of SR PF0 and SR PF1 are subjected to SR bundling.
B. AN PF1+(multiple) SR PF0+(multiple) SR PF1
  i. Option 1
    1. If SR PF0 is a positive SR and has a highest priority, AN only on AN PF1 (by SR drop).
    2. If SR PF1 is a positive SR and has a highest priority, AN+SR on SR PF1 (by CH selection).
  ii. Option 2
    1. AN+SR on SR PF1 (by CH selection & SR bundling). In this case, both of SR PF0 and SR PF1 are subjected to SR bundling.

[Proposed Method #2] An A/N PUCCH resource and an SR PUCCH resource may overlap with each other in a slot (over all or part of the OFDM symbols of a PUCCH) on the time axis. In this case, the UE may determine whether to multiplex an A/N with a (positive) SR according to a relative relationship between the starting transmission time of (MUX PUCCH) to be used for possible multiplexing between the A/N and the (positive) SR and the starting transmission time of an SR PUCCH.

However, if the UE does not multiplex the A/N with the (positive) SR, the UE may drop transmission of one of the A/N and the (positive) SR.

For example, the UE may determine whether to multiplex the A/N with the (positive) SR depending on whether the starting transmission time of the SR PUCCH is earlier or later than the starting transmission time of the MUX PUCCH by $T_0$, as follows.

(1) If the starting transmission time of the SR PUCCH is earlier than the starting transmission time of the MUX PUCCH by $T_0$,
  A. one of the A/N and the (positive) SR is selected and transmitted.
    i. If the UCI state of the SR is positive SR, the SR is transmitted in the SR PUCCH resource (A/N transmission drop).
    ii. If the UCI state of the SR is negative SR, the AN is transmitted in the A/N PUCCH resource.

(2) If the starting transmission time of the SR PUCCH is later than (or coincides with) the starting transmission time of the MUX PUCCH by $T_0$,
  A. the A/N and the (positive) SR are multiplexed and transmitted (or the UCI multiplexing rule applied to the case in which an A/N PUCCH and an SR PUCCH overlap with each other over all OFDM symbols of a PUCCH is followed).
    i. The A/N PUCCH is in PUCCH format.
      1. If the UCI state of the SR is positive SR, the A/N is transmitted in a resource resulting from applying a CS/OCC/PRB offset to the A/N PUCCH.
      2. If the UCI state of the SR is negative SR, the AN is transmitted in the A/N PUCCH resource.
    ii. The A/N PUCCH is in PUCCH format 1.1.
      If the UCI state of the SR is positive SR, the AN is transmitted in the SR PUCCH resource. However, if the SR PUCCH is in PUCCH format 0, only the AN is transmitted, without the SR.
      2. If the UCI state of the SR is negative SR, the AN is transmitted in the A/N PUCCH resource.
    iii. The A/N PUCCH is in one of PUCCH formats 2, 3 and 4.
      If the UCI state of the SR is positive SR or negative SR,
      A. UCI payload is generated by representing the SR in explicit bit(s) and appending the SR to the A/N, and then the generated UCI is transmitted in the A/N PUCCH resource.

To may be one of the following values, and represented in (OFDM) symbols.
  (1) A UE processing time required to transmit an A/N (PUCCH) corresponding to a PDSCH after the PDSCH is received, according to a UE capability, and a value corresponding to the UE processing time.
  (2) A UE processing time required to transmit an A/N (PUCCH) indicated by a PDCCH after the PDCCH is received, according to a UE capability, and a value corresponding to the UE processing time.
  (3) A UE processing time required for demodulation according to a UE capability or a value corresponding to the UE processing time.
  (4) A value configured by higher-layer signaling (e.g., RRC signaling) and/or DCI.
  (5) A value preset between an eNB and a UE (e.g., a fixed value).

[Proposed method #2] may be applied when an A/N PUCCH is in PUCCH format 0/2/3/4.

In the NR system, if an A/N PUCCH and an SR PUCCH differ in their starting (OFDM) symbols, a method of determining whether to multiplex an A/N with an SR by comparing the starting (OFDM) symbol (or starting time) of an A/N PUCCH for possible A/N only transmission (hereinafter, referred to as A/N PUCCH 1) and the starting (OFDM) symbol (or starting time) of the SR PUCCH has been considered. For example, if the starting (OFDM) symbol of the SR PUCCH is earlier than the starting (OFDM) symbol of A/N PUCCH 1, the UE transmits the SR PUCCH, dropping A/N transmission. On the contrary, if the starting (OFDM) symbol of the SR PUCCH is later than (or coincides with) the starting (OFDM) symbol of A/N PUCCH 1, the UE may UCI-multiplex the SR with the A/N and transmit the multiplexed UCI on a single PUCCH. The above operation is based on the expectation that the UE will first process a PUCCH having an earlier starting (OFDM) symbol. In the NR system, however, when the UE multiplexes an A/N with an SR and transmits the multiplexed A/N and SR in a single PUCCH resource, if the A/N PUCCH is in PUCCH format 0/2/3/4, the single PUCCH resource may be a new A/N PUCCH resource (hereinafter, referred to as A/N PUCCH 2) selected based on a calculated total UCI payload size of the A/N and the SR. Therefore, when the UE determines that the starting (OFDM) symbol of the SR PUCCH is later than (or coincides with) the starting (OFDM) symbol of A/N PUCCH 1 and then is to transmit the A/N and the SR on A/N PUCCH 2, it may occur that the starting (OFDM) symbol of A/N PUCCH 2 is earlier than that of the SR PUCCH.

Therefore, for a more consistent UE operation, it may be preferred to compare the starting (OFDM) symbol of the SR PUCCH with the starting (OFDM) symbol of A/N PUCCH 2, instead of A/N PUCCH 1.

[Proposed Method #3] An A/N PUCCH resource and an SR PUCCH resource may overlap with each other in a slot (over all or part of OFDM symbols of a PUCCH) on the time axis. Herein, the starting transmission time of a PUCCH (MUX PUCCH) to be used for possible multiplexing between an A/N and a (positive) SR may be later than the starting transmission time of the SR PUCCH. In this case, if there is an on-going SR PUCCH transmission (in a best effort manner), the UE may multiplex the A/N with the (positive) SR and transmit the multiplexed A/N and SR on the MUX PUCCH, while discontinuing the SR PUCCH transmission.

Additionally, if an A/N PUCCH resource and an SR PUCCH resource overlap with each other (over all or part of the OFDM symbols of a PUCCH) on the time axis, the starting transmission time of a PUCCH (MUX PUCCH) to be used for possible multiplexing between an A/N and a (positive) SR may be later than the starting transmission time of the A/N PUCCH. In this case, if there is an on-going A/N PUCCH transmission (in the best effort manner), the UE may multiplex the A/N with the (positive) SR and transmit the multiplexed A/N and SR on the MUX PUCCH, while discontinuing the A/N PUCCH transmission.

It is to be noted that the above operation may be applied restrictively to a UE having a specific UE capability.

If the UE identifies the presence of an A/N PUCCH resource overlapped partially with an SR PUCCH on the time domain after SR transmission, the UE may simply drop A/N transmission. However, if the UE has a sufficient capability, the UE may attempt to multiplex an A/N with an SR and transmit the multiplexed A/N and SR in a single PUCCH resource, while discontinuing an on-going SR transmission, as far as the UE is sufficiently capable (i.e., in the best effort manner). On the contrary, after the UE performs A/N transmission, a positive SR for an SR PUCCH resource overlapped partially with an A/N PUCCH on the time axis may be generated. In this case, the UE may also attempt to multiplex an A/N with the SR and transmit the multiplexed A/N and SR in a single PUCCH resource, while discontinuing an on-going A/N transmission (i.e., in the best effort manner). In [proposed method #3], the UE may support multiplexed transmission of an A/N and an SR even when the SR collides with the A/N.

[Proposed Method #4] It may occur that an A/N PUCCH is in PF0 or PF1 and an A/N PUCCH resource and SR PUCCH resource(s) overlap with each other on the time axis in a slot (over all or part of the OFDM symbols of a PUCCH). In this case, the UE may apply a different UCI multiplexing rule to an A/N and an SR according to the number of SR processes corresponding to the SR PUCCH resource(s) overlapped with the A/N PUCCH resource.

For example, the UE may apply a UCI multiplexing rule to the A/N and the SR depending on whether there are one or more SR processes corresponding to the SR PUCCH resource(s) overlapped with the A/N PUCCH resource, as follows.

(1) There is on SR process (overlapped with the A/N).
  A. The A/N PUCCH is in PUCCH format 0.
    i. If the UCI state of the SR is positive SR, the A/N is transmitted in a resource resulting from applying a CS/OCC/PRB offset to the A/N PUCCH.
    ii. If the UCI state of the SR is negative SR, the A/N is transmitted in the A/N PUCCH resource.
  B. The A/N PUCCH is in PUCCH format 1.
    i. If the UCI state of the SR is positive SR, the A/N is transmitted in the SR PUCCH resource.
    ii. If the UCI state of the SR is negative SR, the A/N is transmitted in the A/N PUCCH resource.

(2) There are two or more SR processes (overlapped with the A/N).
  A. The A/N PUCCH is in PF 0 or PF1.
    i. Multiple bits representing an SR (for the plurality of SR processes) are added to the A/N, and the whole UCI is transmitted in the A/N PUCCH resource. The A/N PUCCH resource may be a resource selected based on the size of UCI payload including the A/N and the multi-bit SR, and may be in one of PF 2, PF 3 and PF 4.

SR PUCCH resource configurations corresponding to the plurality of SR processes may be identified by specific IDs and may be independent of each other.

If an A/N PUCCH is in PF0 or PF1, 2 or fewer bits is supported as an A/N payload size in the NR system. If information about one SR process is added, the UE may represent a positive/negative SR for the SR process by using a resource selection scheme instead of a PUCCH format (e.g., PF2/3/4) for a large UCI payload size with a smaller multiplexing capacity. However, if an A/N PUCCH resource overlaps with SR PUCCH resource(s) corresponding to a plurality of SR processes, the UE is required to transmit information indicating which SR process is a positive/negative SR in addition to a positive/negative SR. In this case, since a large number of bits is required to represent the SR information, it may be more efficient to use the PUCCH format (e/g. PF2/3/4) for a large UCI payload size of 3 or more bits than to use a resource selection scheme as used for one SR process.

[Proposed Method #5] If an A/N PUCCH resource and a CSI SR PUCCH resource may overlap with each other in a slot (over all or part of OFDM symbols of a PUCCH) on the time axis, multiplexing between an A/N and CSI is supported as follows.

(1) The A/N PUCCH is not based on a DL assignment.
  A. If an A/N PUCCH resource corresponding to (indicated by) PDSCH(s) (and/or PDCCH(s)) which has been received (or of which the transmission has started) until a time earlier than the starting transmission time of a CSI PUCCH by $T_0$ overlaps with the CSI PUCCH resource on the time axis,
    i. the A/N and the CSI are multiplexed and transmitted on the CSI PUCCH.
  B. Else
    i. Opt. 1: The CSI is transmitted in the CSI PUCCH resource (A/N transmission drop).
    ii. Opt. 2: The A/N is transmitted in the A/N PUCCH resource (CSI transmission dropped).

(2) The A/N PUCCH resource is based on a DL assignment.
  A. The A/N and the CSI are multiplexed and transmitted in an A/N resource (reselected based on total UCI). However, if a time is too short to update the CSI (e.g., a CSI reference resource is earlier than the starting transmission time of the A/N PUCCH resource by $T_1$), the UE may not update the CSI.

The CSI reference resource means a time resource referred to for CSI calculation. A (valid) DL slot may mean a slot configured as a DL slot (for a UE) and/or a slot which is not included in a measurement gap and/or a slot included in a DL BWP for which CSI is reported.

$T_0$ may be one of the following values, and represented in (OFDM) symbols.

(1) A UE processing time required to transmit an A/N (PUCCH) corresponding to a PDSCH after the PDSCH is received, according to a UE capability, and a value corresponding to the UE processing time.

(2) A UE processing time required to transmit an A/N (PUCCH) indicated by a PDCCH after the PDCCH is received, according to a UE capability, and a value corresponding to the UE processing time.

(3) A UE processing time required for demodulation according to a UE capability or a value corresponding to the UE processing time.

(4) A value configured by higher-layer signaling (e.g., RRC signaling) and/or DCI.

(5) A value preset between an eNB and a UE (e.g., a fixed value).

$T_1$ may be one of the following values, and represented in (OFDM) symbols.

(1) A UE processing time required to calculate and report CSI, and a value corresponding to the UE processing time.

(2) A value configured by higher-layer signaling (e.g., RRC signaling) and/or DCI.

(3) A value preset between an eNB and a UE (e.g., a fixed value).

In the NR system, when an A/N for a PDSCH based on a DL assignment (=DL scheduling DCI) is multiplexed with CSI, the multiplexed A/N and CSI may be transmitted in an A/N PUCCH resource reselected based on the total size of UCI payload of the A/N and the CSI. When an A/N PUCCH overlaps partially with a CSI PUCCH on the time axis, the multiplexing operation may also be applied. However, if a CSI reference resource is earlier than the starting transmission time of the A/N PUCCH by a UE processing time $T_0$, it may be difficult for the UE to update the CSI. Therefore, it is proposed that when it is difficult to update CSI, the CSI is not updated (notably, the non-updated CSI is still multiplexed with an A/N and reported), and otherwise, the CSI is updated, multiplexed with the A/N, and reported.

On the other hand, if the A/N does not correspond to a DL assignment-based PDSCH, the UE may multiplex the A/N with the CSI and transmit the multiplexed A/N and CSI on the CSI PUCCH. When the A/N is transmitted on the CSI PUCCH, multiplexing between the A/N and the CSI may be allowed, only when a minimum UL timing for A/N transmission is ensured. That is, only when an A/N PUCCH (and/or PDCCH(s)) received (or starting to be transmitted) until a time earlier than the starting transmission time of a CSI PUCCH by $T_1$ overlaps with the CSI PUCCH, the UE may multiplex the A/N with the CSI, and otherwise, the UE may transmit only the CSI PUCCH, while dropping the A/N transmission.

[Proposed Method #6] The UE may puncture some (OFDM) symbol(s) in a specific PUCCH (or PUSCH) resource (hereinafter, referred to as UL-CH1), and transmit another PUCCH (or PUSCH) resource (hereinafter, referred to as UL-CH2) in the (OFDM) symbol(s). In this case, transmission power may be applied to UL-CH2 in the following manner.

(1) Opt. 1

A. Transmission power is configured for UL-CH2 independently (of that of UL-CH1).

i. If the transmission power of UL-CH2 falls within a predetermined range with respect to the transmission power of UL-CH1, the UE may transmit resources resulting from the puncturing of UL-CH1 (non-continuously).

ii. If the transmission power of UL-CH2 is outside the predetermined range with respect to the transmission power of UL-CH1, 1. when there is a DM-RS within the resources resulting from the UL-CH1 puncturing, the remaining resources of UL-CH1 are transmitted. Herein, the DM-RS is a reference signal for data demodulation.

2. When there is a DM-RS within the resources resulting from the UL-CH1 puncturing, the remaining resources of UL-CH1 are not transmitted.

(2) Opt. 2

A. The same transmission power as that of UL-CH1 is applied to UL-CH2.

(3) Opt. 3

A. Let transmission power configured for UL-CH2 independently (of UL-CH1) be denoted by TXP1 and maximum transmission power ensuring phase continuity for UL-CH1 be denoted by TXP2. Then, min(TXP1, TXP2) is applied as the transmission power of UL-CH2. Phase continuity means that there is no phase difference between resources before the UL-CH1 puncturing and resources after the UL-CH1 puncturing, except for a channel change-caused phase difference.

i. TXP2 may be any value that the UE selects according to implementation.

i. An existing UL power control (PC) rule set for UL-CH2 may be lifted exceptionally.

For example, it may occur that the UE should perform PUCCH transmission for an emergency service (e.g., URLLC) in the middle of PUSCH transmission. In this case, since the PUSCH transmission is on-going, the UE should discontinue the PUSCH transmission and transmit a PUCCH. From the perspective of PUSCH transmission, only OFDM symbols carrying the PUCCH may be punctured. In this case, the transmission power of the PUCCH in the puncturing period may be different from that of the PUSCH. Therefore, as a power amplifier (PA) configuration is initialized, a PUSCH resource transmitted before the puncturing period and a PUSCH resource transmitted after the puncturing period may have different phases (in transmission signals). The problem is attributed to a great change in the transmission power of the UE, caused by the PUCCH transmission in the middle of the PUSCH transmission. Therefore, when the UE punctures some (OFDM) symbol(s) in a PUCCH (or PUSCH) resource (i.e., UL-CH1) and transmits another PUCCH (or PUSCH) resource (i.e., UL-CH2) in the (OFDM) symbol(s), the UE may perform the following operation to reduce a phase change.

(1) The UE may set the transmission power of UL-CH2 equal to that of UL-CH1.

(2) Or, the UE performs independent UL power control for UL-CH2, wherein if there is a power difference between UL-CH2 and UL-CH1, causing a phase difference, the remaining UL-CH1 resources after the transmission of UL-CH2 are transmitted, only when the remaining UL-CH1 resources include a DM-RS.

PUCCH/PUSCH Multiplexing

[Proposed method #6.1] An A/N PUCCH resource and a PUSCH resource may overlap with each other in a slot (over all or part of the OFDM symbols of a PUCCH or PUSCH) on the time axis. In this case, the UE determines whether to multiplex an A/N with UL data (or whether to piggyback the A/N to the PUSCH) depending on whether an A/N PUCCH resource corresponding to (indicated by) PDSCH(s) (and/or PDCCH(s)) which has been received (or of which the transmission has started) until a specific time (earlier than a reference time) overlaps with the PUSCH resource.

However, if the UE does not multiplex the A/N with the UL data, the UE may drop transmission of one of the A/N and the UL data.

For example, the UE may determine whether to piggyback an A/N to a PUSCH depending on whether an A/N PUCCH resource corresponding to (or indicated by) PDSCH(s) (and/or PDCCH(s)) which has been received (or of which the transmission has started) until a time earlier than the starting transmission time (e.g., starting symbol) of the PUSCH by $T_0$ overlaps with the PUSCH on the time axis.

(1) If the A/N PUCCH resource corresponding to (indicated by) the PDSCH(s) (and/or PDCCH(s)) which has been received (or of which the transmission has started) until the time earlier than the starting transmission time of the PUSCH by $T_0$ overlaps with the PUSCH resource on the time axis, the UE multiplexes the A/N with the UL data and transmits the multiplexed A/N and UL data (i.e., the UE piggybacks the A/N to the PUSCH and transmits the PUSCH piggybacked with the A/N) (or the UE follows the UCI multiplexing rule applied to the case in which an A/N PUCCH and a PUSCH overlap with each other over all of the OFDM symbols of the PUCCH or the PUSCH).

In any other case other than (1) (e.g., if an A/N PUCCH resource corresponding to PDSCH(s) (and/or PDCCH(s)) which has been received (or of which the transmission has started/ended) after the time earlier than the starting transmission time (e.g., starting symbol) of the PUSCH by $T_0$ overlaps with the PUSCH on the time axis, if the A/N PUCCH resource corresponding to (indicated by) the PDSCH(s) (and/or PDCCH(s)) which has been received (or of which the transmission has started) until the time earlier than the starting transmission time (e.g., starting symbol) of the PUSCH by $T_0$ does not overlap with the PUSCH on the time axis, or if there is no A/N PUCCH resource corresponding to (indicated by) the PDSCH(s) (and/or PDCCH(s)) which has been received (or of which the transmission has started) until the time earlier than the starting transmission time (e.g., starting symbol) of the PUSCH by $T_0$, Opt. 1: the UL data is transmitted in the PUSCH resource (A/N transmission drop).

Opt. 2: the A/N is transmitted in the A/N PUCCH resource (PUSCH transmission drop).

For a UE of a specific version, however, an A/N for a PDSCH scheduled by a DL assignment, received after a UL grant for a PUSCH is received may not be subjected to UCI piggyback.

To may be one of the following values, and represented in (OFDM) symbols.

(1) A UE processing time required to transmit an A/N after a PDSCH ends, according to a UE capability, and a value corresponding to the UE processing time. Or a UE processing time required for UCI (PUCCH) transmission according to a UE capability, and a value corresponding to the UE processing time.

(2) A UE processing time required to transmit an A/N (PUCCH) corresponding to a PDSCH after the PDSCH is received, according to a UE capability, and a value corresponding to the UE processing time. Or a UE processing time required for UCI (PUCCH) transmission according to a UE capability, and a value corresponding to the UE processing time.

(3) A UE processing time required to transmit an A/N (PUCCH) indicated by a PDCCH after the PDCCH is received, according to a UE capability, and a value corresponding to the UE processing time.

(3) A UE processing time required for (specific) UCI transmission according to a UE capability, or a value corresponding to the UE processing time.

(4) A UE processing time required for PUSCH transmission after a UL grant is received, according to a UE capability, or a value corresponding to the UE processing time.

(5) A value configured by higher-layer signaling (e.g., RRC signaling) and/or DCI.

(6) A value preset between an eNB and a UE (e.g., a fixed value).

[Proposed method #6.1] may also be extended to a PUCCH other than the A/N PUCCH.

Figure 14:
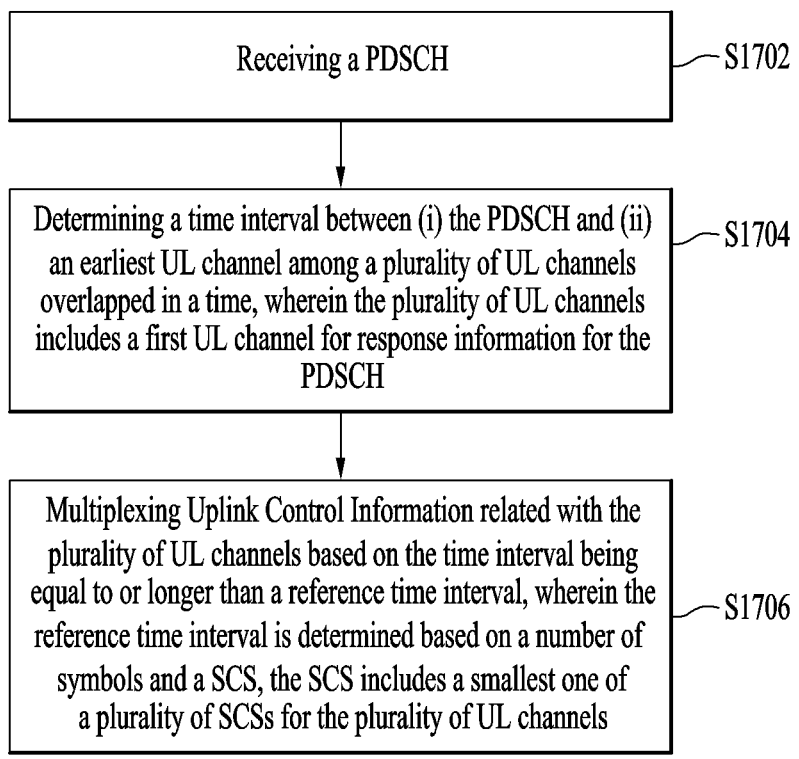

In the NR system, if the starting (OFDM) symbol (or starting time) of a PUCCH coincides with the starting (OFDM) symbol (or starting time) of a PUSCH, a UE operation of applying the same UCI multiplexing rule as applied to a case in which a PUCCH and a PUSCH fully overlap with each other on the time axis has been agreed on. Since the PUCCH and the PUSCH are multiplexed and transmitted in a PUSCH resource, if a processing time required to transmit specific UCI in the PUCCH is not secured until before the beginning of the transmission of the PUSCH resource, the PUCCH may not be multiplexed in the PUSCH. For example, if the PUCCH is a PUCCH for HARQ-ACK transmission (A/N PUCCH), the UE may transmit only an A/N for PDSCH(s) (and/or PDCCH(s)) received until a time earlier than the starting transmission time of the PUSCH by $T_0$ (a time required to transmit the A/N after receiving the PDSCH according to a UE capability). Therefore, similarly to the UCI multiplexing rule between an SR PUCCH and an A/N PUCCH ([proposed method #1]), the UE may determine whether to perform UCI piggyback for an A/N depending on whether an A/N PUCCH resource for the PDSCH(s) (and/or PDCCH(s)) received until the time earlier than the starting transmission time of the PUSCH by $T_0$ overlaps with a PUSCH resource. That is, if the A/N PUCCH resource for the PDSCH(s) (and/or PDCCH(s)) received until the time earlier than the starting transmission time of the PUSCH by $T_0$ overlaps with the PUSCH resource, the UE transmits the A/N UCI-piggybacked to the PUSCH, and otherwise, the UE may transmit only the PUSCH, dropping the A/N transmission. FIG. 14 illustrates an exemplary operation according to [proposed method #6.1].

In a modification to [proposed method #6.1], if a CSI PUCCH overlaps with a PUSCH on the time axis, the UE may UCI-piggyback CSI to the PUSCH without transmitting the CSI PUCCH. Herein, if a processing time for CSI calculation is not sufficient until the UE prepares for the PUSCH transmission, the UE may not update the CSI.

If an A/N PUCCH resource (fully or partially) overlaps with another UL channel on the time axis, the UE may operate as follows according to [proposed method #1] and [proposed method #6.1] in combination.

(1) If a UL channel overlapped with the A/N PUCCH on the time axis is not configured/indicated until a time earlier than the starting transmission time (or slot) of the A/N PUCCH by $T_0$ (e.g., the UL channel may be a PUCCH carrying an SR or a PUSCH carrying a UL-SCH TB), A. the UE transmits only the A/N in the A/N PUCCH resource (even though a UL channel overlaps with the A/N PUCCH after the time, the UE ignores the UL channel or drops/gives up the UL channel transmission).

(2) In the case where a UL channel overlapped with the A/N PUCCH on the time axis is configured/indicated until the time earlier than the starting transmission time (or slot)

of the A/N PUCCH by $T_0$ (e.g., the UL channel may be a PUCCH carrying an SR or a PUSCH carrying a UL-SCH TB), A. when the UL channel is a PUCCH (hereinafter, referred to as PUCCH-A) carrying (specific) UCI (hereinafter, referred to as UCI-A), i. if an A/N PUCCH resource corresponding to (or indicated by) PDSCH(s) (and/or PUDCCH(s)) which has been received (or of which the transmission has started) until a time earlier than the starting transmission time of PUCCH-A by $T_1$ overlaps with a PUCCH-A resource on the time axis, the UE multiplexes the A/N with UCI-A and transmits the multiplexed A/N and UCI-A in a single PUCCH resource.

ii. In any other case (e.g., if the A/N PUCCH resource corresponding to (indicated by) the PDSCH(s) (and/or PUDCCH(s)) which has been received (or of which the transmission has started) until the time earlier than the starting transmission time of PUCCH-A by $T_1$ does not overlap with the PUCCH-A resource on the time axis, or if there is no A/N PUCCH resource corresponding to (indicated by) the PDSCH(s) (and/or PUDCCH(s)) which has been received (or of which the transmission has started) until the time earlier than the starting transmission time of PUCCH-A by $T_1$, the UE selects and transmits one of the A/N and UCI-A.

Opt. 1: UCI-A (only) is transmitted in the PUCCH-A resource (A/N transmission drop).

Opt. 2: The A/N (only) is transmitted in the A/N resource (UCI-A transmission drop).

Opt. 3: Opt. 1 or Opt. 2 is applied according to the state of UCI-A.

B. In the case where the UL channel is a PUSCH carrying a UL-SCH TB (or UL data), i. if an A/N PUCCH resource corresponding to (indicated by) PDSCH(s) (and/or PUDCCH(s)) which has been received (or of which the transmission has started) until a time earlier than the starting transmission time of the PUSCH by $T_2$ overlaps with a PUSCH resource on the time axis, 1. the A/N is multiplexed with the UL data and transmitted (i.e., the A/N is UCI-piggybacked to the PUSCH) (or the UCI multiplexing rule applied to the case in which an A/N PUCCH and a PUSCH fully overlap with each other over all of the OFDM symbols of the PUCCH or the PUSCH is followed).

ii. In any other case (e.g., if the A/N PUCCH resource corresponding to (indicated by) the PDSCH(s) (and/or PUDCCH(s)) which has been received (or of which the transmission has started) until the time earlier than the starting transmission time of the PUSCH by $T_2$ does not overlap with the PUSCH resource on the time axis, or of there is no A/N PUCCH resource corresponding to (indicated by) the PDSCH(s) (and/or PUDCCH(s)) which has been received (or of which the transmission has started) until the time earlier than the starting transmission time of the PUSCH by $T_2$), one of the A/N and the UL-SCH is selected and transmitted.

Opt. 1: the UL-SCH (only) is transmitted in the PUSCH resource (A/N transmission drop).

Opt. 2: the A/N (only) is transmitted in the A/N PUCCH resource (UL-SCH transmission drop).

Each of $T_0$, $T_1$, and $T_2$ may be one of the following values, and represented in (OFDM) symbols.

(1) A UE processing time required to transmit an A/N (PUCCH) corresponding to a PDSCH after the PDSCH is received, according to a UE capability, and a value corresponding to the UE processing time.

(2) A UE processing time required to transmit an A/N (PUCCH) indicated by a PDCCH after the PDCCH is received, according to a UE capability, and a value corresponding to the UE processing time.

(3) A UE processing time required for (specific) UCI transmission according to a UE capability or a value corresponding to the UE processing time.

(4) A UE processing time required for PUSCH transmission after a UL grant is received, according to a UE capability or a value corresponding to the UE processing time.

(5) A value configured by higher-layer signaling (e.g., RRC signaling) and/or DCI.

(6) A value preset between an eNB and a UE (e.g., a fixed value).

In a modification of the present disclosure, if PUCCH-PUCH overlap or PUCCH-PUSCH overlap occurs on the time axis, the UE may apply the following (generalized) UCI multiplexing rule.

(1) If a UL channel overlapped with a PUCCH resource for specific UCI on the time axis is not configured/indicated until a time earlier than the starting transmission time (or slot) of the PUCCH resource by $T_0$ (e.g., the UL channel may be a PUCCH or a PUSCH), A. the UE transmits only the UCI in the PUCCH resource (even though a UL channel overlaps with the PUCCH after the time, the UE ignores the UL channel or drops/gives up the UL channel transmission).

(2) If a PUCCH resource ($PUCCH_1$) for specific $UCI_1$ is first configured/indicated and then a PUCCH resource ($PUCCH_2$) for specific $UCI_2$ overlapped with $PUCCH_1$ on the time axis is configured/indicated until a time earlier than the starting transmission time (or slot) of the PUCCH resource ($PUCCH_1$) for $UCI_1$ by $T_0$, A. the UE multiplexes $UCI_1$ with $UCI_2$ and transmits the multiplexed $UCI_1$ and $UCI_2$ in a single PUCCH resource.

i. The single PUCCH resource may be a resource other than $PUCCH_1$ and $PUCCH_2$.

(3) If a PUCCH resource for specific UCI is first configured/indicated and then a PUSCH resource for a UL-SCH TB overlapped with the PUCCH resource on the time axis is configured/indicated until a time earlier than the starting transmission time (or slot) of the PUCCH resource for the specific UCI by $T_0$, A. the UE multiplexes the UCI with the UL-SCH and transmits the multiplexed UCI and UL-SCH in the PUSCH resource (i.e., UCI piggyback).

(4) If a UL channel overlapped with a PUSCH resource for a specific UL-SCH on the time axis is not configured/indicated until a time earlier than the starting transmission time (or slot) of the PUSCH resource for the specific UL-SCH by $T_1$ (e.g., the UL channel may be a PUCCH), A. the UE transmits only the specific UL-SCH in the PUSCH resource (even though a UL channel overlaps with the PUSCH after the time, the UE ignores the UL channel or drops/gives up the UL channel transmission).

(5) If a PUSCH resource for a specific UL-SCH is first configured/indicated and then a PUCCH resource for specific UCI overlapped with the PUSCH resource on the time axis is configured/indicated until a time earlier than the starting transmission time (or slot) of the PUSCH resource by $T_1$, A. the UE multiplexes the UCI with the UL-SCH TB and transmits the multiplexed UCI and UL-SCH TB in the PUSCH resource (i.e., UCI piggyback).

Each of $T_0$ and $T_1$ may be one of the following values, and represented in (OFDM) symbols.

(1) A UE processing time required to transmit an A/N (PUCCH) corresponding to a PDSCH after the PDSCH is received, according to a UE capability, and a value corresponding to the UE processing time.

(2) A UE processing time required to transmit an A/N (PUCCH) indicated by a PDCCH after the PDCCH is received, according to a UE capability, and a value corresponding to the UE processing time.

(3) A UE processing time required for (specific) UCI transmission according to a UE capability or a value corresponding to the UE processing time.

(4) A UE processing time required for PUSCH transmission after a UL grant is received, according to a UE capability or a value corresponding to the UE processing time.

(5) A value configured by higher-layer signaling (e.g., RRC signaling) and/or DCI.

(6) A value preset between an eNB and a UE (e.g., a fixed value).

If specific UCI is an A/N, a time when a PUCCH resource for the UCI is configured/indicated may be considered to be a time when a PDSCH corresponding to the A/N is received (ends).

The operation of first configuring/indicating a PUCCH resource for specific UCI may include configuring the PUCCH resource based on a higher-layer signal (e.g., RRC signal). For example, a PUCCH resource preconfigured by higher-layer signaling may always be considered as configured/indicated earlier than a PUCCH resource indicated by DCI. For example, $UCI_1$ and $UCI_2$ may be an SR and an A/N, respectively or (periodic) CSI and an HARQ-ACK, respectively.

It is to be noted that the following multiplexing operation may be performed for $UCI_1$ and $UCI_2$.

(1) $UCI_1$=SR and $UCI_2$=A/N
A. The A/N PUCCH is in PUCCH format 0.
i. If the UCI state of the SR is positive SR,
1. The A/N is transmitted in a resource resulting from applying a CS/OCC/PRB offset to the A/N PUCCH.
ii. If the UCI state of the SR is negative SR,
1. the A/N is transmitted in the A/N PUCCH resource.
B. The A/N PUCCH is in PUCCH format 1,
i. If the UCI state of the SR is positive SR,
1. the A/N is transmitted in the SR PUCCH resource.
A. However, if the SR PUCCH is in PUCCH format 0, only the A/N is transmitted while the SR transmission is dropped.
ii. If the UCI state of the SR is negative SR,
1. the A/N is transmitted in the A/N PUCCH resource.
C. The A/N PUCCH is in one of PUCCH formats 2, 3 and 4.
i. If the UCI state of the SR is positive SR or negative SR,
1. UCI payload is generated by representing the SR in explicit bit(s) and appending the SR to the A/N, and the UCI is transmitted in the A/N PUCCH resource.

(2) $UCI_1$=CSI and $UCI_2$=A/N
A. If the A/N PUCCH is indicated by a DL assignment,
i. the A/N and the CSI are multiplexed and transmitted in the A/N PUCCH resource.
B. If the A/N PUCCH is not indicated by a DL assignment,
i. the A/N and the CSI are multiplexed and transmitted in the CSI PUCCH resource.

[Proposed Method #7] An A/N PUCCH resource and a PUSCH resource may overlap with each other in a slot (over all or part of the OFDM symbols of a PUCCH or a PUSCH) on the time axis. The starting transmission time of the A/N PUCCH may be later than the transmission time of the PUSCH. In this case, if there is an on-going PUSCH transmission (in the best effort manner), the UE may transmit the A/N on the A/N PUCCH, discontinuing the PUSCH transmission.

Additionally, an A/N PUCCH resource and a PUSCH resource may overlap with each other in a slot (over all or part of the OFDM symbols of a PUCCH or a PUSCH) on the time axis. The starting transmission time of the A/N PUCCH may be earlier than the transmission time of the PUSCH. In this case, if there is an on-going PUCCH transmission (in the best effort manner), the UE may piggyback the A/N to the PUSCH, discontinuing the PUCCH transmission.

If the UE identifies the presence of an A/N PUCCH resource partially overlapped with the PUCCH on the time axis after transmitting the PUSCH, the UE may simply drop the A/N transmission. However, if the UE is sufficiently capable, the UE may attempt to transmit the A/N in the A/N PUCCH resource, discontinuing the on-going PUSCH transmission (i.e., in the best effort manner), if possible. By the operation of [proposed method #6.1], the UE may support the A/N transmission as much as possible even though the PUSCH collides with the A/N.

[Proposed Method #8] In the NR system, to certainly indicate to the UE whether an aperiodic CSI (A-CSI) only PUSCH is to be transmitted, a UL-SCH indicator indicating the presence or absence of data (e.g., a UL-SCH TB, which is referred to simply as a UL-SCH) in a PUSCH as well as an A-CSI triggering field indicating whether A-CSI is to be reported may be included in a UL grant. For example, the A-CSI triggering field may include N bits, and the UL-SCH indicator may include 1 bit. When the UL-SCH indicator indicates the absence of a UL-SCH and the A-CSI triggering field indicates A-CSI reporting, the UE may determine that A-CSI only PUSCH transmission has been indicated. However, when the UL-SCH indicator indicates the absence of a UL-SCH and the A-CSI triggering field indicates no A-CSI reporting, the UE may face ambiguity in interpreting this case. Accordingly, when the UL-SCH indicator indicates the absence of a UL-SCH and the A-CSI triggering field indicates no A-CSI reporting, it is proposed that the UE interprets this case as one of the following meanings.

(1) The UE transmits a UCI only PUSCH without the UL-SCH. The transmission of the UCI only PUSCH without the UL-SCH includes piggybacking a PUSCH with UCI indicated/configured for transmission without UL data in the same slot/time.

(2) The UE determines this case to be an error case. Accordingly, the UE may expect no PUSCH transmission. The expectation of no PUSCH transmission includes, for example, dropping the PUSCH transmission or discarding DCI that schedules the PUSCH. The discarding of DCI includes not performing an operation indicated by the DCI/skipping the operation.

(3) When no UL-SCH (or UL data) transmission on a PUSCH and no A-CSI transmission are indicated, the UE may transmit the UCI only PUSCH without the UL-SCH by multiplexing UCI(s) of specific PUCCH(s) in an indicated PUSCH resource. When the UCI(s) includes only an HARQ-ACK, the UE may transmit only the HARQ-ACK in the PUSCH resource. In this case, all (available) REs may be allocated to the HARQ-ACK as follows. For example, all REs except for symbols or REs carrying an RS in a PUSCH resource area may be allocated to the HARQ-ACK. The HARQ-ACK may be mapped only to non-DM-RS symbol(s) after the first DM-RS (e.g., in the case of DMRS or data mapping type B) according to a general rule or also to OFDM symbol(s) before the first DM-RS (e.g., in the case of DMRS or data mapping type A).

(4) When no UL-SCH (or UL data) transmission on a PUSCH and no A-CSI transmission are indicated, the UE may transmit the UL-SCH (or UL data) in the indicated PUSCH resource, while determining that the PUSCH resource is not allowed for UCI piggyback.

(5) When there are a UCI piggyback (on/off) field (referred to as field A) and an A-CSI triggering (on/off) field (referred to as field B) in DCI that schedules a PUSCH, PUSCH scheduling information for the UE may be represented in four states produced by combining two states of each of the fields. For example, the following PUSCH scheduling information may be represented by field A and field B. When field A is On/Off, this may mean that UCI piggyback is allowed for the PUSCH ('On') or that UCI piggyback is not allowed for the PUSCH (Off). Further, when field B is On/Off, this may mean that A-CSI reporting is indicated ('On') or that no A-CSI reporting is indicated ('Off').

Field A='On' and Field B='Off'

A UL-SCH exists in the PUSCH, with no A-CSI reporting indicated, and UCI piggyback is allowed for PUCCH(s) satisfying the UCI multiplexing condition (with the PUSCH).

Field A='On' and Field B='On'

A UL-SCH exists in the PUSCH, with A-CSI reporting indicated, and UCI piggyback is allowed for PUCCH(s) satisfying the UCI multiplexing condition (with the PUSCH).

Field A='Off' and Field B='Off'

A UL-SCH exists in the PUSCH, with no A-CSI reporting indicated, and UCI piggyback is not allowed for PUCCH(s) satisfying the UCI multiplexing condition (with the PUSCH).

Field A='Off' and Field B='On'

A UL-SCH does not exist in the PUSCH, with A-CSI reporting indicated, and UCI piggyback is allowed for PUCCH(s) satisfying the UCI multiplexing condition (with the PUSCH).

[Proposed Method #9] When the UE performs UCI multiplexing for PUCCH(s)/PUSCH(s) overlapped with each other on the time axis, there may be shortage of a UE processing time in view of a flexible UL timing configuration for the PUCCH or the PUSCH. To prevent the shortage of the UE processing time, the following two timeline conditions (referred to as a multiplexing timeline condition) may be considered to determine whether UCI multiplexing is to be performed for (time-axis) overlapped PUCCH(s)/PUSCH(s).

(1) The last symbol of a PDSCH corresponding to an HARQ-ACK is received $N1^+=\{N1+d1\}$ symbols before the starting symbol of the earliest of the (time-axis) overlapped PUCCH(s)/PUSCH(s), and/or (2) The last symbol of a PDCCH indicating (e.g., triggering) PUCCH or PUSCH transmission is received $N2^+=\{N2+d2\}$ symbols before the starting symbol of the earliest of the (time-axis) overlapped PUCCH(s)/PUSCH(s).

In this regard, 3GPP TS 38.213 V15.2.0 (2018-06) (referred to as 38.213) published before the priority right date of the present disclosure defines the following.

3GPP TS 38.213 V15.2.0 (2018-06): Timeline for UCI Multiplexin

| 9.2.5 UE procedure for reporting multiple UCI types |
| --- |
| (...)<br>If a UE would transmit multiple overlapping PUCCHs without repetitions in a slot or overlapping PUCCH(s) without repetitions and PUSCH(s) in a slot, the UE is configured to multiplex different UCI types in one PUCCH, and one of the multiple overlapping PUCCHs or PUSCHs is in response to a DCI format detection by the UE, the UE multiplexes all corresponding UCI types if the following conditions are met.<br>If one of the PUCCHs or PUSCHs is in response to a DCI format detection by the UE, the UE expects that the first symbol of the earliest PUCCH or PUSCH, among the overlapping PUCCHs and PUSCHS in the slot, is not before symbol $N_1^+ + d_{1,1} + d_{1,2}$ after a last symbol of any corresponding PDSCH or SPS PDSCH release and is not before symbol $N_2^+ + d_{2,1}$ after a last symbol of any corresponding PDCCH where $N_1^+$ is obtained by adding one symbol to a number of symbols $N_1$ corresponding to a PDSCH reception time for the UE PDSCH processing capability, $N_2^+$ is obtained by adding one symbol to a number of symbols $N_2$ corresponding to a PUSCH preparation time for the UE PUSCH processing capability. A UE does not expect a PUCCH or a PUSCH that is in response to a DCI format detection to overlap with any other PUCCH or PUSCH that does not satisfy the above $N_1^+ + d_{1,1} + d_{1,2}$ and $N_2^+ + d_{2,1}$ timing conditions. |

In this proposal, $N1^+$ may correspond to $N_1^+(=N_1+1)+d_{1,1}+d_{1,2}$ in 38.213, and $N2^+$ may correspond to $N_2^+(=N_2+1)+d_{2,1}$ in 38.213. N1 (or $N_1$) represents a minimum PDSCH processing time defined based on a UE capability, and N2 (or $N_2$) represents a minimum PUSCH processing time defined based on a UE capability. $d_{x,x}$ is an integer equal to 0 or larger, which may be, for example, a value predefined in consideration of the position of a scheduled symbol or BWP switching.

Table 4 and Table 5 list exemplary values of $N_1$ and $N_2$ defined in 38.213, respectively.

TABLE 4

| | PDSCH processing time ($N_1$ symbols) | |
| --- | --- | --- |
| u/SCS | Front-loaded DMRS only | Front-loaded + additional DMRS |
| 0/15 kHz | 8 | 13 |
| 1/30 kHz | 10 | 13 |
| 2/60 kHz | 17 | 20 |
| 3/120 kHz | 20 | 24 |

TABLE 5

| u/SCS | PUSCH processing time ($N_2$ symbols) |
| --- | --- |
| 0/15 kHz | 10 |
| 1/30 kHz | 12 |
| 2/60 kHz | 23 |
| 3/120 kHz | 36 |

Figure 13:
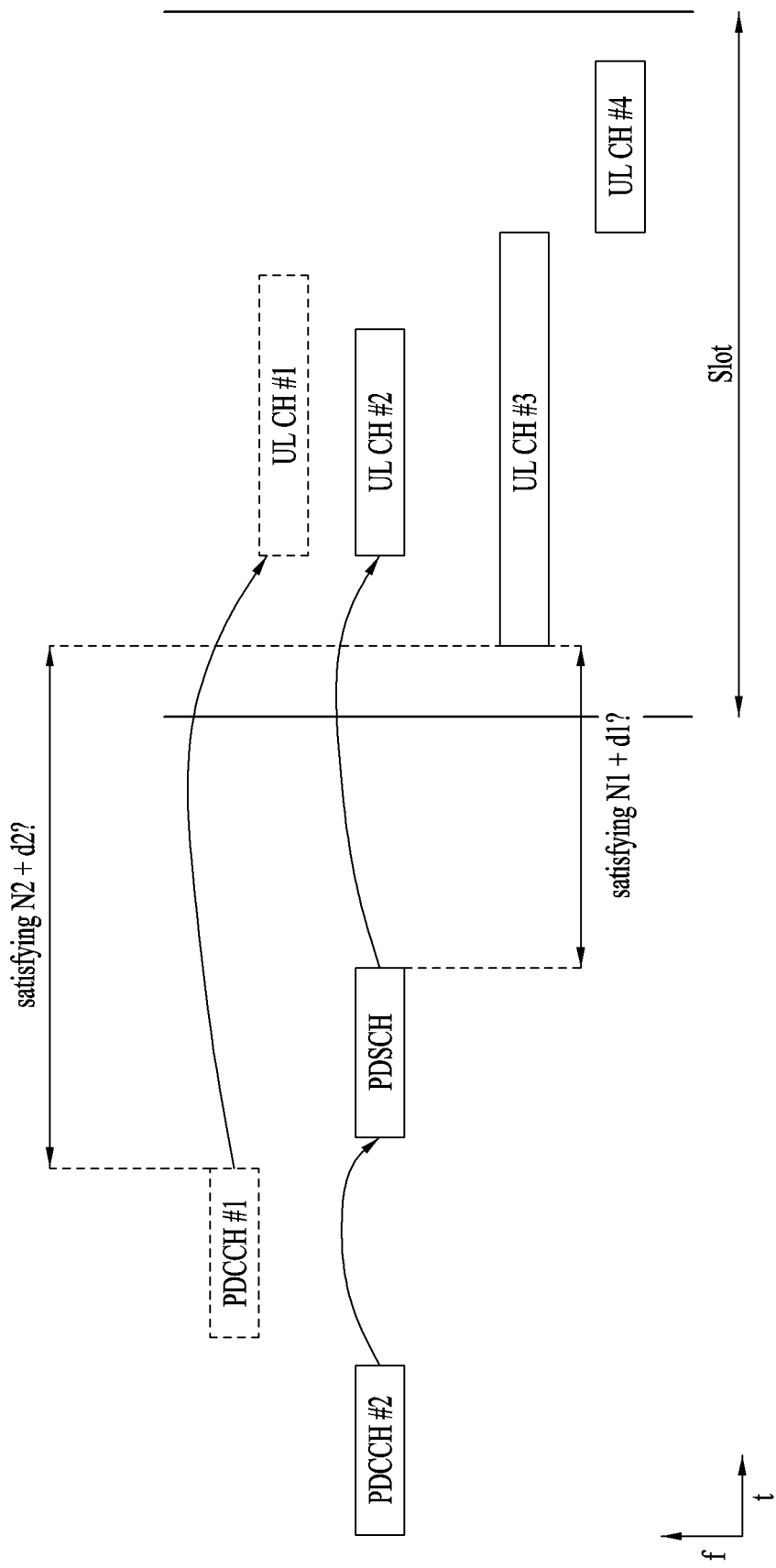

FIG. 13 illustrates exemplary UCI multiplexing based on the timeline conditions. Referring to FIG. 13, the UE may have to transmit a plurality of UL channels (e.g., UL CH #1 to UL CH #4) in the same slot. UL CH #1 may be a PUSCH scheduled by PDCCH #1, and UL CH #2 may be a PUCCH to carry an HARQ-ACK for a PDSCH. The PDSCH may be scheduled by PDCCH #2 and resources of UL CH #2 may also be indicated by PDCCH #2.

When UL channels overlapped with each other on the time axis (e.g., UL CH #1, UL CH #2, and UL CH #3) satisfy the timeline conditions, the UE may perform UCI multiplexing for the UL channels, UL CH #1, UL CH #2, and UL CH #3 overlapped with each other on the time axis. Specifically, the UE may check whether the last symbol of the PDSCH to the first symbol of UL CH #3 satisfy the N1+d1 condition. Further, the UE may check whether the last symbol of PDCCH #1 to the first symbol of UL CH #3 satisfy the N2+d2 condition. When the multiplexing timeline condition is satisfied, the UE may perform UCI multiplexing for UL CH #1, UL CH #2, and UL CH #3 (e.g., refer to [proposed method #1C]). In contrast, when the multiplexing timeline condition is not satisfied, the UE may transmit the UL channels without UCI multiplexing. In this case, all of UL CH #1, UL CH #2, and UL CH #3 may be transmitted together, or transmission of some of the UL channels may be skipped/dropped, with the other UL channels transmitted, in consideration of the priorities of the UCIs/channels.

The NR system supports various OFDM numerologies (e.g., SCSs), and a value satisfying the following may be given as a UE processing time according to an SCS.

(1) Number of symbols (e.g., $N1^+$)*number of samples per symbol*sampling time (e.g., sampling time for an SCS of 15 kHz)*$2^{-n}$ (2) Number of symbols (e.g., $N2^+$)*number of samples per symbol*sampling time (e.g., sampling time for an SCS of 15 kHz)*$2^{-n}$ Herein, the number of samples per symbol may be (2048+144), and for the SCS of 15 kHz, the sampling time may be 1/(2048*15000). 2048 is an FFT size, and 144 is the number of samples included in a CP. For u, refer to [Table 1].

In the timeline conditions, u may be determined based on the SCS of the UL channel(s) overlapped on the time axis (in the slot). The UL channel(s) include PUCCH(s)/PUSCH(s). When the same OFDM numerology (e.g., SCS) is applied to the PUCCH(s)/PUSCH(s), an SCS applied to $N1^+$ and $N2^+$ is made clear. However, when different OFDM numerologies are applied to the PUCCH(s)/PUSCH(s), an SCS applied to $N1^+$ and $N2^+$ may be obscure. The PUCCH(s)/PUSCH(s) may be the PUCCH(s) and/or PUSCH(s).

Therefore, the present disclosure proposes a method of determining an SCS to be applied to $N1^+$ and $N2^+$ in one or more of the following methods.

(1) Opt. 1: The smallest of the SCSs of all the (time-axis) overlapped UL channels may be applied to $N1^+$ and $N2^+$. Applying the smallest SCS in Opt. 1 may amount to conservatively applying the timeline conditions by setting a relatively large symbol size to $N1^+$ and $N2^+$.

(2) Opt. 2: The SCS of the earliest of all the (time-axis) overlapped UL channels may be applied to $N1^+$ and $N2^+$.

(3) Opt. 3: The SCS of an A/N PUCCH (or the UL channel carrying an A/N) may be applied to $N1^+$, while the smallest of the SCSs (or the SCS of the earliest) of all UL channels (e.g., PUSCHs) of which the transmissions are indicated by a PDCCH may be applied to $N2^+$. The A/N PUCCH is a PUCCH configured/indicated for HARQ-ACK transmission.

In the NR system, all of the SCSs of a PDCCH, a PDSCH and a UL channel (e.g., PUCCH/PUSCH) may be different. Therefore, a UE processing time may be determined in consideration of all of the SCSs of the PDCCH, the PDSCH and the UL channel. For example, an SCS (i.e., u) used for calculating the UE processing time may be given by a function of the SCSs of the PDCCH, the PDSCH and the UL channel or as one of the SCSs of the PDCCH, the PDSCH and the UL channel.

FIG. 14 is a flowchart illustrating an exemplary method of transmitting control information according to the present disclosure.

Referring to FIG. 14, the UE may receive a PDSCH from the eNB (S1702). The PDSCH may be scheduled by a PDCCH (e.g., DCI format 1_0 or DCI format 1_1). Referring to FIG. 4, response information (e.g., an HARQ-ACK response) for the PDSCH may be transmitted on a first UL channel (e.g., a PUCCH) K1 slots after the reception time of the PDSCH which is K0 slots after the reception time of the PDCCH. Resources of the first UL channel may be indicated by a PRI in the PDCCH. A plurality of UL channels may be allocated in a slot indicated for transmission of the first UL channel. The plurality of UL channels may include a plurality of PUCCHs. The plurality of UL channels may further include one or more PUSCHs. In this case, to determine whether to perform UCI multiplexing, the UE may check whether the time interval between (i) the PDSCH and (ii) the earliest one of a plurality of UL channels overlapped with each other on the time axis satisfies a reference time (S1704). The time interval may be determined based on the interval between (i) the last symbol of the PDSCH and (ii) the first symbol of the earliest UL channel. Further, the plurality of UL channels include a first UL channel for the response information for the PDSCH. Subsequently, the UE may multiplex UCIs related to the plurality of UL channels into one UL channel based on the reference time being satisfied (S1706).

The reference time may be determined based on the number of symbols and an SCS, and the SCS may include the smallest one of a plurality of SCSs of the plurality of UL channels. A symbol length may be determined based on an SCS, and the symbol length is inversely proportional to the SCS. For example, the reference time may be determined as follows.

Number of symbols (e.g., $N1^+$)*number of samples per symbol*sampling time (e.g., sampling time for an SCS of 15 kHz)*$2^{-n}$ Herein, $N1^+$ represents a minimum processing time required for processing the PDSCH, and u represents an index corresponding to the SCS, which is an integer equal to or larger than 0 (refer to [Table 1]).

Further, the SCS of the earliest UL channel may be larger than the smallest one of the plurality of SCSs of the plurality of UL channels. Further, when the time interval is larger than the reference time, UCI including the response information is multiplexed and transmitted in a single UL channel, while when the time interval is equal to or less than the reference time, the UE does not perform UCI multiplexing for the plurality of UL channels overlapped with each other on the time axis. Accordingly, the response information for the PDSCH may be transmitted on the first UL channel without being multiplexed.

Further, when the plurality of UL channels include a PUSCH scheduled by the PDCCH, the UE may further check whether the time interval between (i) the PDCCH and (ii) the earliest UL channel satisfies an additional reference time in order to determine whether to perform UCI multiplexing. In this case, only when the additional reference time is also satisfied, the UCI multiplexing may be performed. For example, the additional reference time may be determined based on the following values.

Number of symbols (e.g., $N2^+$)*number of samples per symbol*sampling time (e.g., sampling time for an SCS of 15 kHz)*$2^{-n}$ N2⁺ represents a minimum processing time required for PUSCH preparation, and u represents an index corresponding to an SCS, which is an integer equal to or larger than 0 (refer to [Table 1]).

Figure 15:
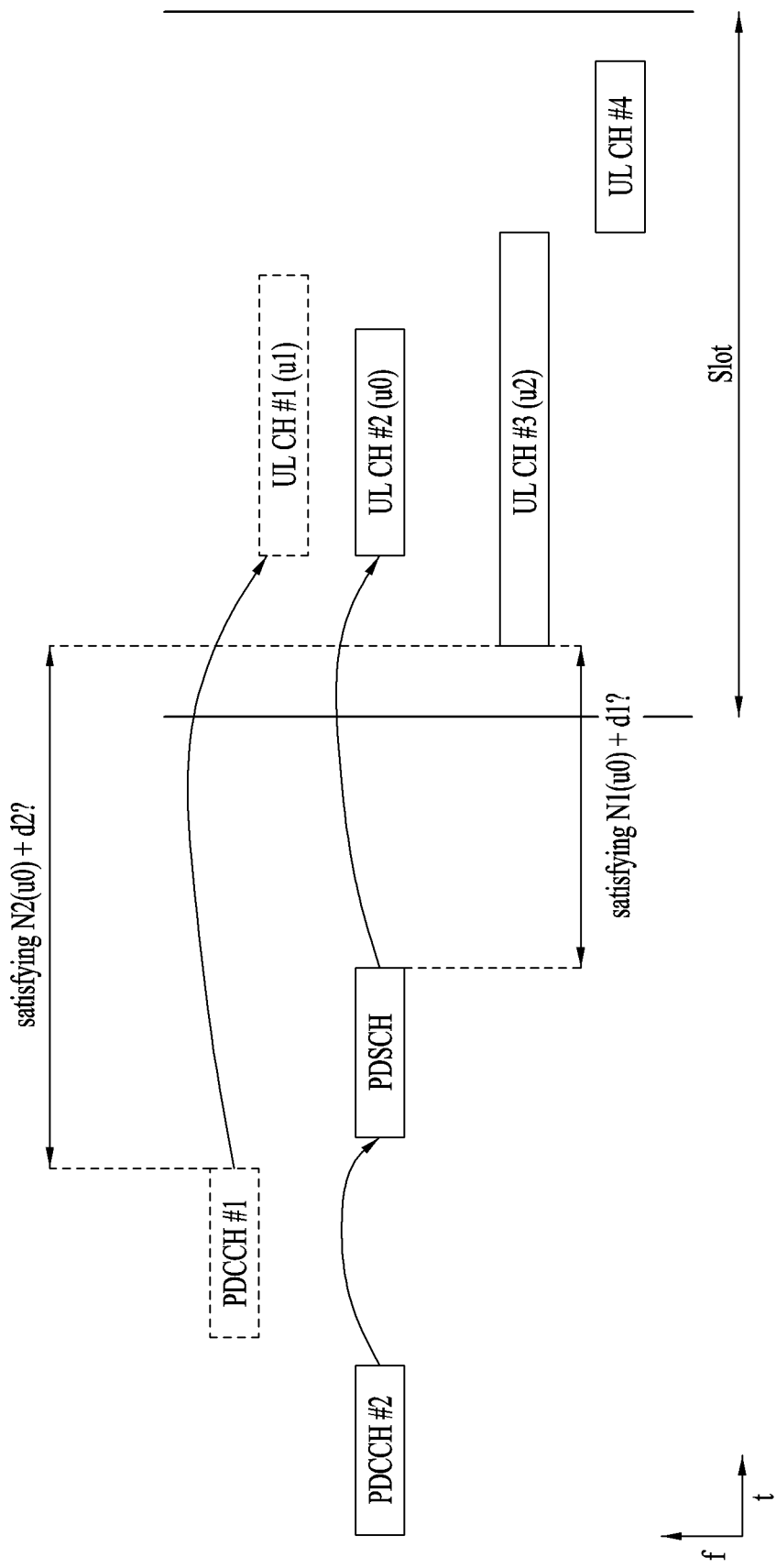

FIG. 15 illustrates exemplary UCI multiplexing based on timeline conditions according to the present disclosure. Referring to FIG. 15, the UE may have to transmit a plurality of UL channels (e.g., UL CH #1 to UL CH #4) in the same slot. UL CH #1 may be a PUSCH scheduled by PDCCH #1, and UL CH #2 may be a PUCCH to carry an HARQ-ACK for a PDSCH. The PDSCH may be scheduled by PDCCH #2 and resources of UL CH #2 may also be indicated by PDCCH #2. Herein, it is assumed that the SCSs of UL CH #1, UL CH #2, and UL CH #3 are respectively u=1 (u1), u=0 (u0), and u=2 (u2) (refer to [Table 1]).

When UL channels overlapped with each other on the time axis (e.g., UL CH #1 to UL CH #3) satisfy the multiplexing timeline condition, the UE may perform UCI multiplexing for the UL channels overlapped with each other on the time axis, UL CH #1 to UL CH #3. Specifically, the UE may check whether the last symbol of the PDSCH to the first symbol of UL CH #3 satisfy the N1+d1 condition. Further, the UE may check whether the last symbol of PDCCH #1 to the first symbol of UL CH #3 satisfy the N2+d2 condition. The smallest one of the SCSs of UL CH #1, UL CH #2, and UL CH #3 may be applied to {N1+d1} and {N2+d2} (i.e., UL CH #1; u=0). When the multiplexing timeline condition is satisfied, the UE may perform UCI multiplexing for UL CH #1, UL CH #2, and UL CH #3 (e.g., refer to [proposed method #1C]). In contrast, when the multiplexing timeline condition is not satisfied, the UE may transmit the UL channels without UCI multiplexing. In this case, all of UL CH #1, UL CH #2, and UL CH #3 may be transmitted together, or transmission of some of the UL channels may be skipped/dropped, with the other UL channels transmitted, in consideration of the priorities of the UCIs/channels. For example, when an HARQ-ACK response and CSI are given as UCIs, transmission of the CSI may be skipped/dropped according to the priorities of the UCIs.

[Proposed Method #10] In the NR system, the eNB may configure a plurality of SR resources for the UE. When the SR resources are in PUCCH format 1, the U may select only one (a highest-priority one) of K SR resources of which simultaneous transmissions are indicated to the UE and transmit the selected SR resource (e.g., channel/resource selection). The number of hypotheses that the eNB should take for SR reception may increase and UCI transmission performance may decrease, with the value of K. Accordingly, proposed is a method of configuring one or more K SR resources (overlapped with each other in time) for a UE and reflecting, in PUCCH transmission, a power offset represented by a function of the value of K (or proportional to the value of K) in one or more of the following cases.

(1) Case 1: One of K SR resources is selected and transmitted.

(2) Case 2: One of K SR resources and an A/N resource is selected and an A/N is transmitted in the selected resource.

A power offset may be proportional to the value of K. For example, the power offset may be a function of K (or K−1) or log 2(K) (or log 2(K−1)) or ceil(log 2(K)) (or ceil(log 2(K−1)) where ceil( ) is a round-up function. Accordingly, the transmission power of the PUCCH may increase in proportion to the value of K.

Different power offsets may be set in the two cases. Further, since an A/N is further transmitted in Case 2, a relatively large power offset may be applied, compared to Case 1. Further, the present proposal may be limited to a case in which PUCCH resources allocated to an SR and an A/N are in PUCCH format 1.

Figure 16:
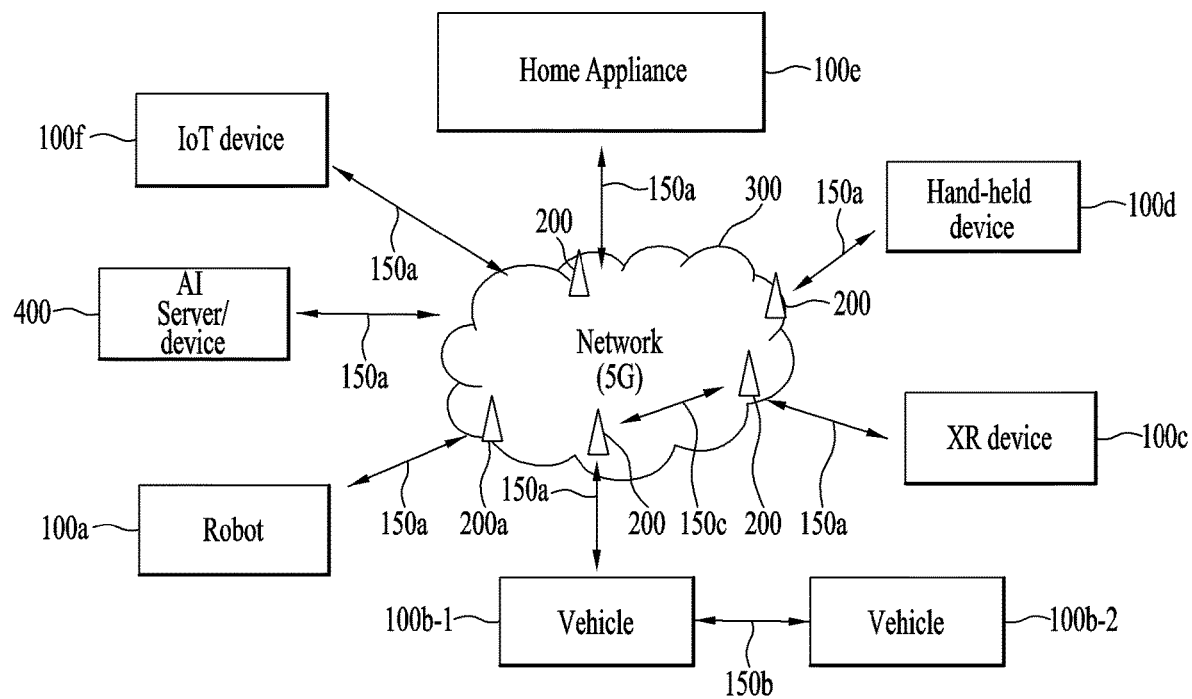
FIGS. 16 to 19 are block diagrams illustrating a communication system and wireless devices which are applied to the present disclosure.

FIG. 16 illustrates an exemplary communication system 1 applied to the present disclosure.

Referring to FIG. 16, the communication system 1 applied to the present disclosure includes wireless devices, BSs, and a network. The wireless devices are devices performing communication using radio access technology (RAT) (e.g., 5G New RAT (NR)) or LTE) and may be referred to as communication/radio/5G devices. The wireless devices may include, but not limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a TV, a smartphone, a computer, a wearable device, a home appliance, a digital signage, a vehicle, a robot, or the like. The hand-held device may include a smartphone, a smart pad, a wearable device (e.g., a smart watch or smart glasses), a computer (e.g., a laptop), or the like. The home appliance may include a TV, a refrigerator, and a washing machine. The IoT device may include a sensor and a smart meter. For example, the BSs and the network may be implemented as wireless devices, and the specific wireless device 200a may operate as a BS/network node with respect to other wireless devices.

The wireless devices 100a to 100f may be connected to the network 300 via the BSs 200. AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay and integrated access backhaul (IAB)). The wireless devices and the BSs/the wireless devices may transmit/receive radio signals to/from each other through the wireless communication/connections 150a and 150b. For example, signals may be transmitted/received on various physical channels through the wireless communication/connections 150a and 150b. To this end, at least a part of various configuration information configuring processes, various signal processes (e.g., channel encoding/decoding, modulation/demodulation, and resource mapping/demapping), and resource allocating processes, for transmitting/receiving radio signals, may be performed based on the various proposals of the present disclosure.

Figure 17:
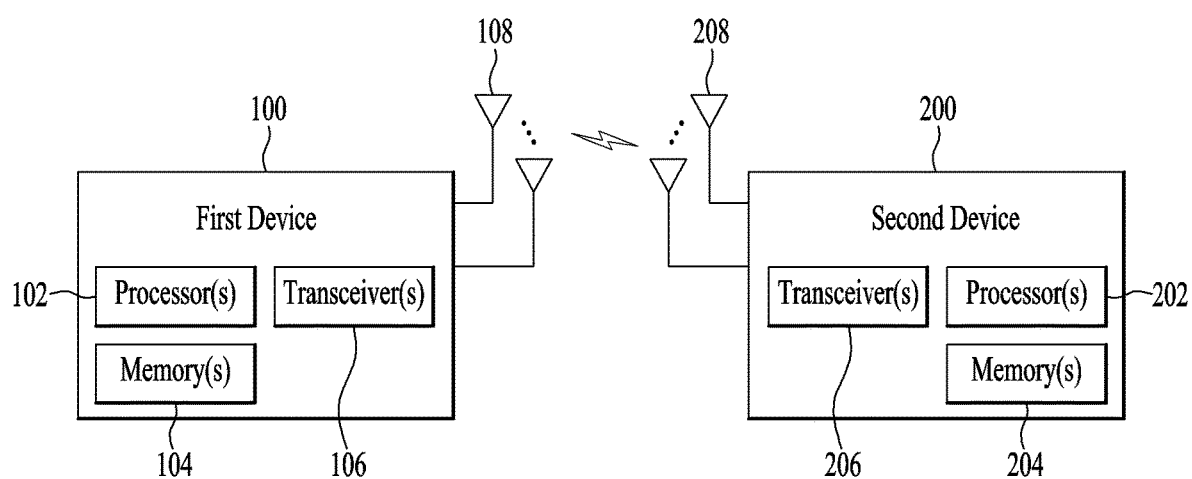

FIG. 17 illustrates wireless devices applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and store various pieces of information related to operations of the processor(s) 102. For example, the memory(s) 104 may store software code including commands for performing all or a part of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, a wireless device may refer to a communication modem/circuit/chip.

The second wireless device 200 may include one or more processors 202 and one or more memories 204, and may further include one or more transceivers 206, and/or one or more antennas 208. The processor(s) 202 may control the memory(s) 204 and/or the transceiver(s) 206, and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including commands for performing all or a part of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, a wireless device may refer to a communication modem/circuit/chip.

Now, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 and executed by the one or more processors 102 and 202. The descriptions, functions, procedures, proposals, methods, and/or operational flowcharts disclosed in this document may be implemented using firmware or software in the form of code, instructions, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, and so on processed using the one or more processors 102 and 202 from the baseband signals into the RF signals. To this end, the one or more transceivers 106 and 206 may include (analog) oscillators and/or filters.

Figure 18:
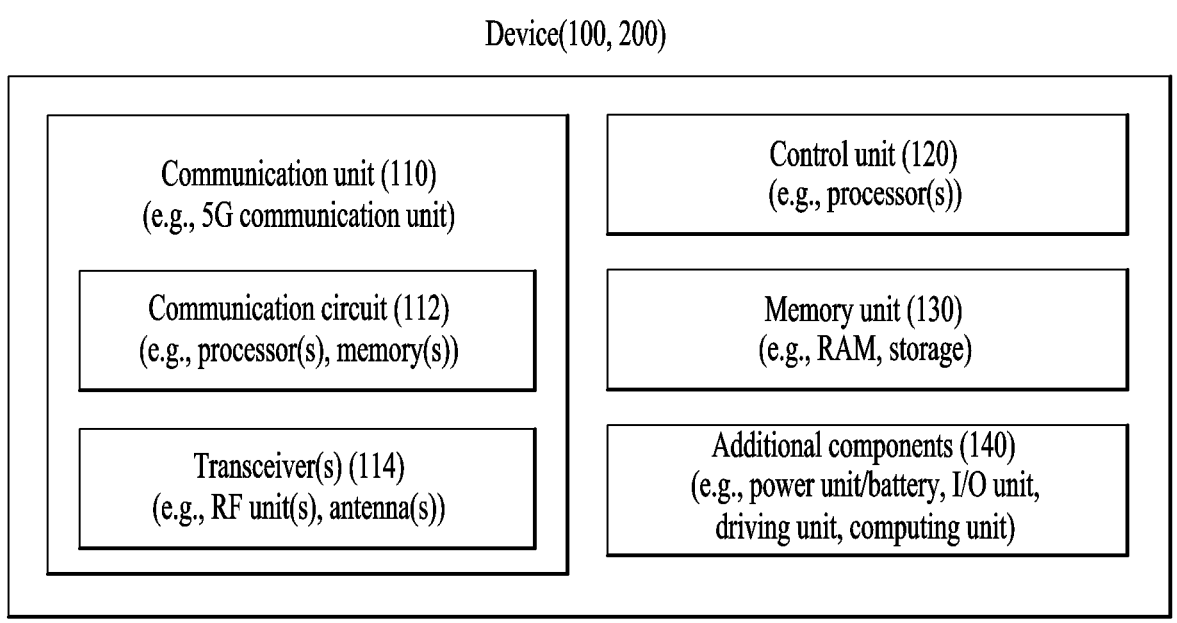

FIG. 18 illustrates another example of wireless devices applied to the present disclosure. The wireless devices may be implemented in various forms according to a use-case/service (refer to FIG. 16)

Referring to FIG. 18, wireless devices 100 and 200 may correspond to the wireless devices 100 and 200 of FIG. 17 and may include various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory unit 130, and the additional components 140 and provides overall control to the operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be variously configured according to the types of the wireless devices. For example, the additional components 140 may include at least one of a power unit/battery, input/output (I/O) unit, a driving unit, and a computing unit. The wireless device may be implemented in the form of, but not limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medical device, a FinTech device (or a financial device), a security device, a climate/environment device, the AI server/device (400 of FIG. 15), the BSs (200 of FIG. 15), a network node, and so on. The wireless device may be used in a mobile or fixed place according to a use case/service.

In FIG. 18, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected wiredly, and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may include a set of one or more processors. For example, the control unit 120 may include a set of a communication control processor, an application processor, an electronic control unit (ECU), a graphical processing unit, and a memory control processor. In another example, the memory unit 130 may include a random access memory (RAM), a dynamic RAM (DRAM), a read only memory (ROM), a flash memory, a volatile memory, a non-volatile memory, and/or a combination thereof.

Figure 19:
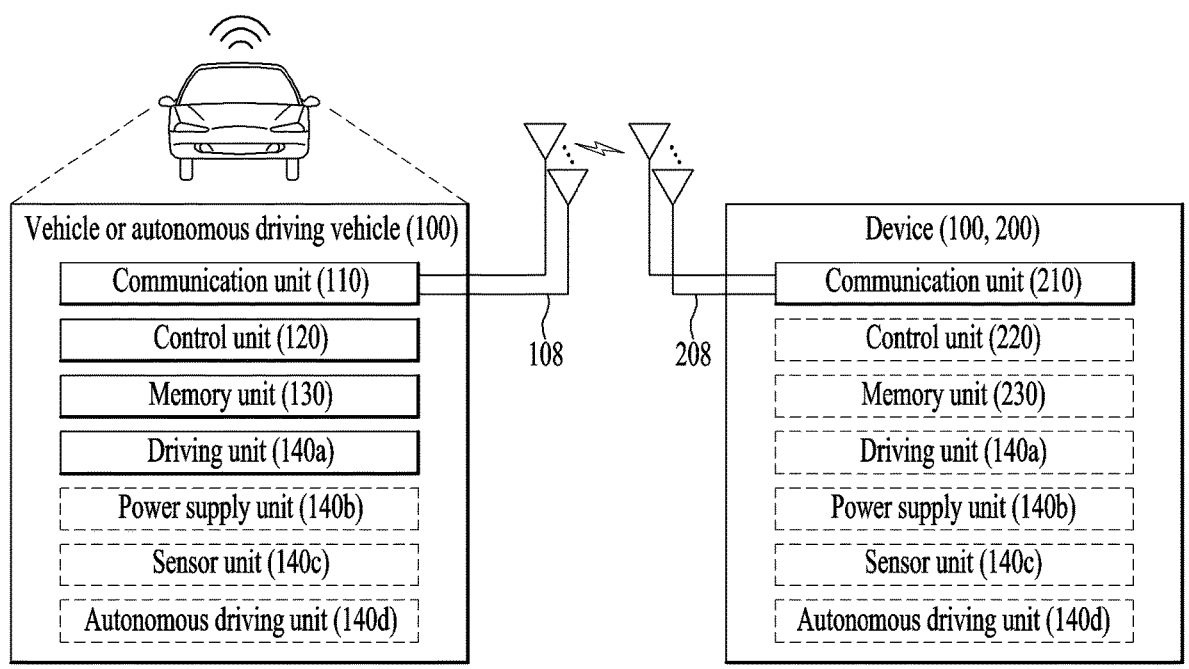

FIG. 19 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 19, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire vehicle state information, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting a speed, such as adaptive cruise control, technology for autonomously driving along a determined path, technology for driving by automatically setting a route once a destination is set, and so on.

For example, the communication unit 110 may receive map data, traffic information data, and so on from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain vehicle state information and/or surrounding environment information. The autonomous driving unit 140d may update the autonomous driving path and the driving plan based on the newly obtained data/information. The communication unit 110 may transmit information about a vehicle position, the autonomous driving path, and/or the driving plan to the external server. The external server may predict traffic information data using AI technology or the like based on the information collected from vehicles or autonomous driving vehicles and provide the predicted traffic information data to the vehicles or the autonomous driving vehicles.

The embodiments described above are combinations of elements and features of the present disclosure in a specific form. Each component or feature shall be considered optional unless otherwise expressly stated. Each component or feature may be implemented in a form that is not combined with other components or features. It is also possible to implement embodiments of the present disclosure by combining some of the elements and/or features. The order of the operations described in the embodiments of the present disclosure may be changed. Some configurations or features of some embodiments may be included in other embodiments, or may be replaced with corresponding configurations or features of other embodiments. It is clear that the claims that are not expressly cited in the claims may be combined to form an embodiment or be included in a new claim by an amendment after the application.

Those skilled in the art will appreciate that the present disclosure may be carried out in other specific ways than those set forth herein without departing from the spirit and essential characteristics of the present disclosure. The above embodiments are therefore to be construed in all aspects as illustrative, not restrictive. The scope of the disclosure should be determined by the appended claims and their legal equivalents, not by the above description, and all changes coming within the meaning and equivalency range of the appended claims are intended to be embraced therein.

The present disclosure may be used in a UE, an eNB, and other equipment in a wireless mobile communication system.

What is claimed is:

1. A method of transmitting control information by a communication device in a wireless communication system, the method comprising:
    receiving a physical downlink shared channel (PDSCH); and
    multiplexing uplink control information (UCI) related to a plurality of uplink (UL) channels based on a time interval, between (i) the PDSCH and (ii) an earliest UL channel among the plurality of UL channels, being equal to or larger than a reference time interval,
    wherein the plurality of UL channels are overlapped on a time axis, and include a first UL channel for response information for the PDSCH, and
    wherein the reference time interval is determined based on (i) a number of symbols and (ii) a smallest subcarrier spacing (SCS) among a plurality of SCSs for the plurality of UL channels, and
    wherein, based on the time interval being less than the reference time interval, the UCI related to the plurality of UL channels is not multiplexed.

2. The method according to claim 1, wherein the SCS of the earliest UL channel is larger than the smallest SCS of the plurality of SCSs for the plurality of UL channels.

3. The method according to claim 1, wherein the time interval is determined based on an interval between (i) a last symbol of the PDSCH and (ii) an initial symbol of the earliest UL channel.

4. The method according to claim 1, wherein the plurality of UL channels include a physical uplink control channel (PUCCH).

5. The method according to claim 1, wherein, based on the plurality of UL channels including a physical uplink shared channel (PUSCH) scheduled by a physical downlink control channel (PDCCH), the UCI is further multiplexed on the PUSCH when a time interval between (i) the PDCCH and (ii) the earliest UL channel is equal to or larger than an additional reference time interval.

6. The method according to claim 1, wherein a symbol length is determined based on an SCS, and the symbol length and the SCS are inversely proportional to each other.

7. A communication device configured to operate in a wireless communication system, the communication device comprising:
    a memory; and
    a processor,
    wherein the processor is configured to receive a physical downlink shared channel (PDSCH), and multiplex uplink control information (UCI) related to a plurality of uplink (UL) channels based on a time interval, between (i) the PDSCH and (ii) an earliest UL channel among the plurality of UL channels, being equal to or larger than a reference time interval, and wherein the plurality of UL channels are overlapped on a time axis, and include a first UL channel for response information for the PDSCH, and wherein the reference time interval is determined based on (i) a number of symbols and (ii) a smallest subcarrier spacing (SCS) among a plurality of SCSs for the plurality of UL channels, and wherein, based on the time interval being less than the reference time interval, the UCI related to the plurality of UL channels is not multiplexed.

8. The communication device according to claim 7, wherein the SCS of the earliest UL channel is larger than the smallest SCS of the plurality of SCSs for the plurality of UL channels.

9. The communication device according to claim 7, wherein the time interval is determined based on an interval between (i) a last symbol of the PDSCH and (ii) an initial symbol of the earliest UL channel.

10. The communication device according to claim 7, wherein the plurality of UL channels include a physical uplink control channel (PUCCH).

11. The communication device according to claim 7, wherein, based on the plurality of UL channels including a physical uplink shared channel (PUSCH) scheduled by a physical downlink control channel (PDCCH), the UCI is further multiplexed on the PUSCH when a time interval between (i) the PDCCH and (ii) the earliest UL channel is equal to or larger than an additional reference time interval.

12. The communication device according to claim 7, wherein a symbol length is determined based on an SCS, and the symbol length and the SCS are inversely proportional to each other.

13. The communication device according to claim 7, wherein the communication device includes an autonomous driving vehicle communicable with an autonomous driving vehicle other than at least a user equipment (UE), a network, and the communication device.

* * * * *